United States Patent
Hattori et al.

(10) Patent No.: US 8,065,701 B2
(45) Date of Patent: Nov. 22, 2011

(54) INFORMATION BROADCASTING METHOD, INFORMATION BROADCASTING SYSTEM, AND RECEIVING APPARATUS FOR TRANSMITTING DATA OTHER THAN PROGRAM THROUGH DIGITAL BROADCASTING

(75) Inventors: Yoshitsugu Hattori, Tokyo (JP); Hitoshi Yoshinobu, Kanagawa (JP); Teruyuki Shitara, Tokyo (JP); Kei Amano, Tokyo (JP); Masanori Ishigaki, Kanagawa (JP)

(73) Assignee: Sony Corporation (JP)

( * ) Notice: Subject to any disclaimer, the term of this patent is extended or adjusted under 35 U.S.C. 154(b) by 2300 days.

(21) Appl. No.: 10/032,773

(22) Filed: Dec. 26, 2001

(65) Prior Publication Data
US 2002/0066097 A1 May 30, 2002

Related U.S. Application Data

(62) Division of application No. 09/066,758, filed on Apr. 28, 1998, now abandoned.

(30) Foreign Application Priority Data

Apr. 30, 1997 (JP) .................................... P9-112846
Jun. 27, 1997 (JP) .................................... P9-171744
Jun. 30, 1997 (JP) .................................... P9-174990

(51) Int. Cl.
*H04N 7/16* (2006.01)
(52) U.S. Cl. ......................................... 725/22; 705/14.4
(58) Field of Classification Search ...................... None
See application file for complete search history.

(56) References Cited

U.S. PATENT DOCUMENTS

| 4,780,757 A | * | 10/1988 | Bryer et al. | 725/144 |
| 4,982,441 A | * | 1/1991 | Hashimoto et al. | 455/516 |
| 5,446,919 A | * | 8/1995 | Wilkins | 725/35 |

(Continued)

FOREIGN PATENT DOCUMENTS

JP 03-240163 A 10/1991

(Continued)

OTHER PUBLICATIONS

Eric Herrmann, translated by Teiko Kuno, Yasushi Kuno, "recording the of the Web page," introduction to CGI—principle, technique, perlscript, Prentice Hall publication Co, Ltd., Jun. 10, 1997, first edition, pp. 301-353.

(Continued)

*Primary Examiner* — Dominic D Saltarelli
*Assistant Examiner* — Oschta Montoya
(74) *Attorney, Agent, or Firm* — Lerner, David, Littenberg, Krumholz & Mentlik, LLP

(57) ABSTRACT

When advertising information is included in a received broadcasting wave, viewer attributes which have previously been registered in an IC card is collated with a target ID added to the advertising information, and the advertising information (icon) in which both of them coincide is selected and displayed (S3, S4). When there is a requesting operation of detailed information, the detailed information is obtained by link information. The detailed information can be obtained from the broadcasting wave (S11, S12) or can be obtained from a homepage via the internet (S17, S18). The detailed information is displayed in place of the picture plane of a program. When a viewer requires to finish the display, the display of the detailed information is finished (S14, S20). When the detailed information is displayed, the presence of the request for the detailed information is recorded as a history.

75 Claims, 50 Drawing Sheets

U.S. PATENT DOCUMENTS

| | | | | |
|---|---|---|---|---|
| 5,517,321 A | * | 5/1996 | Yoshida | 386/96 |
| 5,600,364 A | * | 2/1997 | Hendricks et al. | 725/9 |
| 5,601,436 A | * | 2/1997 | Sudman et al. | 434/307 R |
| 5,682,195 A | | 10/1997 | Hendricks et al. | |
| 5,707,288 A | * | 1/1998 | Stephens | 463/33 |
| 5,758,079 A | * | 5/1998 | Ludwig et al. | 709/204 |
| 5,758,257 A | | 5/1998 | Herz et al. | |
| 5,761,669 A | * | 6/1998 | Montague et al. | 707/103 R |
| 5,818,441 A | | 10/1998 | Throckmorton et al. | |
| 5,850,265 A | * | 12/1998 | Suh | 725/110 |
| 5,920,701 A | * | 7/1999 | Miller et al. | 709/228 |
| 5,929,849 A | * | 7/1999 | Kikinis | 725/113 |
| 6,088,722 A | * | 7/2000 | Herz et al. | 709/217 |
| 6,240,555 B1 | | 5/2001 | Shoff et al. | |
| 6,285,984 B1 | * | 9/2001 | Speicher | 705/14.73 |
| 6,335,763 B1 | | 1/2002 | Nishio et al. | |
| 6,463,585 B1 | | 10/2002 | Hendricks et al. | |
| 6,553,178 B2 | * | 4/2003 | Abecassis | 386/83 |

FOREIGN PATENT DOCUMENTS

| | | | |
|---|---|---|---|
| JP | 04-159646 A | 6/1992 | |
| JP | 05-122694 A | 5/1993 | |
| JP | 6-097962 A | 4/1994 | |
| JP | 07154350 A | 6/1995 | |
| JP | 07-2988182 A | 11/1995 | |
| JP | 08-008859 A | 1/1996 | |
| JP | 08-018521 A | 1/1996 | |
| JP | 8-022409 A | 1/1996 | |
| JP | 08-098089 A | 4/1996 | |
| JP | 08102976 | 4/1996 | |
| JP | 08-162985 A | 6/1996 | |
| JP | 08-506972 A | 7/1996 | |
| JP | 08-331077 A | 12/1996 | |
| JP | 09008983 A | 1/1997 | |
| JP | 09-044170 A | 2/1997 | |
| JP | 09-051314 A | 2/1997 | |
| JP | 09055673 A | 2/1997 | |
| JP | 09-074389 A | 3/1997 | |
| JP | 09139933 A | 5/1997 | |
| JP | 09-162821 A | 6/1997 | |

OTHER PUBLICATIONS

Motoyuki Tanaka, "Web server by your Mac, No. 3 expanding the Web server second," Macintosh Developer'S Journal, Gijutuhyoron Corporation Co., Ltd., Jun. 15, 1997, 25, pp. 60-67.

Office Action from Japanese Application No. 09-171744, dated Feb. 23, 2010.

Eric Herrmann, Teiko Kuno, Yasushi Trnaslation by Kuno, "Recording of Web page visitors", Introduction to CGI—principle, technique, Perl script, Prentice Hall publication Co., Ltd., Jun. 10, 1997 First edition, p. 301-353 (Document number of Japan PTO: Book 1999-00234 -001).

Nikkei Computer, Nikkei BP, May 27, 1996, No. 392, p. 212-213.

Office Action from Japanese Application No. 09-171744, dated Sep. 28, 2010.

* cited by examiner

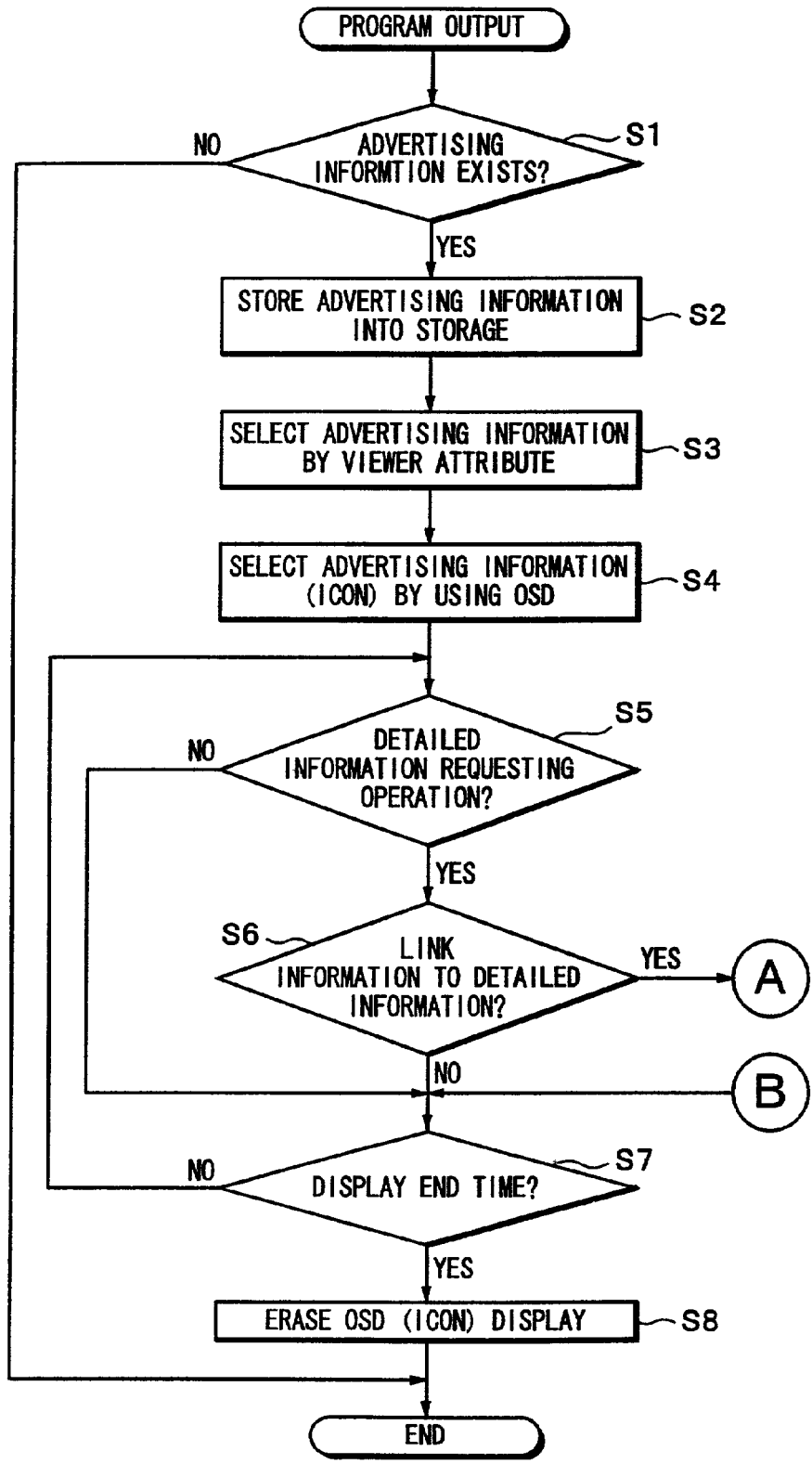

Fig. 28

P10 — [screen showing "FORM 4. INPUT NAME" with input field "たま", END, RETURN buttons, character selection grid (215) containing katakana, alphabet, and symbols, side buttons: bell icon, あいう, アイウ, ABC, 123, and bottom message "INPUT YOUR NAME !"]

Fig. 29

P11 — [screen showing "FORM 5. INPUT PROFILE" with "INPUT YOUR PROFILE !" and rows for CONSTELLATION, BLOOD GROUP, OCCUPATION, AGE each with "(DEPRESS BUTTON→)" field and "PRESS AND SELECT" button; bottom message "PRESS BUTTON AND SELECT MENU !"]

FORM
7. INPUT YOUR HOPES FOR PARTNER

INPUT YOUR PROFILE!

TYPE (PRESS BUTTON→) [PRESS AND SELECT]
AREA (PRESS BUTTON→) [PRESS AND SELECT]
AGE (PRESS BUTTON→) [PRESS AND SELECT]
HOBBY (PRESS BUTTON→) [PRESS AND SELECT]

PRESS BUTOON AND SELECT MENU!

FORM
5

SAME AS YOU
YONGER THAN YOU
OLDER THAN YOU

~15
16~18
19~21
22~25
25~

TYPE [PRESS AND SELECT]
AREA [PRESS AND SELECT]
AGE [PRESS AND SELECT]
HOBBY [PRESS AND SELECT]

SELECT YOUR DESIRED PARTNER'S AGE!

Fig. 57
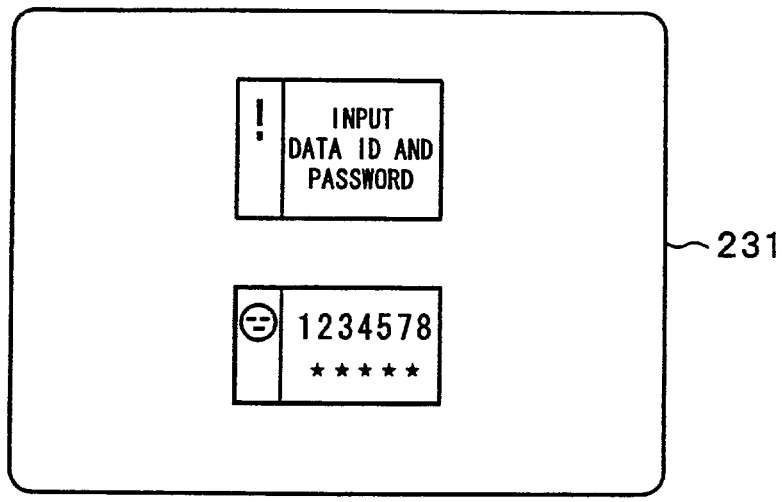
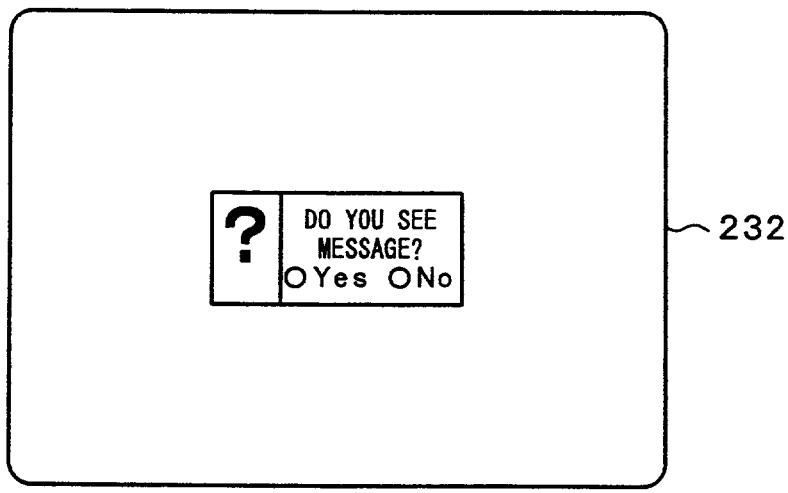
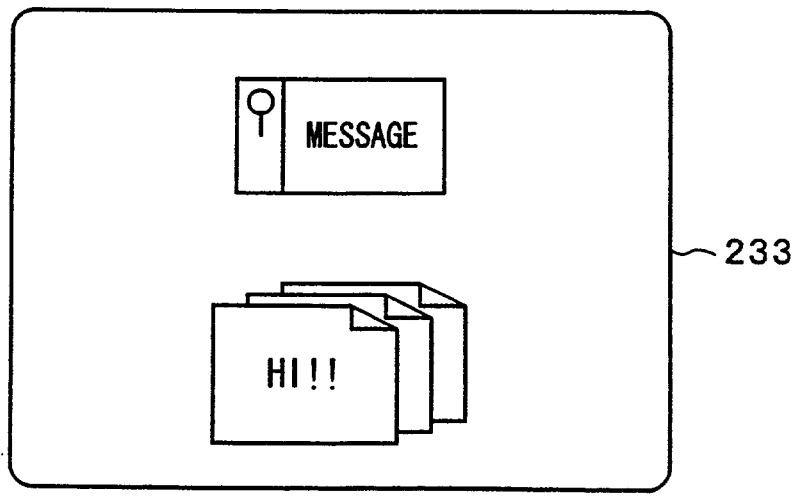

INFORMATION BROADCASTING METHOD, INFORMATION BROADCASTING SYSTEM, AND RECEIVING APPARATUS FOR TRANSMITTING DATA OTHER THAN PROGRAM THROUGH DIGITAL BROADCASTING

CROSS-REFERENCE TO RELATED APPLICATIONS

The present application is a divisional of U.S. application Ser. No. 09/066,758, filed Apr. 28, 1998, now abandoned, which claims priority from Japanese Application Nos. 09-112846, filed Apr. 30, 1997, 09-171744, filed Jun. 27, 1997, and 09-174990, filed Jun. 30, 1997, the disclosures of which are hereby incorporated by reference herein.

BACKGROUND OF THE INVENTION

1. Field of the Invention

The invention relates to information broadcasting method, information broadcasting system, and receiving apparatus for transmitting advertising and publicity information by using a digital broadcasting and, further, transmitting data other than programs through a digital broadcasting which can electronically exchange personal data such as a face image.

2. Description of the Related Art

In recent years, a digital broadcasting for transmitting multimedia data such as image signal, audio signal, etc. by using a communicating satellite has being put into practical use. The invention intends to multiplex advertising information to program information in the digital broadcasting. First, an outline of a typical digital broadcasting system will now be described with reference to FIG. 1. The side of transmitting programs is constructed by an up-link station 2, a program provider 1, and management systems 6, 7, and 8.

Video/audio data from the program provider 1 is supplied to an encoder multiplexer 3 of MPEG (Moving Picture Experts Group) 2 of the up-link station 2. In the MPEG2 encoder multiplexer 3, the video/audio data is compressed and the compressed video/audio data is packaged into a packet of a length of 188 bytes. Packets of video/audio data corresponding to a plurality of programs are multiplexed and a transport packet of MPEG2 is formed. A transport stream is formed by a series of transport packets. The number of transport streams corresponds to the number of transponders installed in the communicating satellite.

The MPEG2 transport stream is supplied to a transmitting system 4. In the transmitting system 4, processes such as scrambling process of each packet, error correction encoding of each packet, and modulation, and the like are executed and a modulation output is supplied to a transmitting antenna 5. The scrambling process is necessary to realize a conditional access which is used to control permission or inhibition of a monitor of each viewer. For example, it is possible to make a contract of PPV (Pay Per View) such that only a certain program is monitored each time in a toll. A key to descramble the scramble is supplied from the key management system 6 to the MPEG2 encoder multiplexer 3 and is inserted as one of the packets into the transport stream in a manner similar to video/audio information.

A systematizing management of the MPEG2 packets is performed by the program management system 7. The program management system 7 and key management system 6 are unified and encipher the key to descramble the scramble. Further, the customer management system 8 is provided and items regarding a viewer contract or the like are managed. Viewer information is transmitted to the viewer through a telephone line 9.

A broadcasting radio wave is transmitted from the transmitting antenna 5 and is received by a receiving antenna of each home through a communicating satellite 10. A receiver 12 is connected to the receiving antenna 11. The receiver 12 is constructed by: a tuner for designating a receiving transponder; a demodulating unit; a descrambling unit for descrambling the scramble; a demultiplexer for designating a packet to be separated; a video decoding unit; an audio decoding unit; and the like. The decoded video/audio signals are supplied to a television receiver 13.

The key to descramble the scramble is enciphered and transmitted as related information together with video and audio data. The key to decipher the encryption has been stored in an IC card 14 inserted in the receiver 12. The scramble of which program can be descrambled can be controlled from the transmitting side on the basis of contract information of each reception system. The receiver having the conditional accessing function is usually called an IRD (Integrated Receiver/Decoder).

The foregoing digital satellite broadcasting system is not limited to only the monitor of a television broadcasting but can be also used as a transmitting system of a large quantity of digital data due to many channels. That is, the receiver of the digital satellite broadcasting has a function serving as an acceptor of digital data such that contract information or the like concerning the program or viewer, data for a personal computer, or the like other than the video audio data is multiplexed thereto and the resultant data is transmitted.

For example, in one broadcasting in the present satellite broadcasting system, a content description EIT (Event Information Table) of programs which are at present being broadcasted or will be broadcasted in future, an EPG (Electric Program Guides), contract information (Entitlement Control Message) including a monitor fee and a monitor age limitation, and the like are transmitted together with the video/audio data. Specifically speaking, the information such as monitor fee, monitor age limitation, and the like is broadcasted together with program information as common information (ECM: Entitlement Control Message) that is common to receiving terminals.

An ID which is peculiar to a receiving terminal is allocated and individual information (EMM: Entitlement Management Message) that is formed on the transmitting side for the viewer and is individual to the terminal is sent. At the terminal, on the receiving side, the EMM of the same ID as the own ID is decoded and a work key is loaded into the IC card. A key to decode the EMM has previously been stored in the IC card of each receiving terminal. When the program is monitored, the ECM annexed to the program is loaded into the IC card. If the work key corresponding to the program has preliminarily been stored, the descramble is performed and the program can be monitored. As mentioned above, the PPV is enabled. By instructing an up-loading of a monitor history of PPV programs from the individual terminal or providing a modem into the terminal, a purchase request for a shopping program or an answer to a questionnaire can be performed.

In the conventional digital satellite broadcasting system as mentioned above, however, by multiplexing the information concerning the program and broadcasting, an additional value of the program can be further raised or the operation can be simplified, but video/audio data of advertising/publicity information which is so called a CM (Commercial Message) that is inserted in the program is merely transmitted as a part of the program. There is, consequently, a problem such that advertising and publicity information is transmitted to the viewer irrespective of goods or services as targets of the advertising and publicity information or goods are forcedly advertised irrespective of a will of each viewer as a receiver.

In the case where the viewer has an interest in goods by watching a CM and wants to get further detailed information or the like, since there is only a method of accessing to the telephone number displayed on the screen through a telephone line, there is a problem such that the detailed information of the goods cannot be easily and promptly obtained.

Further, as an enterprise serving as a side of providing a CM, even in the case where the enterprise wants to know a monitor history, audience ratings, and the like of each CM or the like, there is a problem such that the enterprise can know the information as only monitor history and audience ratings as one program which is collected on the broadcasting station side.

A photographing/outputting apparatus which can print a face image photographed by a camera as a seal has appeared and is becoming popular. A terminology of "print club" is also popular. More specifically explaining, an image obtained by photographing one or a few persons is printed onto one seal paper as divisional images (for example, size of 3 cm×2 cm). The photographs obtained as mentioned above are not limited to a personal use but are provided as an application such that they are handed to friends or exchanged.

According to the existing photographing/outputting apparatus, the number of seals which are obtained by one photographing is limited and the seals are used as an application such that they are handed to the friends or are mailed. Therefore, a range where the seals are exchanged is limited.

OBJECTS AND SUMMARY OF THE INVENTION

An object of the invention is to provide information broadcasting method, information broadcasting system, and receiving apparatus for transmitting data other than programs through a digital broadcasting which enables a viewer serving as a receiver of information to selectively monitor an advertising and enables an advertising providing enterprise to efficiently make the viewer monitor the advertising.

Another object of the invention is to provide information broadcasting method, information broadcasting system, and receiving apparatus for transmitting data other than programs through a digital broadcasting which enables a viewer to selectively monitor detailed information concerning an advertising.

Still another object of the invention is to provide information broadcasting method, information broadcasting system, and receiving apparatus for transmitting data other than programs through a digital broadcasting which enables an enterprise which provides an advertising to easily collect a monitor history, audience ratings, and the like on an advertising unit basis.

Further another object of the invention is to provide information broadcasting method, information broadcasting system, and receiving apparatus for transmitting data other than programs through a digital broadcasting which can further widen a range of a partner who exchanges personal data by electronically exchanging personal data such as a face image or the like by using the digital broadcasting.

Further another object of the invention is to provide information broadcasting method, information broadcasting system, and receiving apparatus for transmitting data other than programs through a digital broadcasting which can transmit a large quantity of personal data to a number of subscribers at a high speed by using the digital broadcasting and can improve an operability for exchange of the personal data at a terminal.

Further another object of the invention is to provide information broadcasting method, information broadcasting system, and receiving apparatus for transmitting data other than programs through a digital broadcasting which makes it possible to easily manage terminals and can reduce a scale of hardware of the terminal by providing a gateway to collect a number of terminals by using the digital broadcasting.

According to the invention, there is provided an information broadcasting method using a digital broadcasting which can multiplex data of programs and data other than the programs and transmit the multiplexed data, wherein advertising information is multiplexed to a broadcasting signal and a target ID to identify a viewer class as a target of goods or services which are advertised by advertising information is added to the advertising information.

According to the invention, there is provided an information broadcasting system using a digital broadcasting which can multiplex data of programs and data other than the programs and transmit the multiplexed data, comprising: a transmitting side apparatus for multiplexing advertising information added with a target ID to identify a viewer class as a target of goods or services which are are advertized to a broadcasting signal and transmitting the multiplexed signal to a viewer; and a receiving apparatus for receiving the broadcasting signal to which the advertising information including the target ID has been multiplexed, collating a viewer attribute which has previously been registered with the target ID, and selecting advertising information in which both of them coincide.

According to the invention, there is provided a receiving apparatus of a digital broadcasting which can multiplex data of programs and data other than the programs and transmit the multiplexed data, wherein when receiving a broadcasting signal in which advertising information added with a target ID to identify a viewer class as a target of goods or services which are advertised has been multiplexed, a viewer attribute which has previously been registered is collated with the target ID, and advertising information in which both of them coincide is selected.

According to the invention, there is provided an information broadcasting method using a digital broadcasting which can multiplex data of programs and data other than the programs and transmit the multiplexed data, wherein advertising information added with link information indicative of a linking method of the advertising information and detailed information regarding an advertising and the detailed information are multiplexed to a broadcasting signal.

According to the invention, there is provided an information broadcasting system using a digital broadcasting which can multiplex data of programs and data other than the programs and transmit the multiplexed data, comprising a transmitting side apparatus for multiplexing advertising information added with link information indicative of a linking method of the advertising information and detailed information regarding an advertising and the detailed information to a broadcasting signal and transmitting the multiplexed information to a viewer; and a receiving apparatus for receiving the broadcasting signal and, when a viewer requests the detailed information, obtaining the requested detailed information from the broadcasting signal by using the link information.

According to the invention, there is provided a receiving apparatus of a digital broadcasting which can multiplex data of programs and data other than the programs and transmit the multiplexed data, wherein a broadcasting signal in which advertising information added with link information indicative of a linking method of the advertising information and detailed information regarding an advertising and the detailed information have been multiplexed is received, and when a viewer requests the detailed information, the requested detailed information is obtained from the broadcasting signal by using the link information.

According to the invention, there is provided an information broadcasting method using a digital broadcasting which can multiplex data of programs and data other than the programs and transmit the multiplexed data, wherein advertising information added with link information indicative of a linking method of the advertising information and detailed information regarding an advertising is multiplexed to a broadcasting signal and the detailed information is obtained from an information providing station other than the broadcasting signal on the basis of the link information.

According to the invention, there is provided an information broadcasting system using a digital broadcasting which can multiplex data of programs and data other than the programs and transmit the multiplexed data, comprising: a transmitting side apparatus for multiplexing advertising information added with link information indicative of a linking method of the advertising information and detailed information regarding an advertising to a broadcasting signal and transmitting the multiplexed signal to a viewer; and a receiving apparatus for receiving the broadcasting signal and, when the viewer requests the detailed information, obtaining the requested detailed information from an information providing station other than the broadcasting signal by using the link information.

According to the invention, there is provided a receiving apparatus of a digital broadcasting which can multiplex data of programs and data other than the programs and transmit the multiplexed data, wherein a broadcasting signal in which advertising information added with link information indicative of a linking method of the advertising information and detailed information regarding an advertising has been multiplexed is received, and when a viewer requests the detailed information, the requested detailed information obtained from an information providing station other than the broadcasting signal by using the link information.

According to the invention, there is provided an information broadcasting system comprising: a receiving apparatus constructed by image input means for inputting an image of a person who makes personal data, output means for outputting the personal data, input means, communicating means, and receiving means of a digital broadcasting; a server for receiving the personal data from the receiving apparatus, transmitting the personal data to the receiving apparatus, and managing the personal data; and two-way communicating means for coupling a plurality of receiving apparatuses and the server, wherein the personal data can be electronically exchanged among the receiving apparatuses by using the server and the two-way communicating means.

According to the invention, there is provided a receiving apparatus comprising: image input means for inputting an image of a person who makes personal data; output means for outputting the personal data; input means; communicating means; and receiving means of a digital broadcasting, wherein the personal data is electronically exchanged by using the communicating means, server, and two-way communicating means.

According to the invention, there is provided an information broadcasting system comprising: a receiving apparatus constructed by image input means for inputting an image of a person who makes personal data, output means for outputting the personal data, input means, and receiving means of a digital broadcasting; a gateway which includes a storing device and communicating means, is connected to a plurality of receiving apparatuses, receives the personal data from those plurality of receiving apparatuses, and sends the personal data to the plurality of receiving apparatuses; a server for receiving the personal data from the gateway, transmitting the personal data to the gateway, and managing the personal data; and two-way communicating means for coupling a plurality of gateways and the server, wherein the personal data can be electronically exchanged among the receiving apparatuses through the gateway by using the server and the two-way communicating means.

According to the invention, there is further provided a receiving apparatus system comprising: a receiving apparatus constructed by image input means for inputting an image of a person who makes personal data, output means for outputting the personal data, input means, and receiving means of a digital broadcasting; and a gateway which includes a storing device and communicating means, is connected to a plurality of receiving apparatuses, receives personal data from those plurality of receiving apparatuses, and sends the personal data to those plurality of receiving apparatuses, wherein the personal data is electronically exchanged by using the communicating means, a server, and two-way communicating means.

The above and other objects and features of the present invention will become apparent from the following detailed description and the appended claims with reference to the accompanying drawings.

BRIEF DESCRIPTION OF THE DRAWINGS

FIGS. 5A to 5C are flowcharts for use in explanation of the operation of the embodiment of the invention;

FIG. 28 is a schematic diagram showing a specific example of a screen display of a monitor provided at a terminal in the embodiment of the invention;

FIG. 29 is a schematic diagram showing a specific example of a screen display of a monitor provided at a terminal in the embodiment of the invention;

FIG. 32 is a schematic diagram showing a specific example of a screen display of a monitor provided at a terminal in the embodiment of the invention;

FIG. 33 is a schematic diagram showing a specific example of a screen display of a monitor provided at a terminal in the embodiment of the invention;

FIG. 45 is a schematic diagram showing a specific example of a screen display of a monitor provided at a terminal in the embodiment of the invention;

FIG. 46 is a schematic diagram showing a specific example of a screen display of a monitor provided at a terminal in the embodiment of the invention;

FIG. 57 is a schematic diagram showing an example of a monitor display for use in explanation of the invention;

DETAILED DESCRIPTION OF THE PREFERRED EMBODIMENTS

Figure 1:
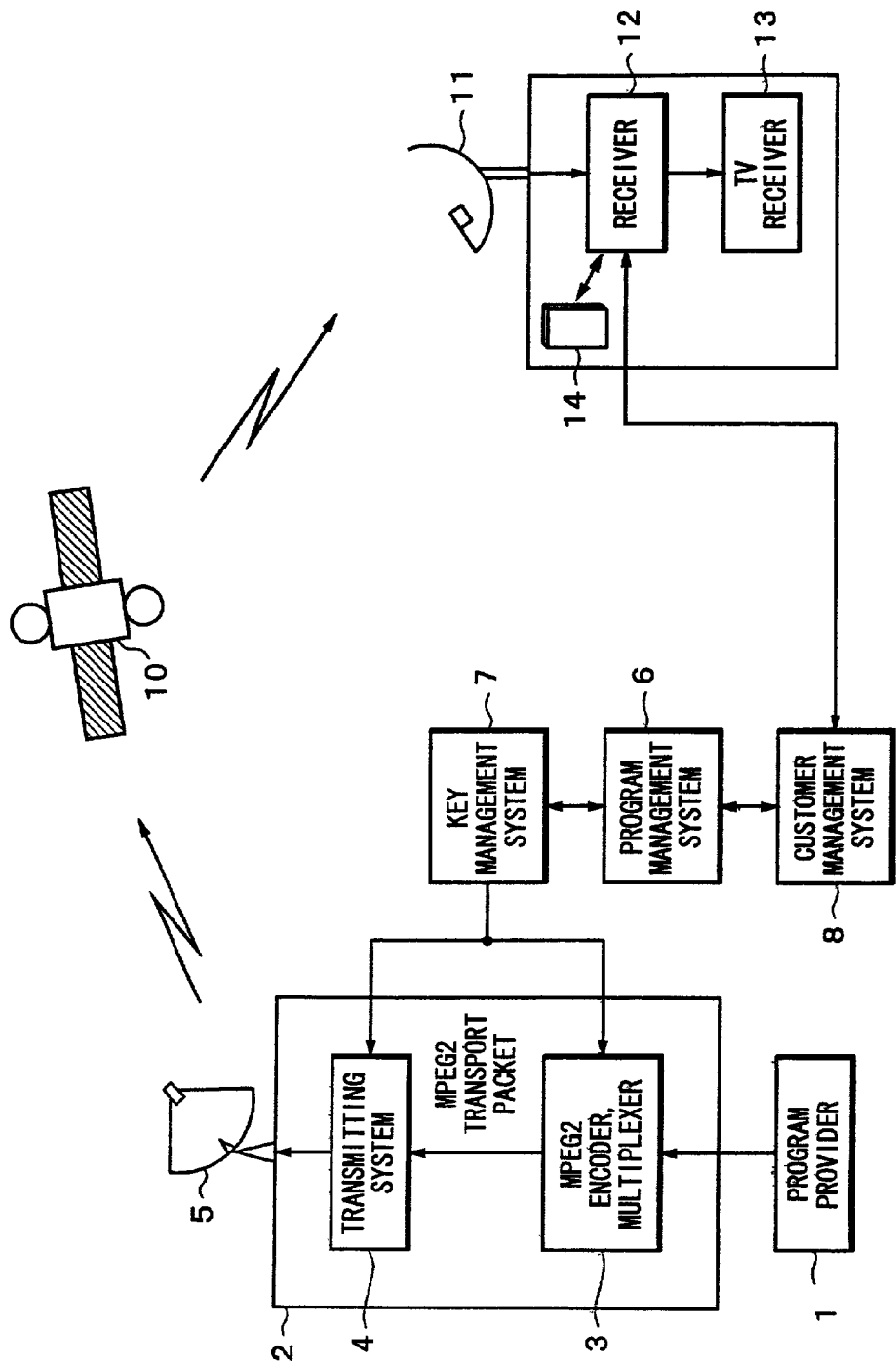
FIG. 1 is a block diagram for use in explanation of an example of a conventional digital broadcasting system.
Figure 2:
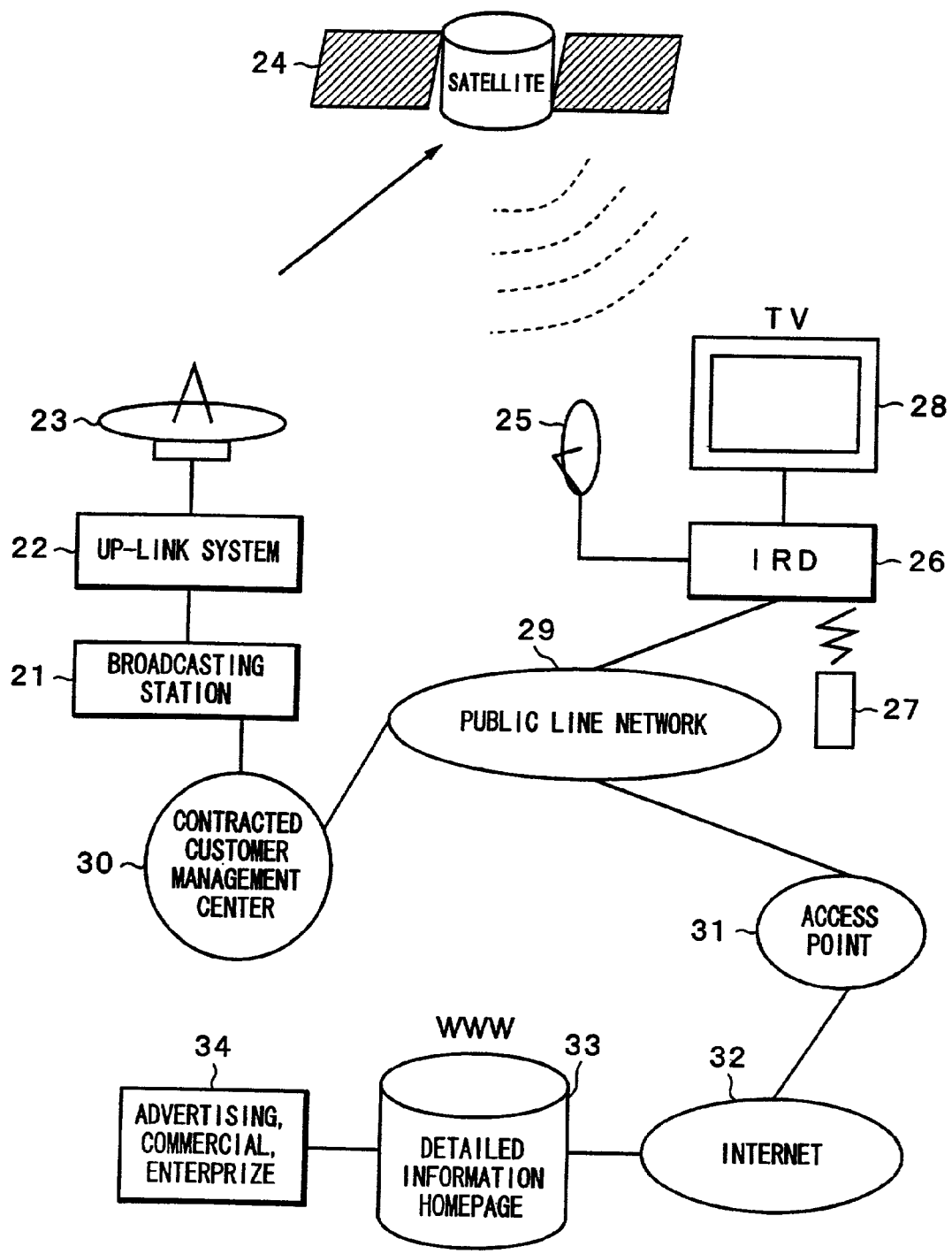
FIG. 2 is a block diagram showing a system construction of an embodiment of the invention.

An embodiment of the invention will now be described hereinbelow with reference to the drawings. FIG. 2 shows a whole system of an embodiment of the invention. As shown in FIG. 2, the system on the transmitting side is constructed by a broadcasting station 21 for producing programs; an up-link system 22; a transmission antenna 23, and a contracted customer management center 30.

In FIG. 2, reference numeral 24 denotes, for example, a communicating satellite (CS). Transponders of the number corresponding to the number of transport streams are installed in the communicating satellite 24. A radion wave signal transmitted from the ground through the up-link system 22 and transmitting antenna 23 is received, is frequency converted, is amplified, and is again transmitted to the ground. Programs, data for control (ECM, EEM, etc.), EPG, and the like are multiplexed to a broadcasting signal in a manner similar to an ordinary digital broadcasting. In the invention, advertising information and advertising detailed information are further multiplexed to the broadcasting signal as data different from program data.

The receiving terminal is constructed by a receiving antenna 25, an IRD 26, a video display apparatus 28, and an external control apparatus 27. The IRD 26 and contracted customer management center 30 are constructed so as to be properly connected by a public line network 29. The IRD 26 is connected to an advertising detailed information homepage 33 through the public network 29, an access point (relay connecting point) 31, a network such as an internet 32, and software such as WWW (World Wide Web) or the like. The homepage 33 is formed by an enterprise 34 which provides an advertising.

The advertising detailed information is associated to advertising information which is transmitted by the digital broadcasting and is more detailed information regarding goods and services which are advertised by the advertising information. As for the detailed information, a route for multiplexing it to a broadcasting signal and transmitting and a route for transmitting it via the internet 32 are prepared. In the invention, the advertising detailed information is not indispensable but only the advertising information added with the target ID can be also transmitted.

Figure 3:
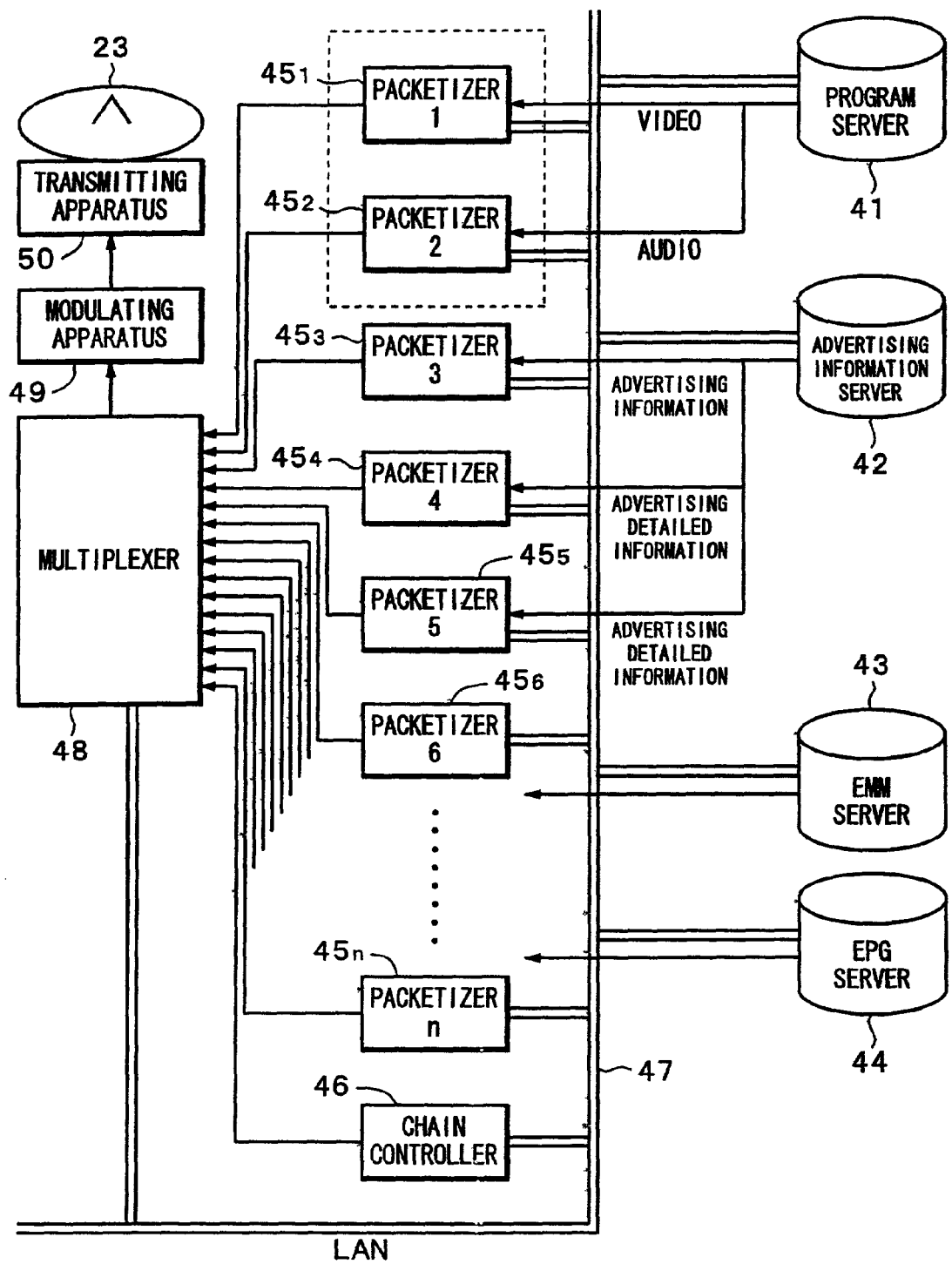
FIG. 3 is a block diagram of an example of a construction on the transmitting side in the embodiment of the invention.

As shown in FIG. 3, the up-link system 22 is constructed: by servers 41, 42, 43, and 44; n packetizers $45_1$ to $45_n$; a chain controller 46; a multiplexer 48; a modulating apparatus 49; and the like. The servers 41 to 44, n packetizers $45_1$ to $45_n$, chain controller 46, and multiplexer 48 are connected by an LAN (Local Area Network) 47, respectively.

In the broadcasting station 21, a program is produced and video/audio signals corresponding to the program are compressed and encoded by, for example, MPEG2, so that they are digitized and this program material is accumulated in the server 41 of the up-link system 22. The advertising information added with a target ID for specifying a viewer class as a target of goods and services regarding the advertising and the advertising detailed information as more detailed information regarding the goods and services are accumulated in the server 42. The advertising information and the advertising detailed information are data of any one or more of a video image, audio, animation, a still image, an icon, a text, and the like.

The target ID is specified in a manner similar to the viewer attribute information registered in an IC card unit of each receiving terminal. That is, the target ID is used to specify a range of consumer or purchase layer to which the enterprise wants to provide the goods and services concerning the advertising. Specifically speaking, the target ID has information such as sex, age, district, hobby, and the like. In the broadcasting signal, the target ID is added to the head of a series of advertising data. For example, a viewer attribute is registered in an IC card which is handed to the subscriber after he made a contract of the digital broadcasting.

The advertising detailed information is video and/or audio information of the contents to describe in more detail goods and services which are provided to the viewer. As a method of providing the advertising detailed information, as shown in the construction of FIG. 3, a method of multiplexing it to a digital broadcasting signal and a method of providing it from an information providing station other than the broadcasting signal are prepared. In this example, the detailed information is provided from the detailed information homepage 33 as an information providing station through the access point 31 and internet 32 as shown in FIG. 2 and as mentioned above. When the advertising detailed information is transmitted by the broadcasting signal, an accessing method of the detailed information in the broadcasting signal associated to the advertising information is specified by the link information included in the advertising information. For instance, a packet ID including the advertising detailed information is designated.

In case of obtaining the detailed information through the internet 32, the accessing method of the detailed information associated to the advertising information is specified by the link information included in the advertising information. For example, the link information includes the address information of a client such as URL (Uniform Resource Locator) of the detailed information homepage 33 of the internet 32.

The advertising information with the target ID which is not accompanied with the detailed information is also multiplexed into the broadcasting signal. In case of the advertising information accompanied with the detailed information, for example, an icon such that the advertising information is provided at a predetermined position in the program for a predetermined time is set. The advertising detailed information provided by clicking the icon by the viewer of the program.

An EMM that is peculiar to each receiving terminal is accumulated in the server 43 shown in FIG. 3. Further, an EPG is accumulated in the server 43. Moreover, although not shown, another server is provided and, for example, an ECM which is used as common information upon reception is accumulated in the other server.

The chain controller 46 forms control signals for the servers 41 to 44, n packetizers $45_1$ to $45_n$, and multiplexer 48 and controls them in accordance with a schedule designated by a PMS (Program Management System) and executes a systematic transmission control due to the time designation, respectively.

The video data from the server 41 is supplied to the packetizer $45_1$. The audio data from the server 41 is supplied to the packetizer $45_2$. Advertising information data from the server 42 is supplied to the packetizer $45_1$. The advertising detailed information data from the server 42 is supplied to the packetizer $45_4$. The advertising detailed information data from the server 42 is supplied to the packetizer $45_5$. With respect to the packetizers after the packetizer $45_6$, various data such as EMM, EPG, ECM, and the like are also similarly supplied.

Each of the packetizers $45_1$ to $45_n$ divides a data train which is supplied into blocks, adds predetermined control information, and converts into a predetermined transmission unit format (namely, packet). In the packetizers $45_1$ and $45_2$, each of the video/audio data is packed into a packet of a length of, for example, 188 bytes and is subjected to a pre-process for multiplexing and the processed data is supplied to the multiplexer 48. In the packetizers $45_3$, $45_4$, and $45_5$, each of the advertising information data added with the target ID and the advertising detailed information data is packed into the packet and the data of the packet format is supplied to the multiplexer 48. Even in the packetizers after the packetizer 45₆ as well, a converting process to the packet is likewise executed and the processed data is supplied to the multiplexer 48.

In the multiplexer 48, the data from the packetizers 45₁ to 45₂ is time-divisionally multiplexed, so that a transport stream is formed. This multiplexed output is supplied to a modulating apparatus 49. The modulating apparatus first executes a scrambling process of every packet and an error correction encoding of every packet and executes, for instance, a QPSK (Quadrature Phase Shift Keying) modulation to the transport stream. A modulation output formed by the modulating apparatus 49 is transmitted to the communicating satellite 24 through a transmitting apparatus 50 and the transmitting antenna 23. The scrambling process is a process for realizing the conditional access which is used to control the permission or inhibition of the monitoring every viewer. A key to descramble the scramble is included in the EMM and ECM and is inserted as one of the packets into the transport stream in a manner similar to the video/audio information and the advertising information.

Figure 4:
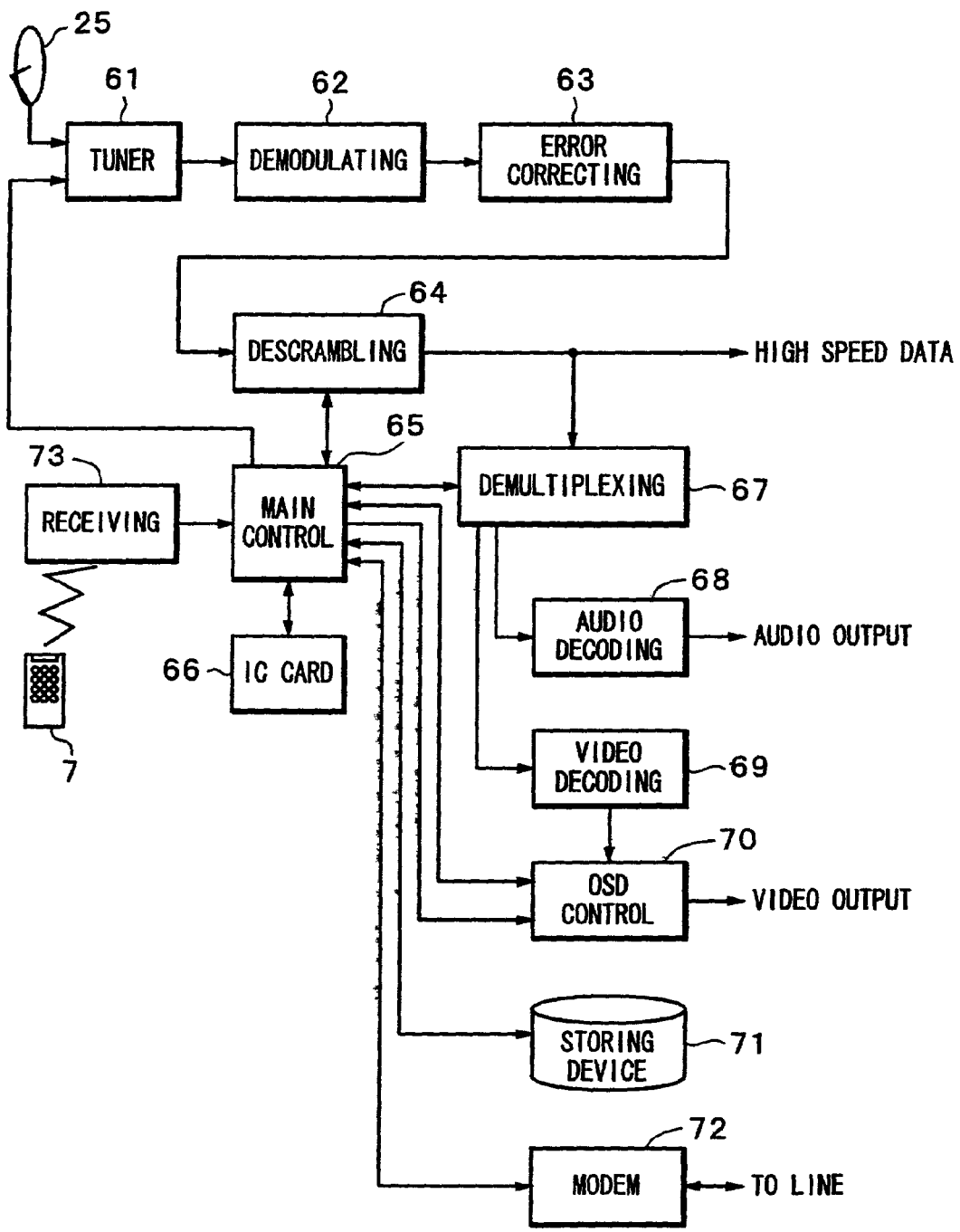
FIG. 4 is a block diagram of an example of a construction on the receiving side in the embodiment of the invention.

FIG. 4 shows a construction of an example of the receiving terminal. A broadcasting radio wave is transmitted from the transmitting antenna 23 and is received by the receiving antenna 25 through the communicating satellite 24. The IRD is connected to the receiving antenna 25. The receiving antenna 25 has an LNB (Low Noise Block down converter). The received radio wave signal is frequency converted and its output is supplied to the IRD.

The IRD 26 comprises: a tuner unit 61 for designating a receiving transponder; a demodulating unit 62; an error correcting unit 63; a descrambling unit 64 for descrambling a scramble; a demultiplexing unit 67 for designating a packet to be separated; a video decoding unit 69; an audio decoding unit 68; an OSD (On Screen Display) control unit 70 for controlling a display picture plane; and the like.

In FIG. 4, reference numeral 65 denotes a main control unit. The main control unit 65 controls the whole IRD 26 and is constructed by, for instance, a microcomputer or the like. An IC card unit 66, the demultiplexing unit 67, the OSD control unit 70, a storing device 71, and a modem unit 72 are connected to the main control unit 65 through a data bus, respectively.

In the tuner unit 61, a signal of a frequency which is designated on the basis of the control signal from the main control unit 65 is extracted from the received radio wave signal. The QPSK modulated signal is demodulated by the demodulating unit 62. A demodulation output is supplied to the error correcting unit 63. In the error correcting unit 63, errors in the reception data are corrected and a decoding output is supplied to the descrambling unit 64. In the error correcting unit 63, a decoding process of a Viterbi decoding and a Peed solomon code is executed.

The key which was previously transmitted by the EMM or the like and was recorded in the IC card unit 66 is read out and a descramble performed in the descrambling unit 64. The transport stream obtained from the scrambling unit 64 is supplied to the demultiplexing unit 67. In addition to the key for descrambling, a viewer attribute, a program monitor history, an advertising information monitor history, and a link information use history are recorded in the IC card unit 66.

In the demultiplexing unit 67, the packets in the transport stream are classified in accordance with an instruction of the main control unit 65. That is, the audio packet of a service channel selected at present is supplied to the audio decoding unit 68 and the video packet is supplied to the video decoding unit 69. In the audio decoding unit 68, the audio data is decoded and is further D/A converted, so that a reception audio signal is formed. The reception audio signal is generated as a sound by a speaker. In the video decoding unit 69, the video data is decoded and is further D/A converted and a reception video signal is formed. The reception video signal is supplied to the OSD control unit 70.

The packet of the data (ECM, EEM, or the like) for control in the broadcasting signal and the packet of the advertising information are separated by the demultiplexing unit 67 and supplied to the main control unit 65. The packet of the advertising information added with the target ID is temporarily stored in the storing device 71 under control of the main control unit 65. The advertising detailed information designated by the link information in the advertising information is separated by the demultiplexing unit 67. By controlling the OSD control unit 70 or by being decoded by the decoding units 68 and 69, the advertising detailed information is outputted in a real-time manner.

In the embodiment, although the advertising information is temporarily stored in the storing device 71, it is also possible to separate the packet of the advertising information having the target ID which coincides with the viewer attribute information by the demultiplexing unit 67 and to output it in a real-time manner.

The OSD control unit 70 is controlled by the main control unit 65. In the OSD control unit 70, an image such as a menu picture plane or the like is superimposed. The processed video signal is displayed as a picture plane. For example, in case of using an advertising icon as advertising information, the main control unit 65 controls the OSD control unit 70 and displays the advertising icon into the picture plane for a predetermined time.

As mentioned above, the received advertising information is temporarily stored into the storing device 71 under the control of the main control unit 65. The main control unit 65 collates the target ID of the stored advertising information with the viewer attributes showing the sex, age, monitor district, hobby, and the like of the viewer which have previously been registered in the IC card unit 66, extracts only the advertising information in the case where they coincide, and supplies the extracted advertising information data to the OSD control unit 70.

A remote control signal from the remote control commander (external control apparatus) 27 is received by a receiving unit 73. Input information which is transmitted by a remote control signal is supplied to the main control unit 65. The main control unit 65 executes a process according to the remote control signal. For example, the operation to click the advertising icon, the operation to finish the display of the advertising detailed information, and the like can be performed by the operation of the commander 27. As an input device, a keyboard, a mouse, or the like other than the remote control can be used.

The modem unit 72 is connected to the main control unit 65. The modem unit 72 is connected to the public line network 29. Thus, the receiving terminal (IRD 26) and the contracted customer management center 30 are connected. The viewer information such as program monitor history, advertising information monitor history, link information use history, and the like recorded in the IC card unit 66 can be up-loaded by the contracted customer management center 30. To obtain the detailed information for advertising and publicity from the homepage 33, browser software of WWW is also installed in the main control unit 65.

Figure 5B:
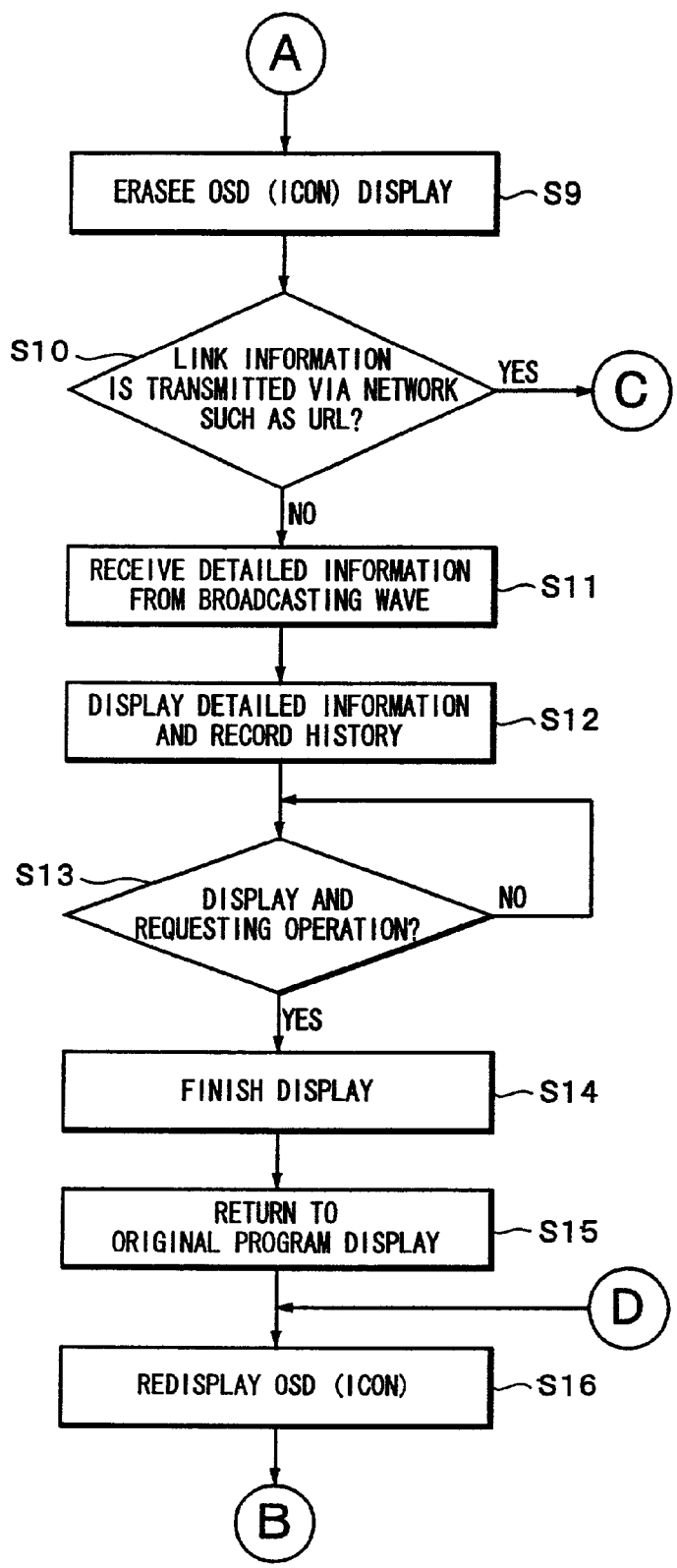
Figure 5C:
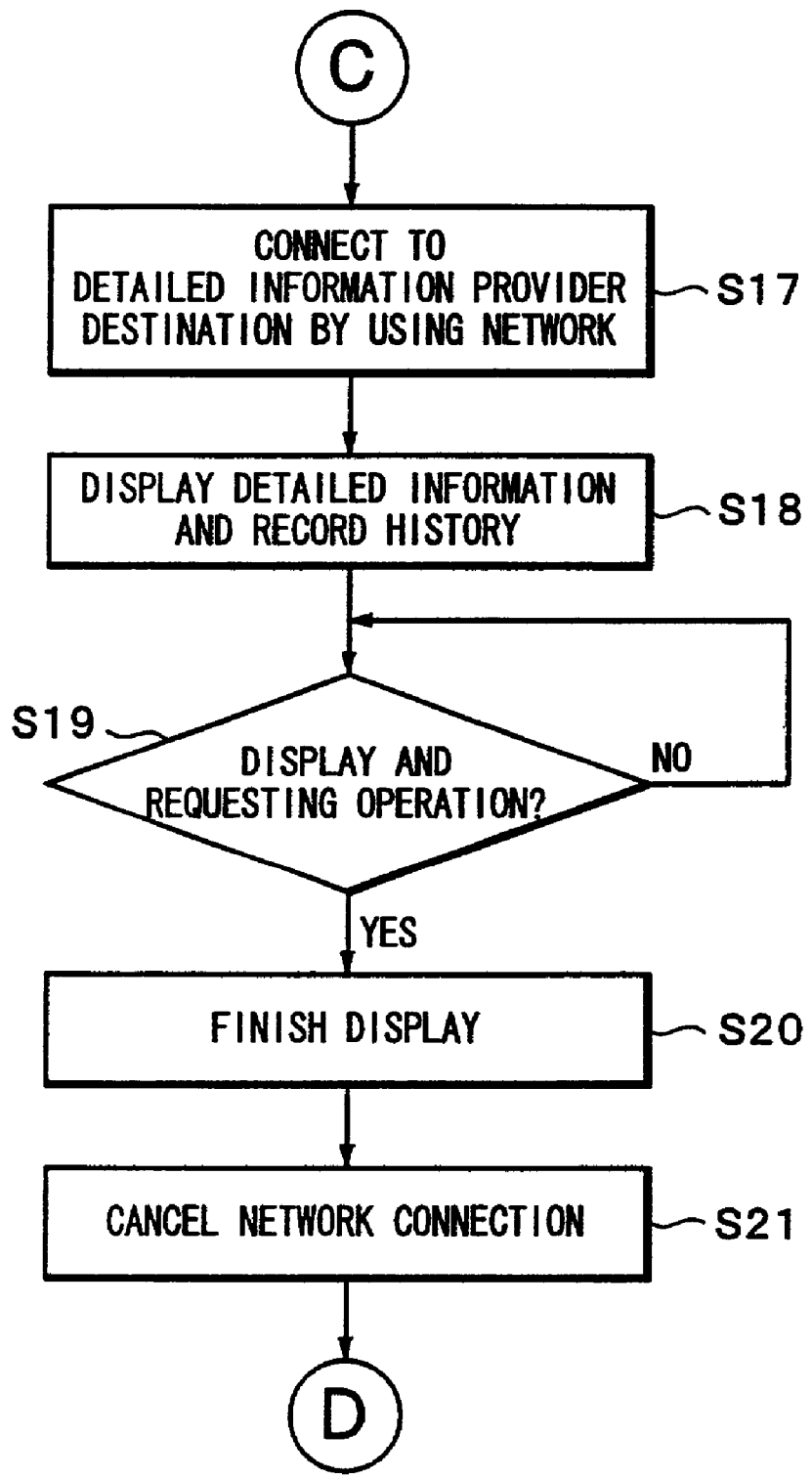

FIGS. 5A to 5C are flowcharts showing processes on the terminal side according to the embodiment of the invention mentioned above. First, a predetermined channel is received and the presence or absence of the packet of the advertising information data is determined in parallel with the receiving process (step S1). If there is no advertising information, the processing routine is finished. When the advertising information is received, the advertising information is temporarily stored in the storing device 71 (step S2).

The target ID of the preserved and received advertising information is collated with the viewer attributes (sex, age, district, etc.) which have previously been recorded in the IC card unit 66 and the advertising information in which both of them coincide is selectively read out from the storing device 71 (step S3). The extracted advertising information data is supplied the OSD control unit 70 and the advertising icon is displayed in the picture plane. For example, as shown at the top stage in FIG. 6, an advertising icon 81 is displayed in a part of a picture plane 80 which is displaying the program (step S4).

When the advertising icon 81 is displayed, if the viewer who watches the program wants to know more detailed information, he operates the commander 27 and clicks the advertising icon 81. Whether the icon 81 has been clicked or not, namely, the presence or absence of the operation to request the display of the advertising detailed information is determined (step S5). When there is no display request of the advertising detailed information, the processing routine advances to step S7. In step S7, a check is made to see if a display end time of the advertising icon 81 has come. When the display end time comes, the display of the advertising icon 81 is turned off in step S8 and the processing routine is finished. A display time of the advertising icon is controlled by, for example, a timer.

In step S5, when the presence of the operation to request the display of the advertising detailed information is decided, the presence or absence of the link information added in the advertising information data is determined (step S6). When there is not the link information showing an obtaining route of the advertising detailed information, the processing routine advances to step S7 and the advertising icon is erased after the elapse of a predetermined time.

In step S6, the presence of the link information is determined, the advertising icon 81 is erased in step S9. In step S10, the obtaining route of the advertising information is discriminated. In step S10, when the obtaining route of the advertising detailed information is determined to be the broadcasting wave shown by the link information, the detailed information is received from the broadcasting wave in step S11. For example, it is now assumed that the link information shows the packet ID (PID) and the packet having such a packet ID is received.

Figure 6:
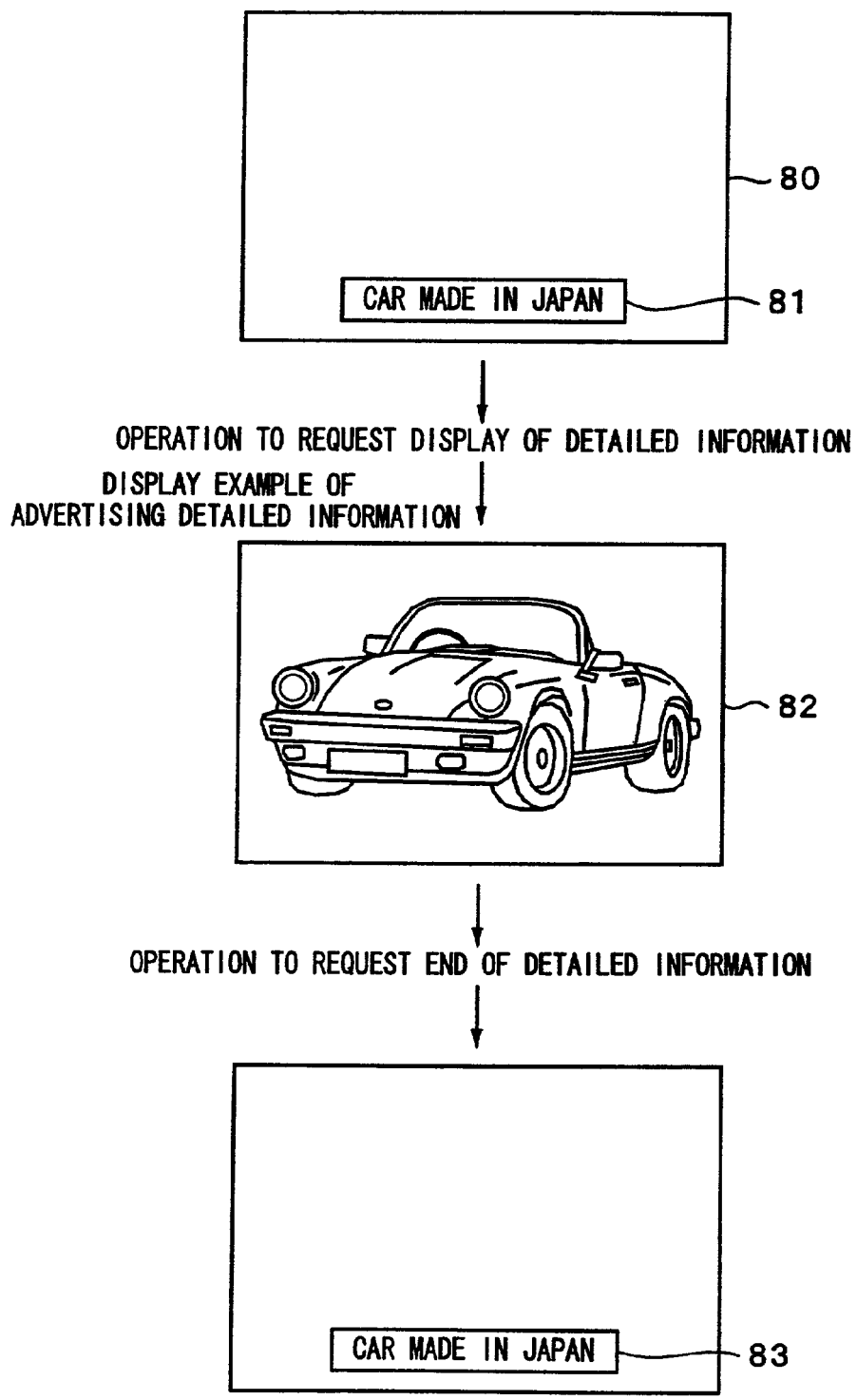
FIG. 6 is an external view of a display picture plane for use in explanation of the embodiment of the invention.

In step S12, the picture plane showing the advertising detailed information based on the received advertising detailed information data is displayed by the OSD and the audio signal of the advertising detailed information is outputted. That is, the advertising detailed information is outputted in a real-time manner. A picture plane 82 at the middle stage in FIG. 6 shows a display example of the advertising detailed information. In the example of the diagram, although the picture plane 82 of the advertising detailed information is displayed in place of the picture plane of the program, various display forms are possible. For example, the advertising detailed information can be also displayed by a PinP (master picture plane and slave picture plane) format, PandP (right and left divisional picture planes), or the like. Further, a plurality of picture planes of the advertising detailed information can be simultaneously displayed by divisional picture planes or a plurality of picture planes can be also displayed while sequentially transmitting one picture plane by one. Furthermore, the advertising detailed information can be also displaced in another display picture plane different from the display picture plane of the program. When the detailed information is displayed (outputted), the detailed information monitor history is recorded in the IC card unit 66. In this case, the number of times of the requesting operation of the detailed information can be also recorded in the IC card unit 66.

When the picture plane 82 of the advertising detailed information is displayed, the presence or absence of the display finishing operation using the remote control is determined (step S13). When the display finishing operation is performed, the picture plane 82 of the advertising detailed information is erased in step S14. The display is returned to the former program picture plane in step S15. In step S16, an advertising icon shown at 83 is again displayed in FIG. 6. The processing routine is returned to step S7 of deciding the end of the display time.

In step S10, when it is determined that the obtaining route of the advertising detailed information shown by the link information is located on the network side, the modem unit 72 is controlled and dial-up connected to the provider (access point 31 in FIG. 2) of the internet in step S17 by using the link information (for instance, a telephone number of the provider of the internet, a password, and a URL of the homepage).

In step S18, a picture plane of the advertising detailed information similar to that shown in FIG. 6 is displaced. For example, a homepage designated by the URL is read out, fetched, and displayed by software to read the homepage which is called a "browser". When it is displayed, the detailed information monitor history is recorded in the IC card unit 66. The advertising detailed information can be also made differ depending on the obtaining route.

Subsequently, the presence or absence of the display finishing operation is determined in step S19 in a manner similar to step S13. When the display finishing operation is performed, the display of the picture plane 82 of the advertising detailed information is finished (step S20). Further, the connection to the internet 32 is released and it is disconnected from the homepage 33 of the detailed information for advertisement and publicity (step S21). Specifically speaking, the browser is finished and the connection to the access point 31 is shut off. The processing routine is returned to the display of the advertising icon in step S16.

As mentioned above, when there is a detailed information request during the display of the advertising icon, the detailed information is obtained and displayed. In the above process, when a toll program monitor history such as a monitor history or the like of the PPV is periodically or irregularly up-loaded, the detailed information monitor history recorded in the IC card unit 66 is notified to the contracted customer management center together with them.

As mentioned above, when the advertising detailed information is obtained via the internet, an access log can be performed in the homepage 33. Since the browser software name can be known in the homepage, the monitor history of the advertising detailed information can be also formed from the software name and the number of accessing times. For example, in case of the internet, as for the number of accesses, it can be counted by a CGI (Common Gateway Interface) and an SSI (Server Side Includes). At the same time, when and from which access point 31 and which link information and browser were used can be time-sequentially recorded as a history of the accesses.

In the embodiment of the invention, after the received advertising information was stored, the target ID and viewer attribute information are collated. However, it is also possible to construct such that when a broadcasting wave is received, the collation is performed and only the advertising information in which both of them coincide is stored in the storing device. Although the description up to the providing of the advertising detailed information has been made above, as a stage after providing, the operation to buy the advertised goods and services can be also performed. Further, although the embodiment of the invention has been described with respect to the construction using the internet, the other network can be also used. Moreover, the invention can be also applied to a digital broadcasting of a cable television or a digital broadcasting system of a ground wave.

In the example, it is assumed that the Karaoke terminal of the existing communication Karaoke or the existing IRD for CS digital broadcasting is commonly used and Karaoke data, personal data, or the like using a data broadcasting is received. That is, a function for exchange of personal data is newly added to the communicating Karaoke system which has already been established. The terminal, therefore, has the functions of the Karaoke terminal and the seal exchanging terminal.

Figure 7:
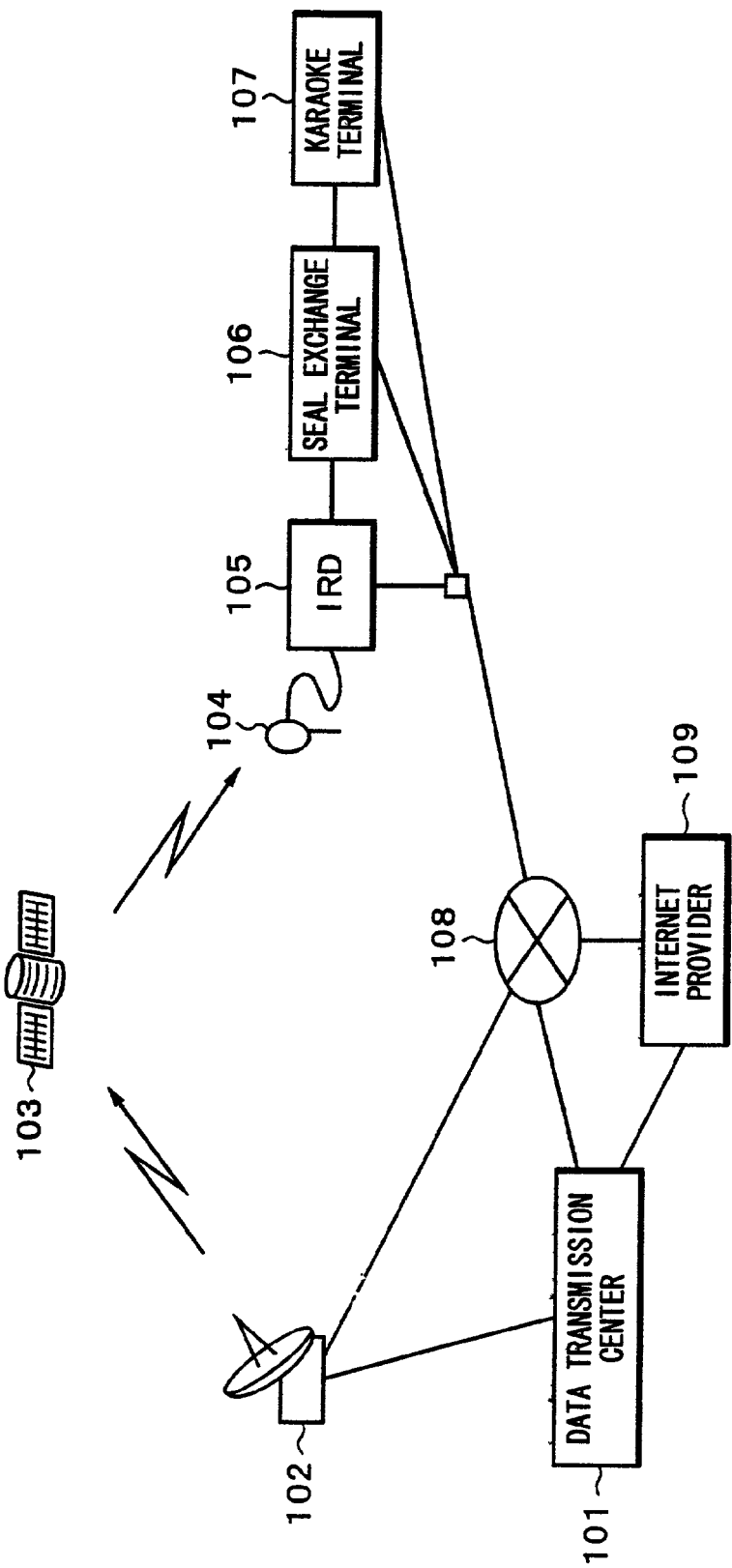
FIG. 7 is a block diagram showing an outline of a whole system in the embodiment of the invention.

FIG. 7 shows an embodiment of a Karaoke terminal of the communicating Karaoke using the IRD for CS digital broadcasting. In FIG. 7, reference numeral 101 denotes a data transmission center. The data transmission center 101 transmits Karaoke data (MIDI data, song music additional data, control data, and the like), personal data (seal data, additional information, detailed information, etc.), advertising and various information data, and the like. MIDI (Musical Instrument Digital Interface) is a code for musical instrument control.

The data from the data transmission center 101 is sent to a broadcasting (up-link) center 102. The broadcasting center 102 is a transmission center of a digital broadcasting. The broadcasting center 102 multiplexes and modulates the data sent from the data transmission center 101 and transmits to a communicating (or broadcasting) satellite 103. A radio wave from the satellite 103 is received by a receiving antenna 104 of the terminal.

An IRD 105 is connected to the receiving antenna 104. A seal exchange terminal 106 and a Karaoke terminal 107 are connected to the IRD 105. The terminal side is constructed by the receiving antenna 104, IRD 105, seal exchange terminal 106, and Karaoke terminal 107. Reference numeral 108 denotes a public line network and 109 indicates an internet provider. The internet provider 109 has a function as a server in a personal data exchange system.

The IPD 105 is a tuner for receiving a digital broadcasting and receives the data transmitted from the broadcasting center 102 through the satellite 103. In the system, a channel is set so as to always receive the present services (transmission and reception of Karaoke data and personal data). The IRD 105 transmits the data in which only the MPEG2 transport stream packet of the present services was descrambled to the seal exchange terminal 106. With regard to the digital broadcasting reception, accounting information is communicated to the broadcasting center 102 through the public line network 108.

The seal exchange terminal 106 is a terminal to provide services which are executed in the seal data exchange system to the user. Only the data of the present service is separated from the data received from the IRD 105, further, the Karaoke data and the other data are separated, and only the Karaoke data is transmitted to the Karaoke terminal 107. By a request or the like by the user of the seal exchange terminal, a transmitting request regarding various data such as personal data and the like is issued to the internet provider 109 through the public line network 108.

The Karaoke terminal 107 is a conventional communication Karaoke terminal and executes a reproduction of MIDI data, a display control of words, an acoustic special effect, and the like. A transmitting request of the Karaoke data is issued to the data transmission center 101 through the public line network 108. The data transmitted from the data transmission center 101 is transmitted from the seal exchange terminal 106 to the Karaoke terminal 107.

The public line network 108 is an analog/digital telephone line network of NTT or the like. The internet provider 109 receives the personal data formed by the seal exchange terminal 106 through the public line network 108 and preserves it. A personal data transmitting request is issued by a similar route.

As mentioned above, the transmitting request of the Karaoke data is performed by the Karaoke terminal 107 and the request of the personal data is performed by the seal exchange terminal 106. The Karaoke data exists in the data transmission center 101 and is transmitted through the broadcasting center 102 and satellite 103 in a manner similar to the digital broadcasting. The personal data such as seal data or the like is also similarly transmitted. The personal data is transmitted from the internet provider (server) 109 through the data transmission center 101. With regard to the use of each data, the seal exchange terminal 106 and Karaoke terminal 107 are connected to the data transmission center 101 by the public line network 108, thereby communicating the accounting information. Further, the IRD 105 and broadcasting center 102 are connected through the public line network 108, thereby communicating the accounting information concerning the data (digital broadcasting) reception.

Figure 8:
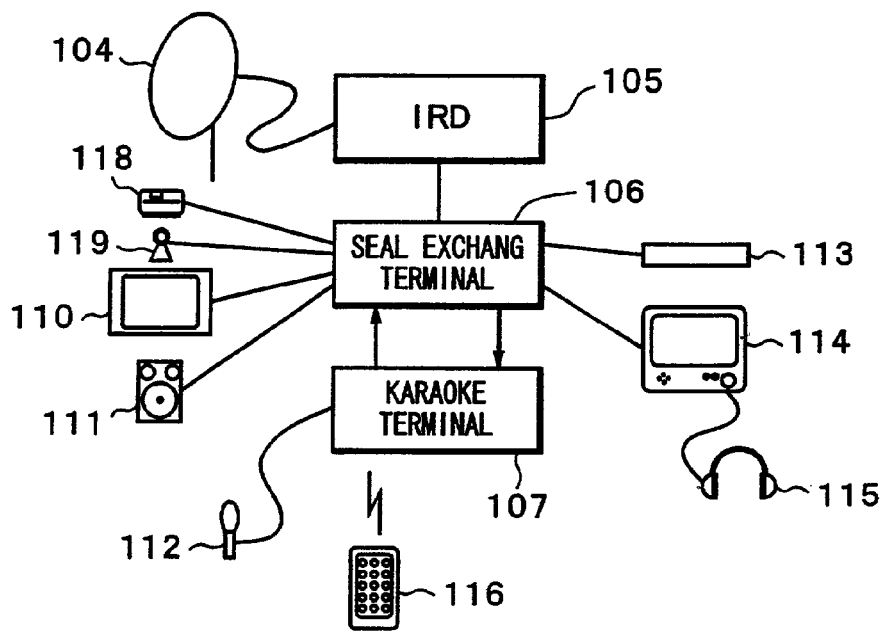
FIG. 8 is a block diagram showing an outline of a terminal in the embodiment of the invention.

FIG. 8 shows one constructional example of the terminal. The receiving antenna 104 is, for example, an antenna for receiving a CS digital broadcasting. The IRD 105 is an IRD for receiving a CS digital broadcasting. The IRD 105 always receives the present services, descrambles only the packet of the present services in the received MPEG2 transport stream packet, and outputs the transport stream from a data port. As shown in FIG. 7, the IRD 105 is connected to the public line network 108.

The seal exchange terminal 106 is connected to the IRD 105. A printer 118, a camera 119, a monitor 110 for displaying words of a song, a speaker 111, an input device 113 such as keys, mouse, and the like, a monitor 114, and headphones 115 are connected to the seal exchange terminal 106. A microphone 112 is connected to the Karaoke terminal 107 connected to the seal exchange terminal 106. The terminal 107 can be operated by a remote control commander 116.

The printer 118 prints seal data formed by the seal exchange terminal 106 and seal data exchanged to that of the other person. The seal data denotes image data (typically, face image data) included in the personal data. The printer 118 is connected to a serial output terminal of the seal exchange terminal 106.

The camera 119 is used to form the seal data by the seal exchange terminal 106 and is connected to a serial output terminal of the seal exchange terminal 106. The monitor 110 for displaying the words is used for displaying words and background video image at the time of the Karaoke and for displaying an image monitor and additional information input picture plane at the time of the formation of the seal data. The monitor 110 is connected to a video output terminal of the seal exchange terminal 106 so that it can be switched in accordance with the Karaoke mode or the seal data forming mode. That is, the video output to the monitor 110 is switched by a selector in the seal exchange terminal 106. The speaker 111 generates musical pieces and an audio message of the personal data and is connected to an audio output terminal of the seal exchange terminal 106.

The microphone 112 is used to sing Karaoke songs and to input the audio message of the personal data. An audio signal is outputted from an audio output terminal of the Karaoke terminal 107 to the speaker 111 through the seal exchange terminal 106. When audio additional information is inputted, the audio additional information is sampled and compressed in the seal exchange terminal 106.

The seal exchange terminal 106 executes processes of all of the services other than Karaoke among the present services. As shown in FIG. 7, in order to request the data transmission, the seal exchange terminal 106 is connected to the internet provider (server; through the public line network 108 so that a two-way communication can be performed.

As for the Karaoke service, only the Karaoke data is extracted from the packet of the transport stream received from the IRD 105 and is outputted to the Karaoke terminal 107 and, at the same time, the video/audio signals are received and outputted to the monitor 110 for displaying the words and the speaker 111.

With respect to the formation of the seal data, seal data and auxiliary information are formed from the seal data related data received from the IRD 105, video input from the camera 119, command input of the user from the input device 113, and the like and are connected to the public line network 108 and are preserved in the server.

With regard to the display of the seal data, the seal data, auxiliary information, and the like which are transmitted by the digital broadcasting and received from the IRD 105 can be monitored by the monitor 114 for displaying the personal data and headphones 115. In this instance, commands from the user are inputted by using the input device 113. The input device 113 have charge of all of the command inputs from the user except for Karaoke among the present services and is connected to a serial input terminal of the seal exchange terminal 106.

The monitor 114 for displaying the personal data is used for persons other than the singer to refer to the seal data during the Karaoke and is connected to a video/audio output terminal of the seal exchange terminal 106. The input of the commands from the user at the time of referring to the seal data or the like is performed by using the input device 113.

When the persons other than the singer refer to the seal data during the Karaoke, the headphones 115 are used in order to reproduce and listen to the audio message of the additional information. The headphones 115 are connected to a headphone terminal of the monitor 114 for displaying the personal data.

As for the Karaoke terminal 107, an existing Karaoke terminal is used as it is. The Karaoke data is received from the seal exchange terminal 106 and the video/audio signals are outputted. As shown in FIG. 7, the Karaoke terminal 107 is connected to the public line network 108 in order to request the transmission of data such as song data for communication Karaoke or the like. As a remote control commander 116 for Karaoke, an existing music selecting remote control for Karaoke is used. The remote control 116 transmits an infrared signal to the Karaoke terminal 107.

As mentioned above, at the terminal, as the monitor 110 for displaying the words, speaker 111, microphone 112, and remote control 116, those equipped for the existing Karaoke terminal can be commonly used.

In case of the terminal shown in FIG. 8, one IRD 105, one seal exchange terminal 106, and one Karaoke terminal 107 are provided. Actually, there are a plurality of rooms in a Karaoke shop and in many cases, the terminal is installed in each room. In such a case, in FIG. 9, it is proper to collectively control a plurality of seal exchange terminals 106a, 106b, and 106c and Karaoke terminals 107a, 107b, and 107c by a control unit (called a gateway) 150. The gateway 150 and seal exchange terminals 106a to 106c are connected by a network. The Karaoke terminals 107a to 107c are connected to the seal exchange terminals, respectively.

Figure 9:
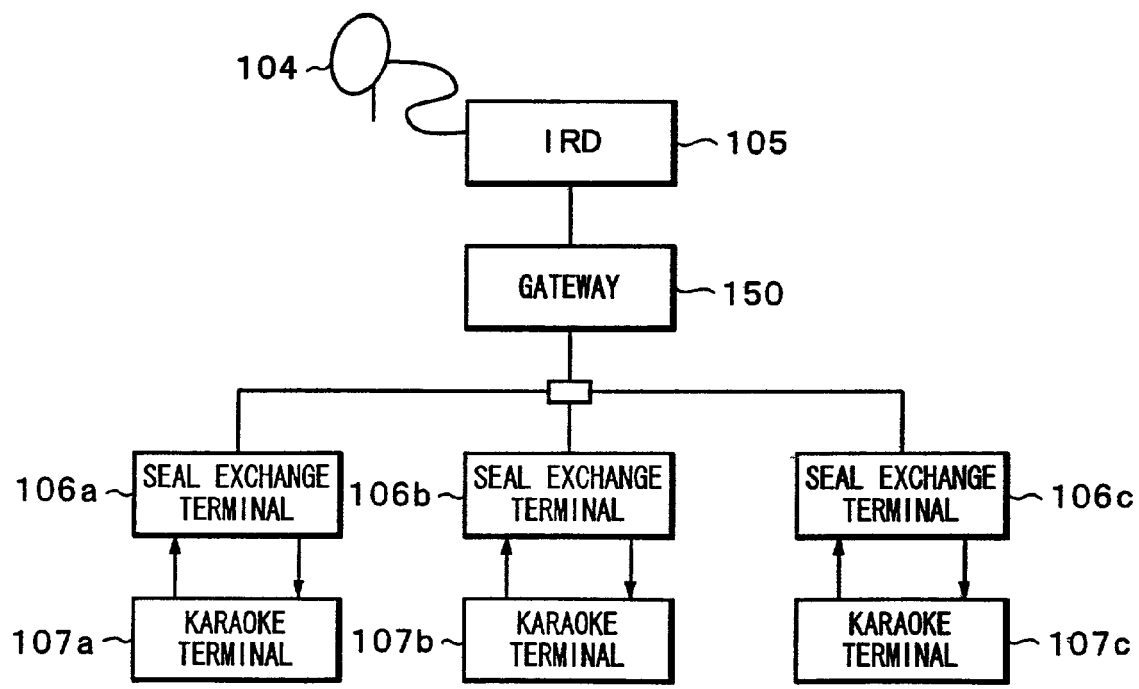
FIG. 9 is a block diagram showing an outline of a terminal system having a gateway in the embodiment of the invention.

As mentioned above, processes such as reception from the IRD, call generation to the internet provider, and the like which are executed by the seal exchange terminal are collected by the gateway 150, so that the simplification of the system, reduction of a communication fee, and the like can be realized. In FIG. 9, the printer, camera, monitor for displaying the words, speaker, microphone, input device, monitor for displaying the personal data, headphones, and remote control for the Karaoke terminal which are connected to the seal exchange terminals 106a to 106c and Karaoke terminals 107a to 107c as shown in FIG. 8 are not shown.

The gateway 150 transmits the Karaoke data and personal data in the packet received from the IRD 105 to the seal exchange terminals 106a to 106c through the network. Although not shown in FIG. 9, the gateway 150 is connected to the public line network in order to register the personal data into the server and to request the data transmission of the personal data exchange service and executes processes in response to the request from each seal exchange terminal.

The seal exchange terminals 106a to 106c execute processes of all of the services except for Karaoke among the present services. With respect to the Karaoke service, only the Karaoke data is extracted from the data received from the gateway 150 and outputted to the Karaoke terminals 107a to 107c and, at the same time, the video/audio signals are received and outputted to the monitor/speaker for displaying the words.

With respect to the formation of the personal data, only the personal data is extracted from the data received from the gateway 150, the seal data and additional information are formed from the personal data related data, video input from the camera, command inputs of the user from the input device, and the like, a data preservation is requested to the gateway 150, and the data is transferred.

With regard to the display of the seal data, the seal data, additional information, and the like received from the gateway 150 can be monitored by the monitor for displaying the personal data and the headphones. The command input from the user at that time is executed by using the input device.

The Karaoke terminals 107a to 107d are existing communication Karaoke terminals. The Karaoke data is received from the seal exchange terminals 106a to 106c and the video/audio signals are outputted. A request to transmit data such as song data for communication Karaoke or the like is transmitted through the gateway 150 and public line network 108.

Figure 10:
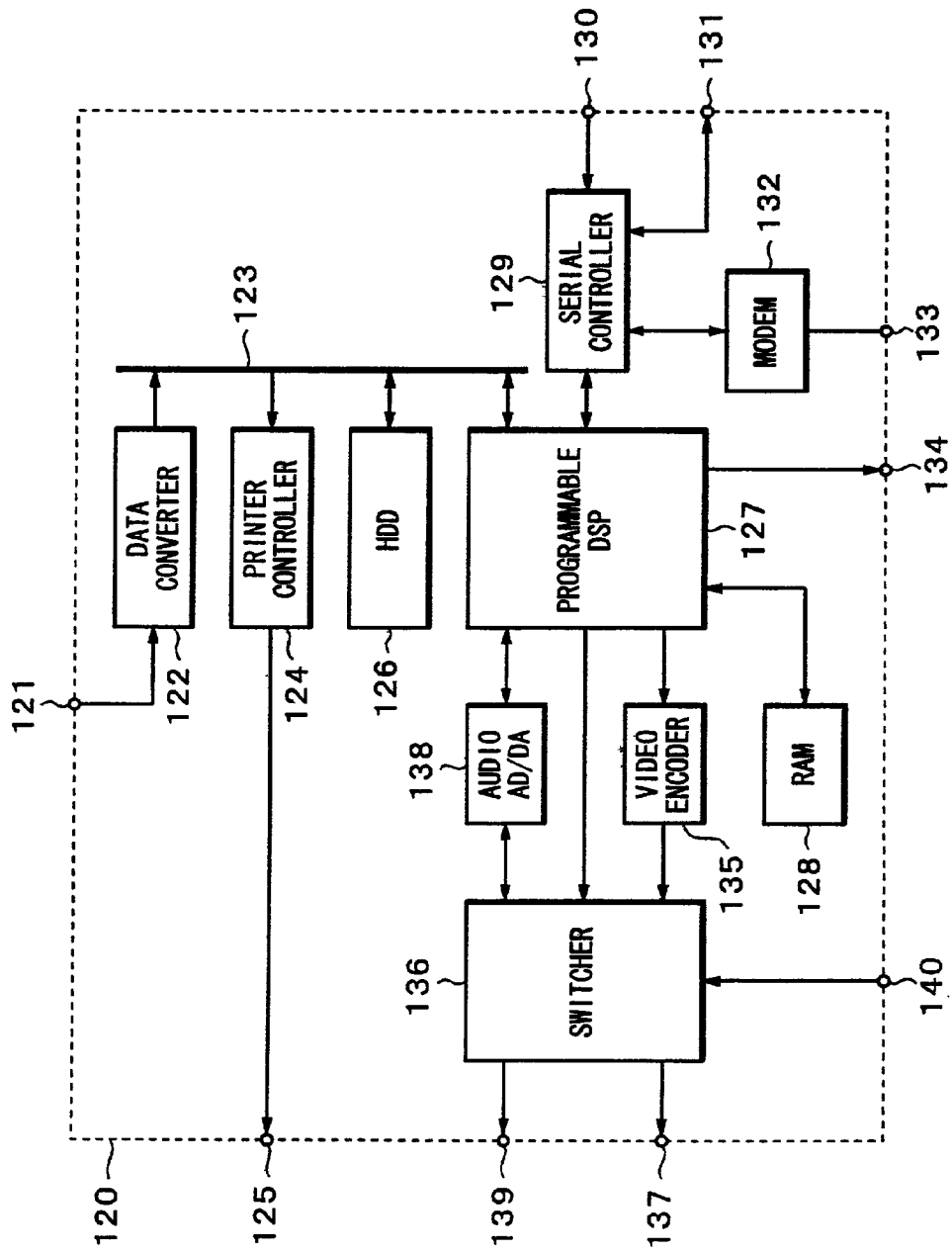
FIG. 10 is a block diagram showing an example of a construction of a terminal in the embodiment of the invention.

The seal exchange terminal 106 shown in FIG. 8 and the seal exchange terminals 106a to 106c shown in FIG. 9 have a construction shown in, for example, FIG. 10. In FIG. 10, the MPEG2 transport stream is supplied from the IRD 105 or gateway 150 to an input terminal (port) 121. This stream is supplied to a data converter 122. The data converter 122 transfers the input data to a programmable DSP 127 through a bus 123.

Since the data converter 122, a printer controller 24, a hare disk 126, and the programmable DSP 127 are connected on the same bus 123, they have a buffer function so as to transfer the data only in the case where the bus 123 is free. The printer controller controls the external printer and outputs the data transferred from the programmable DSP 127 to the printer.

The hard disk 126 executes a buffering of the transport stream, a storage of the data, and the like.

The programmable DSP 127 executes processes such as demultiplexing of the MPEG2 transport stream, decoding, system control, and the like. For example, the programmable DSP 127 comprises an RISC CPU and a DSP and programs of the CPU unit and DSP control unit can be changed from the outside.

A serial controller 129 connected to the programmable DSP 127 has terminals 130 and 131. A modem 132 is connected to the serial controller 129. The modem 132 is connected to the public line network 108 through a terminal 133. The input device 113 which is used by the user is connected through the terminal 130. The camera 119 is connected through the terminal 131. The serial controller 129 controls the modem 132 and camera 119 and outputs data from the modem 132 and data from the camera 119 to the programmable DSP 127. Transmission data from the programmable DSP 127 is outputted from the terminal 132 to the public line network 108 through the serial controller 129 and modem 132.

The Karaoke data is transmitted from the programmable DSP 127 to the Karaoke terminal through a terminal 134. An RAM 128 connected to the programmable DSP 127 is used for buffering of the transport stream, buffering upon decoding of the transport stream, storage of the display data, or the like.

The image data decoded by the programmable DSP 127 is supplied to a video encoder 135. The video encoder 135 D/A converts the image data outputted from the programmable DSP 127 and outputs to a switcher 136. An audio AD/DA unit 138 connected to the programmable DSP 127 D/A converts the audio data from the programmable DSP 127 and outputs to the switcher 136. The audio AD/DA unit 138 A/D converts the audio signal from the switcher 136 and outputs to the programmable DSP 127.

The switcher 136 is switched by a control signal from the programmable DSP 127. The switcher 136 has an output terminal 137 of the analog video/audio signals, an output terminal 139 of the analog video/audio signals, and an audio signal input terminal 140 from the Karaoke terminal. The video/audio signals from the output terminal 137 are supplied to the monitor for displaying the words and the speaker. The video/audio signals from the other output terminal 139 are supplied to the monitor for displaying the personal data.

Figure 11:
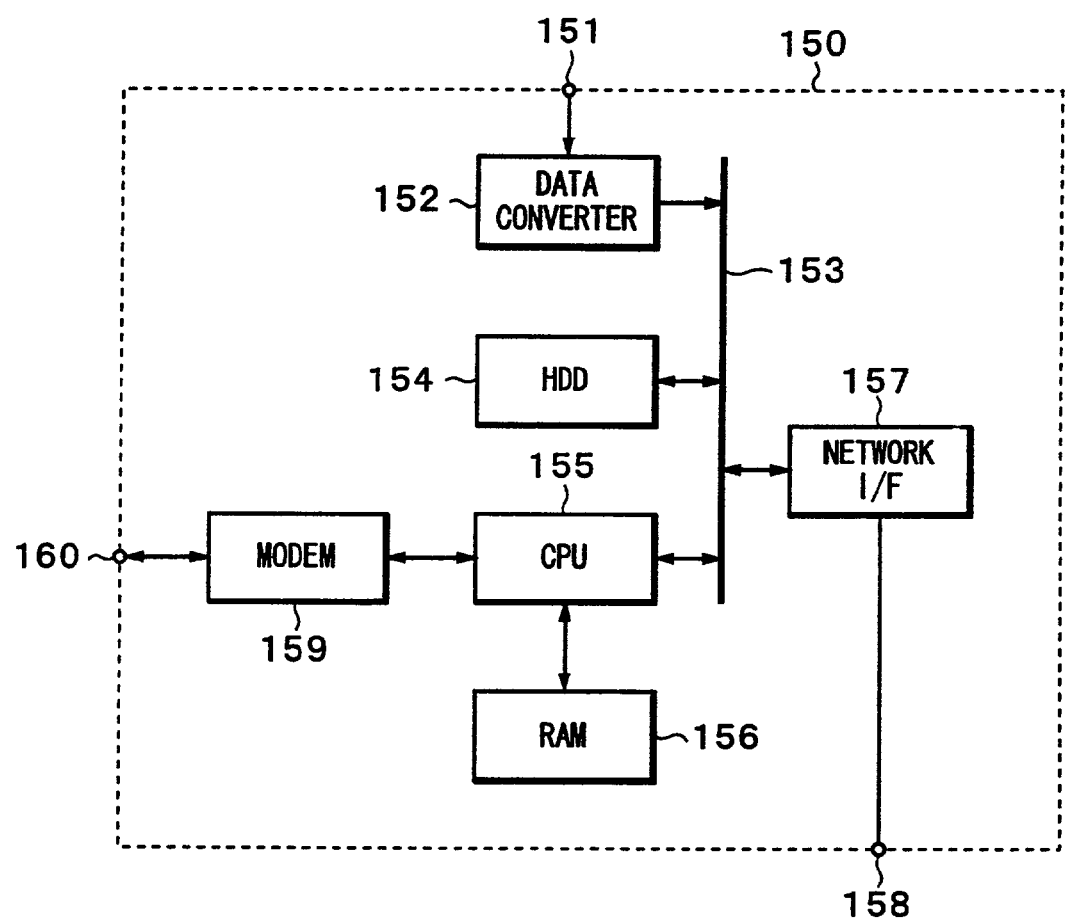
FIG. 11 is a block diagram showing an example of a construction of a gateway in the embodiment of the invention.

The gateway 150 has a construction shown in FIG. 11 as an example. The transport stream from the IRD 105 is supplied to a data converter 152 through an input terminal 151. A CPU 155 is provided to control the whole gateway 150. By an instruction of the CPU 155, the data converter 152 transfers the transport stream to a hard disk 154 or an RAM 156 via the CPU 155. The RAM 156 is used by the CPU 155 and is used for storage of programs and data or the like. The hard disk 154 executes a buffering of the transport stream, a storage of the data, and the like.

A modem 159 is connected to the CPU 155. The modem 159 is connected to an external public line network through a terminal 160 and the CPU 155 executes a communication to the outside. A network I/F (interface) 157 is connected to a network through a terminal 158. A plurality of seal exchange terminals 106a to 106c are connected to the network as shown in FIG. 9. The network I/F 157 communicates with an external seal exchange terminal by an instruction of the CPU 155. Since the data converter 152, hard disk 154, CPU 155, and network I/F 157 are connected onto a same bus 153, they have a buffer function to transfer the data only in the case where the bus is free.

The seal exchange terminals 106a to 106c connected to the gateway 150 have a construction similar to that shown in FIG. 10. The transport stream from the gateway 150 is supplied to the data input terminal 121 through the network.

Figure 12:
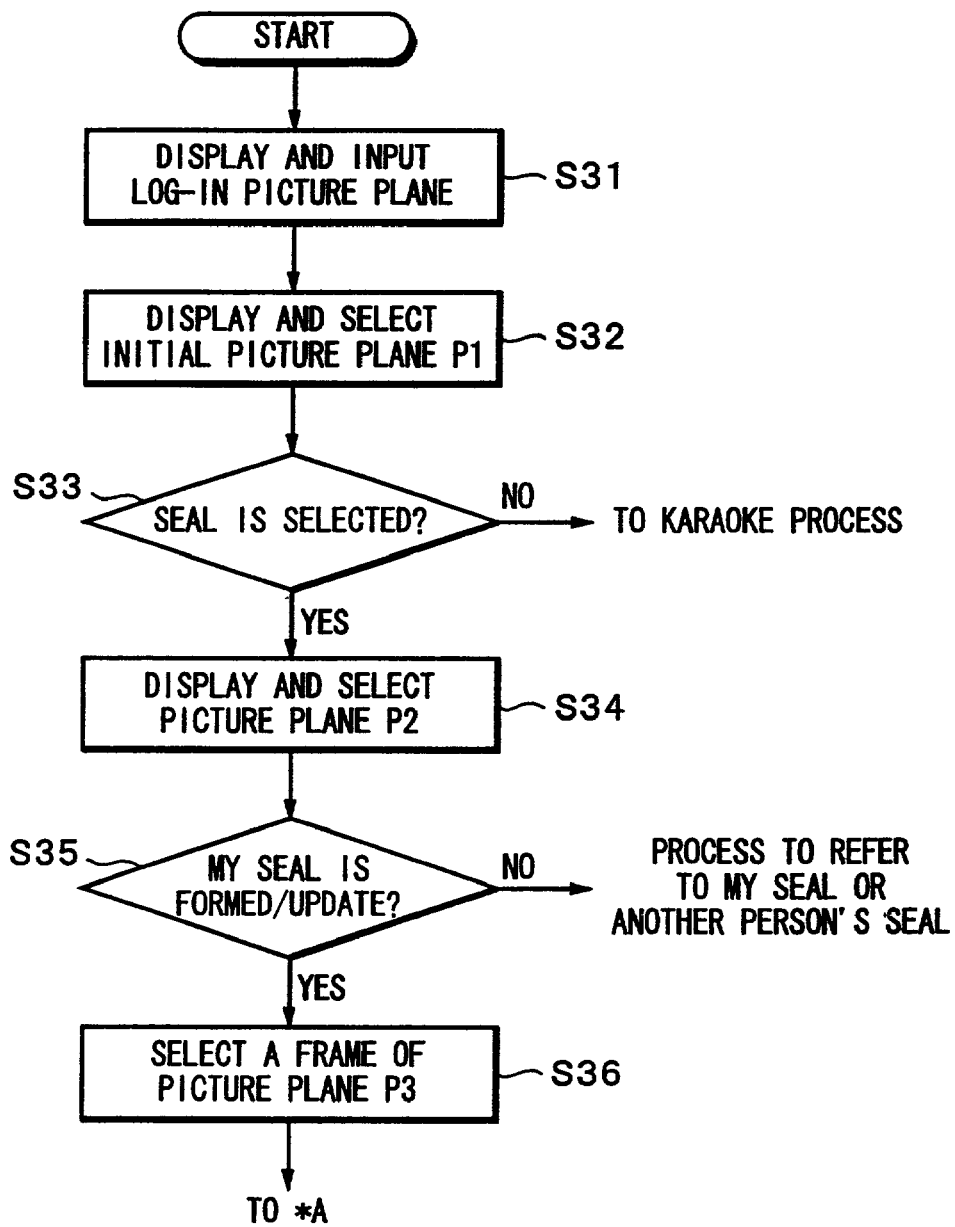
FIG. 12 is a flowchart for explaining processes in the embodiment of the invention.
Figure 13:
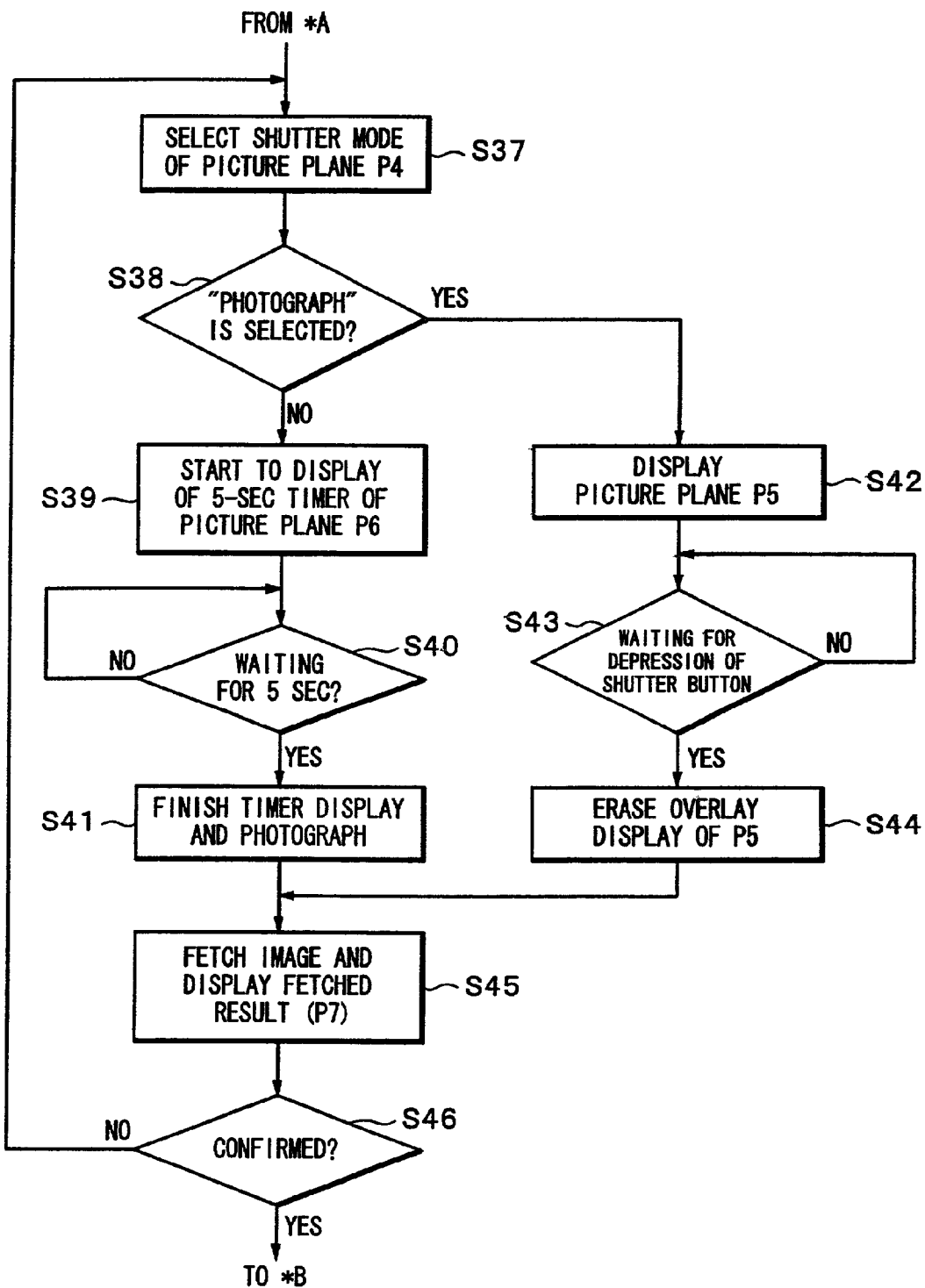
FIG. 13 is a flowchart for explaining processes in the embodiment of the invention.
Figure 14:
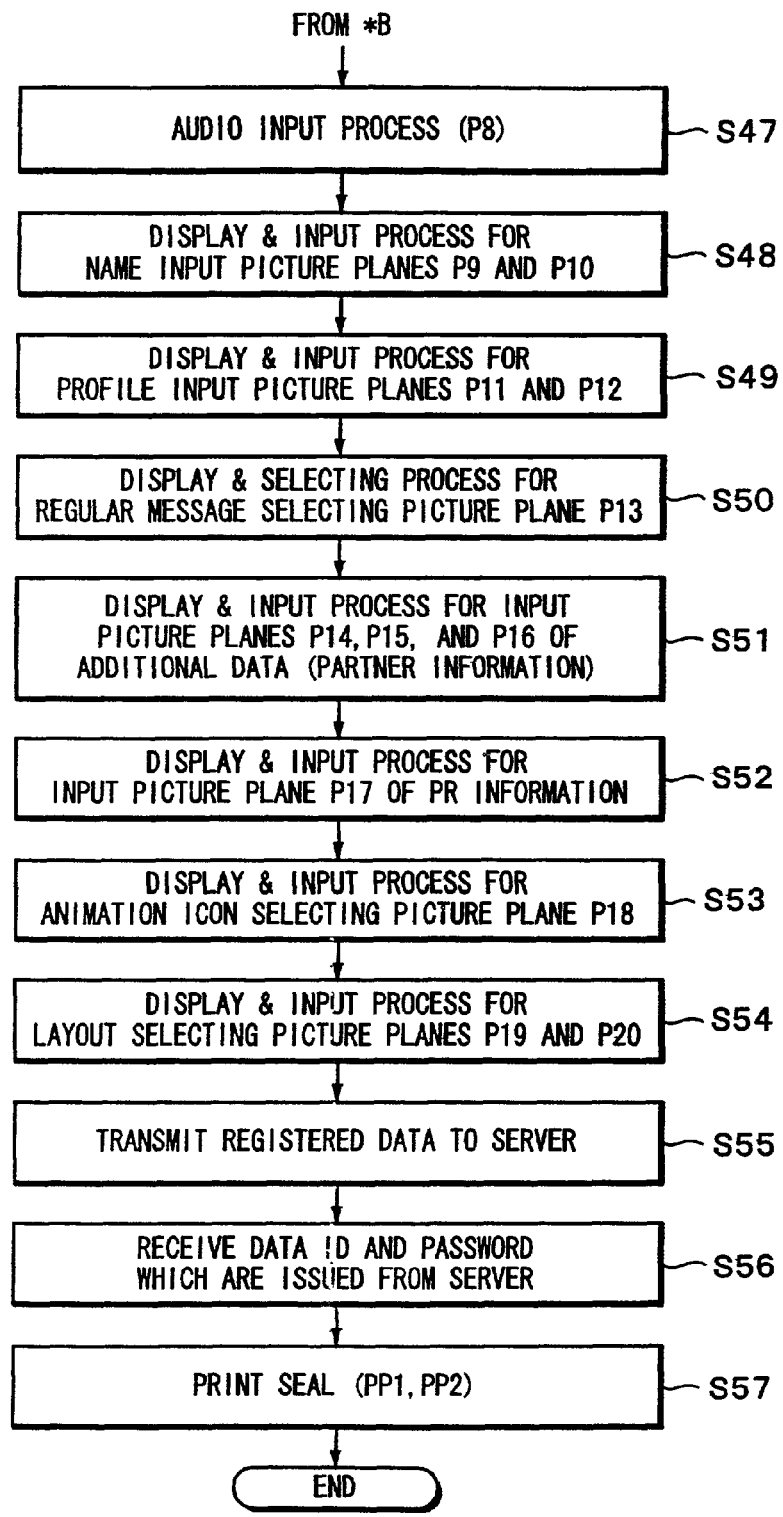
FIG. 14 is a flowchart for explaining processes in the embodiment of the invention.

Processes of the foregoing seal data exchange system will now be described with reference to flowcharts and a picture plane display. The picture plane display is displayed on the monitor 114 for displaying the personal data with the construction of the terminal of FIG. 8. The input of the user at the terminal is executed by using the input device 113. FIGS. 12, 13, and 14 are flowcharts showing processes for an input, a search, and the like of the personal data. Although those diagrams relate to a series of processes, they are divisionally shown because of limitation of a drawing region.

Figure 18:
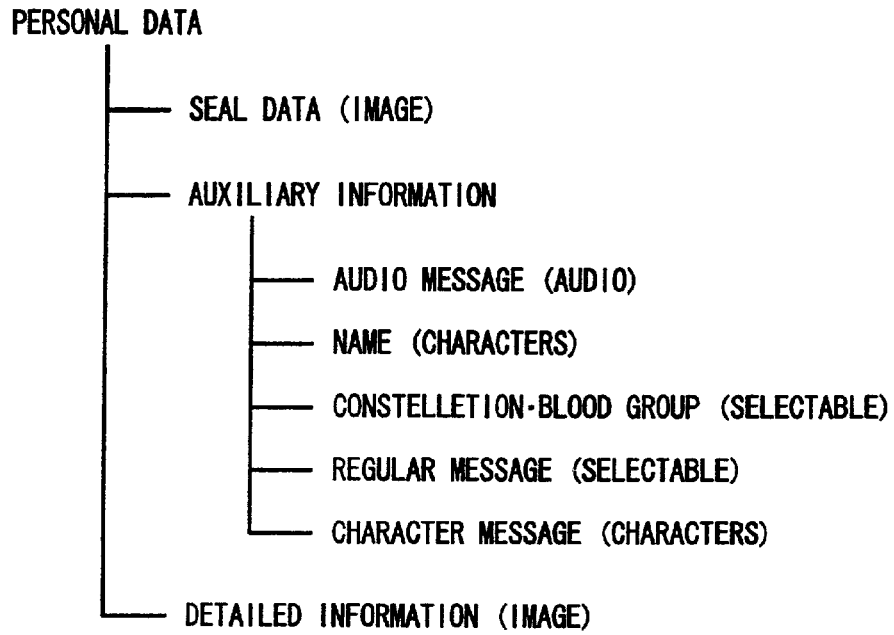
FIG. 18 is a schematic diagram showing a construction of personal data in the embodiment of the invention.

In the embodiment of the invention, the personal data is made up of seal data, auxiliary information, and detailed information as shown in FIG. 18. The seal data is mainly image data like a face image. The auxiliary information is information such as name concerning the seal data, character message, audio message, and the like. Although not shown, the moving picture data can be also annexed to the personal data as auxillary information. The detailed information is more detailed information. An input of the detailed information is not performed in a terminal apparatus but is performed by another input method as will be explained hereinlater.

In step S31 in FIG. 12, the programmable DSP 127 of the terminal forms a log in picture plane image into the RAM 128 and allows the log in picture plane image to be displayed on the monitor 114 through the video encoder 135, thereby promoting the user to input a data ID of the personal data and a password. The user operates the input device 113 and inputs the issued data ID and password and records into the RAM 128 through the serial controller 129.

The user who has already possessed the data ID is allowed to input a data ID and a password from the input device. However, the user as a beginner can be also allowed to depress (click, select) a confirmation button without an input of a data ID and a password and the processing routine can be also progressed to step S32. If none of the data ID and the password is inputted, the personal data is formed and if none of the data ID and the password is issued to the user, the function such as a transmission of the message or the like cannot be used.

The inputted data ID and password are stored into the RAM 128 and, at the same time, they are transmitted and notified to the internet provider 109 (hereinafter, simply referred to as a server) as an ID of a person who uses the terminal at present through the serial controller 129, modem 132, and public line network 108 together with a unique ID of the terminal. Thus, in the case where a message is sent to a person who uses the terminal at present from the other user, a notification of the arrival of the message can be displayed during the use.

When the data ID and password are not authorized in the center 101, namely, when the input password is a wrong or illegal password, an error message is displayed on the picture plane, thereby promoting the user to again input.

Figure 19:
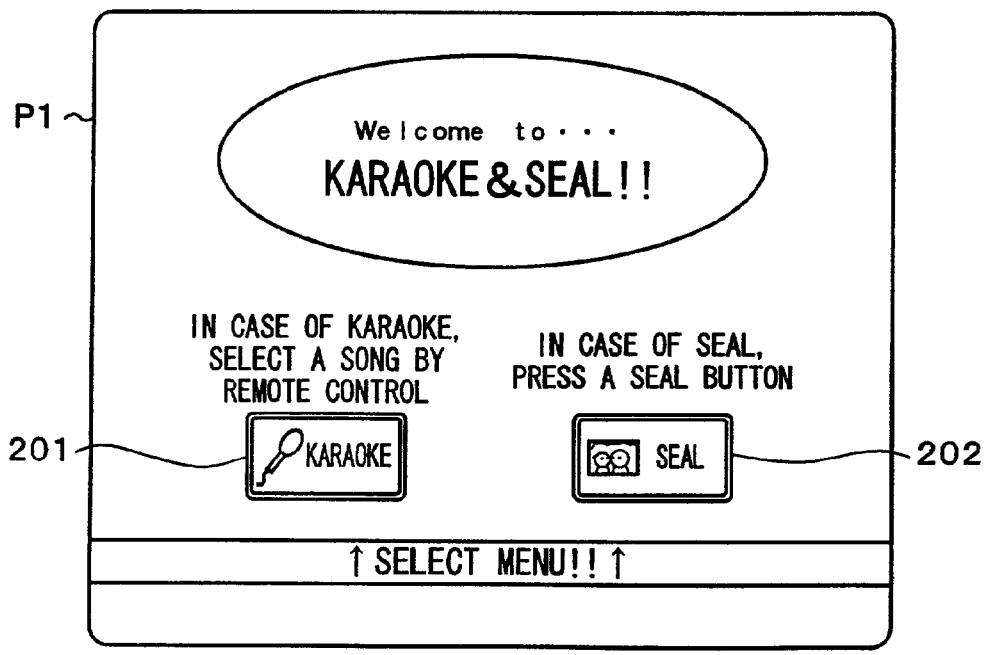
FIG. 19 is a schematic diagram showing a specific example of a screen display of a monitor provided at a terminal in the embodiment of the invention.

In step S32, an initial picture plane P1 is displayed and the operation of the terminal is selected. The programmable DSP 127 forms an image of the initial picture plane P1 shown in FIG. 19 into the RAM 128 and allows it to be displayed on the monitor 114 through the video encoder 135, thereby promoting the user to select either one of the Karaoke function and the seal exchanging function. In FIG. 19, reference numeral 201 denotes a button which is depressed in case of selecting the Karaoke function and 202 indicates a button which is depressed in case of selecting the seal exchanging function.

Figure 20:
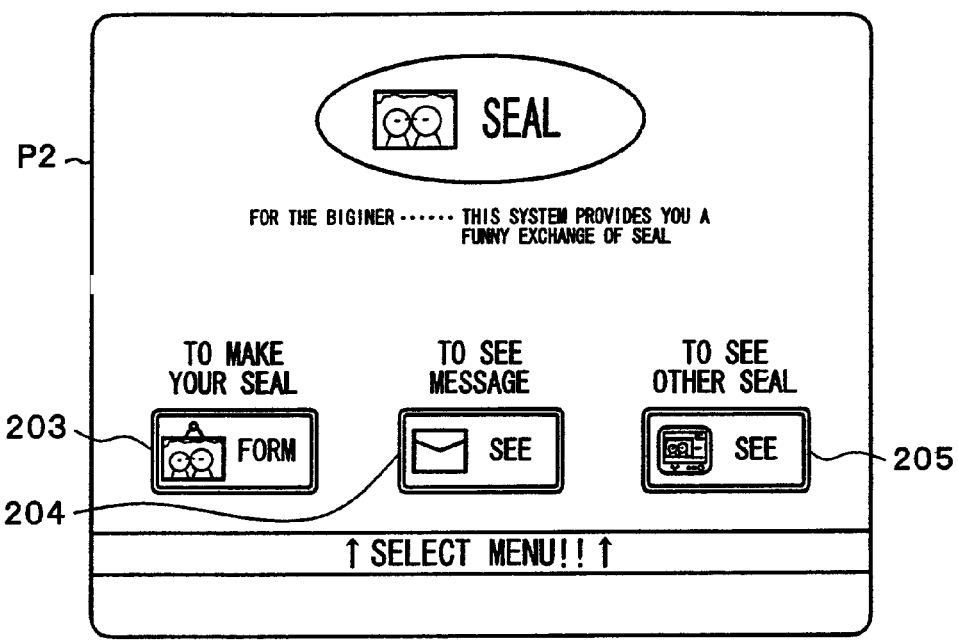
FIG. 20 is a schematic diagram showing a specific example of a screen display of a monitor provided at a terminal in the embodiment of the invention.

In step S33, when the Karaoke function is selected by using the input device 113 by the user, the operating mode advances to the Karaoke mode. Since processes of Karaoke are similar to those at the existing communication Karaoke terminal, their descriptions are omitted here. When the seal exchanging function is selected, the processes for displaying and selecting a picture plane P2 are executed (step S34). The programmable DSP 127 forms the image of the picture plane P2 for formation and display as shown in FIG. 20 into the RAM 128 and allows the image to be displayed on the monitor 114 through the video encoder 135.

On the picture plane P1, a button 203 is depressed in case of forming or updating the own personal data. A button 204 is depressed in case of confirming the message for the own data. A button 205 is depressed in case of displaying personal data of the other persons registered in the seal exchange service.

When the button 204 or 205 is depressed by the input device 113, namely, when a confirmation of the message for the own data or a display of the seal data of the other persons is selected, the processing routine advances to a process for referring to the other personal data, which will be explained hereinlater. In the log in picture plane in step S31, however, if the own data ID or password is not inputted yet, a confirmation of a termination message to the own data cannot be selected.

In step S35, when the formation/updating (button 203) of the own personal data is selected, the seal data in the personal data is first inputted. After that, audio data, name, constellation, blood group, school year (occupation), regular message, additional data, and the like are inputted as auxiliary information. When the seal data is inputted, a picture plane P3 is displayed and a frame is selected. A frame selection picture plane image of the picture plane P3 shown in FIG. 21 is formed and displayed.

Figure 21:
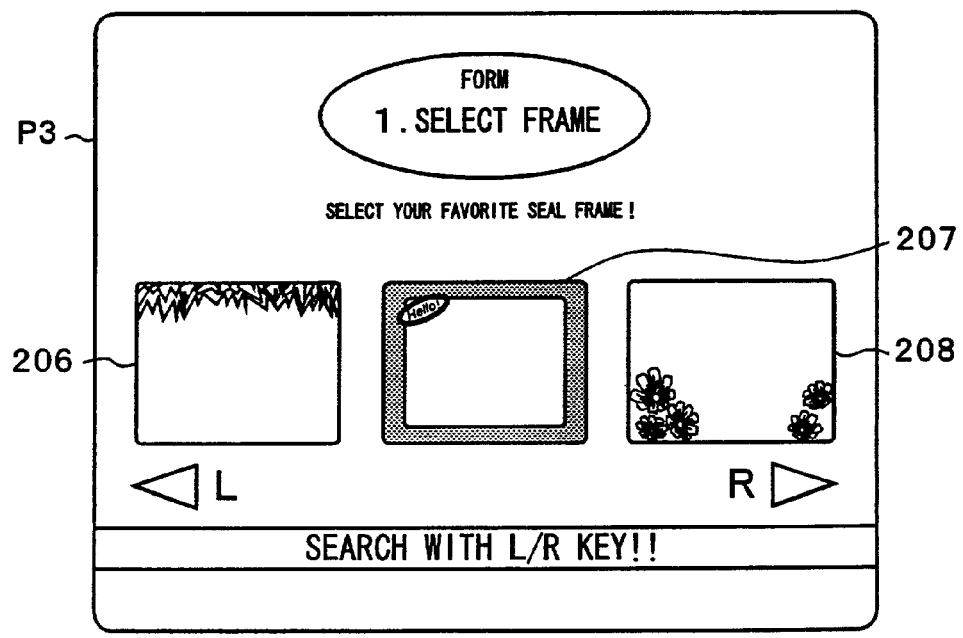
FIG. 21 is a schematic diagram showing a specific example of a screen display of a monitor provided at a terminal in the embodiment of the invention.

In FIG. 21, three kinds of frames 206, 207, and 208 are displayed on the picture plane P3. By the picture plane P3, it is promoted that the selection of a frame to be added to the seal among those frames is performed by the input device 113. The frame image shown in FIG. 21 is an example. In the embodiment, by transmitting it by using the digital satellite broadcasting, not only the season and fashion but also a frame image which is useful for only the day can be selected.

Figure 22:
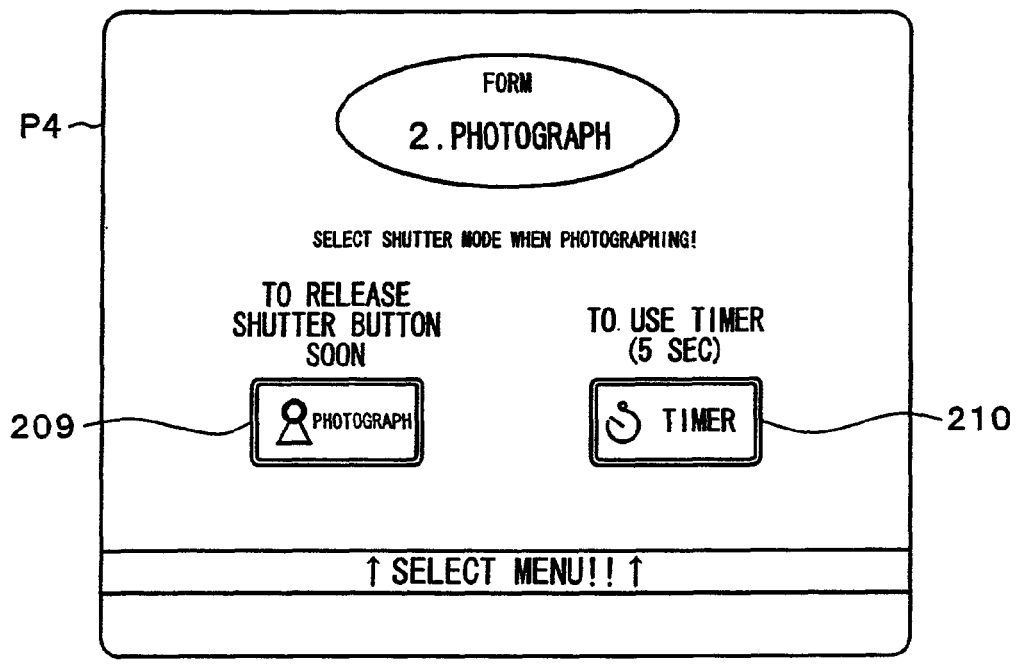
FIG. 22 is a schematic diagram showing a specific example of a screen display of a monitor provided at a terminal in the embodiment of the invention.

The processing routine advances to step S37 in FIG. 13. A selection picture plane P4 of a shutter mode shown in FIG. 22 is displayed, thereby promoting the selection of the shutter mode. On the picture plane P4, a button 209 is depressed in case of fetching the image just after the shutter button was depressed. A button 210 is depressed in case of fetching the image (in case of a timer mode) after the elapse of a predetermined time for example, 5 seconds) after the shutter button was depressed.

Figure 23:
FIG. 23 is a schematic diagram showing a specific example of a screen display of a monitor provided at a terminal in the embodiment of the invention.

In step S38, a check is made to see if the button 209 to photograph at once has been selected. When the button 209 is selected, the processing routine advances to step 242. On the other hand, when the button 210 of the timer is selected, step S39 follows. In step S32, a picture plane P5 (FIG. 23) is displayed. The picture plane P5 is obtained by synthesizing the image photographed by the camera 119 and the selected frame. That is, a still image photographed by using the camera 119 is fetched into the RAM 128 from the serial port through the serial controller 129. The frame and message are overlaid to the still image fetched in the RAM 128, the picture plane P5 shown in FIG. 23 is formed and is outputted through the video encoder 135 and is displayed on the monitor 114.

A photographing pose is determined while confirming the picture plane on the monitor 114 and the shutter button is depressed at an arbitrary timing. In step S43, a notification of the depression of the shutter button which is issued from the input device 113 is waited. When the button is pressed, step S44 follows. In step S44, the still image photographed by the camera 119 is fetched from the serial port into the RAM 128 by using the serial controller 129. An overlay display of the picture plane P5 in FIG. 23 is finished.

Figure 24:
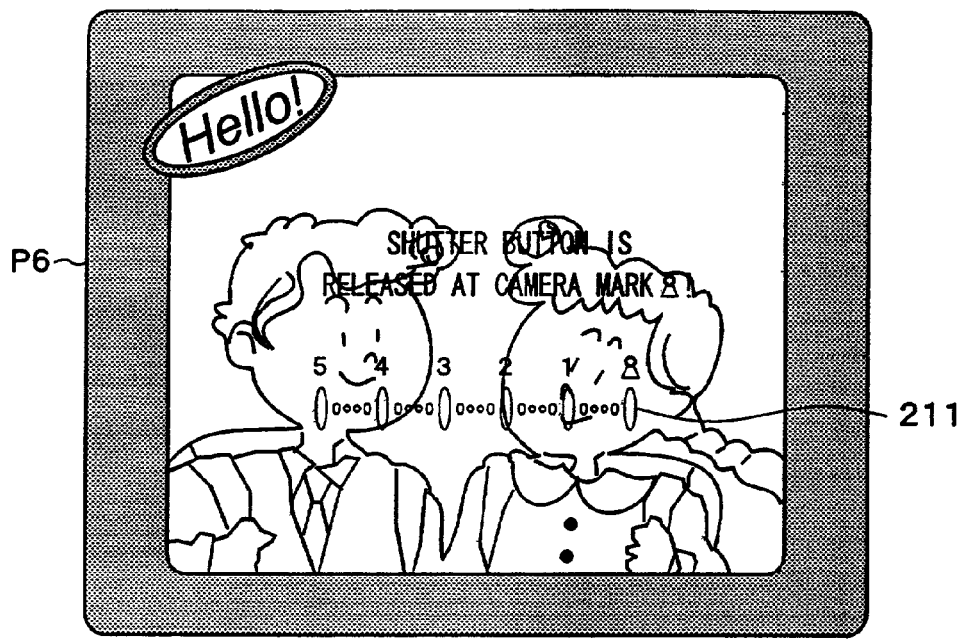
FIG. 24 is a schematic diagram showing a specific example of a screen display of a monitor provided at a terminal in the embodiment of the invention.

In step S38, when the timer mode is selected, a timer image 211 of a picture plane P6 shown in FIG. 24 is displayed. In this case, a display method such that a scale display is reduced so that a time (in this example, 5 seconds) set by the timer can be visually known or the like is used. It is also possible to generate an electronic sound such as a beep sound every second at which a timing can be set. In step S40, while producing and displaying the timer image 211, the system waits for five seconds with reference to a built-in timer. When five seconds elapse, in step S41, the still image photographed by using the camera 119 is fetched into the RAM 128 from the serial port by using the serial controller 129.

Figure 25:
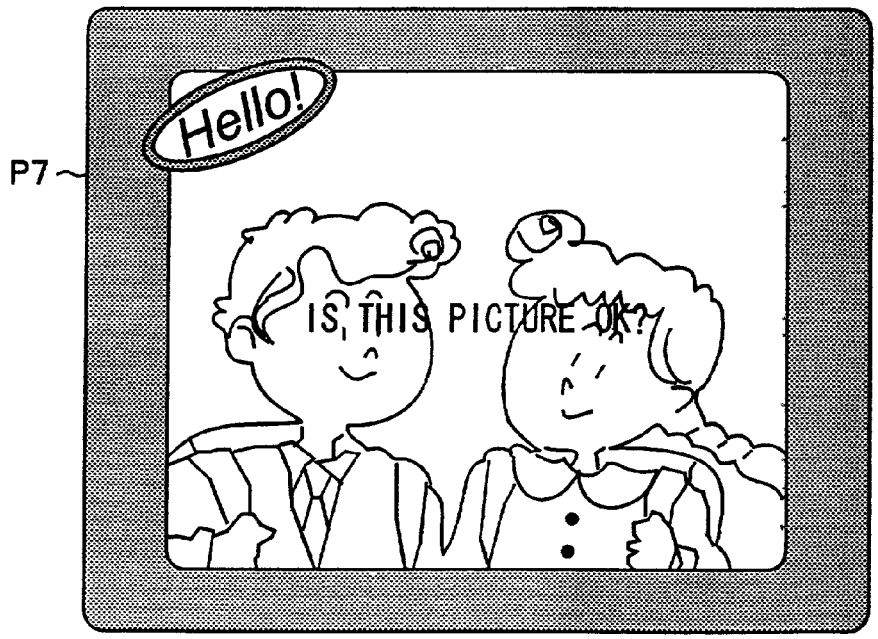
FIG. 25 is a schematic diagram showing a specific example of a screen display of a monitor provided at a terminal in the embodiment of the invention.

A frame image is overlaid onto the still image fetched in the RAM 128 and a confirmation message is also overlaid. A picture plane P7 of FIG. 25 is displayed on the monitor 114 through the video encoder 135. The user confirms or cancels with reference to the picture plane P7. In step S46, whether the confirmation button has been depressed or not is determined. When the confirmation button is depressed, the processing routine advances to step S47 shown in FIG. 14. When the cancel button is depressed, the processing routine is returned to step S37 and the object is again photographed. As mentioned above, if the user does not like the photographed image, he can again photograph.

Figure 26:
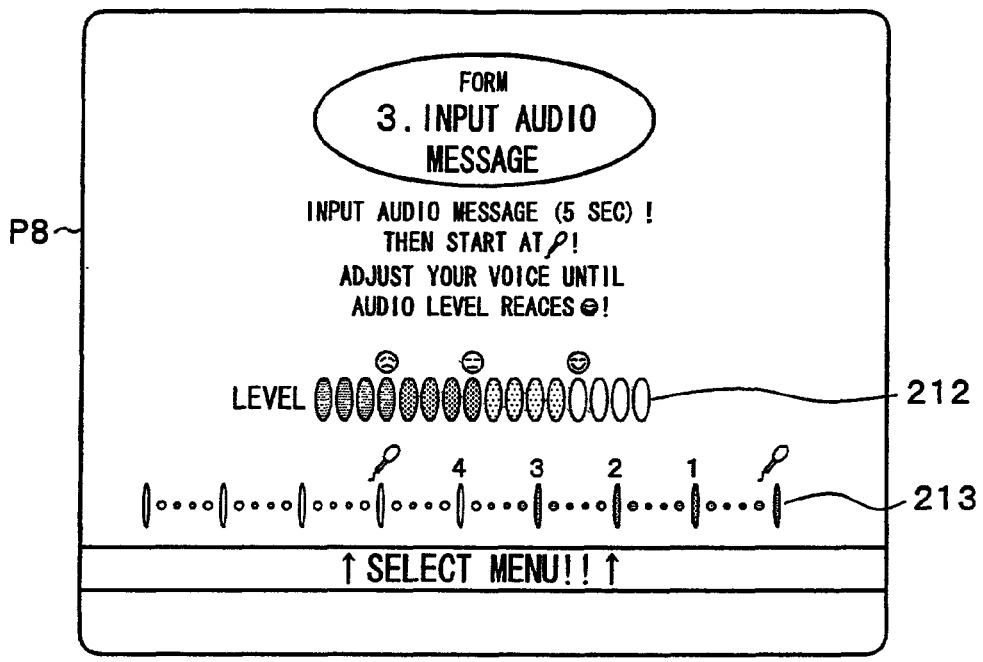
FIG. 26 is a schematic diagram showing a specific example of a screen display of a monitor provided at a terminal in the embodiment of the invention.

In step S47, an audio message as one of the auxiliary information of the personal data is inputted. In this case, an audio message input picture plane P8 shown in FIG. 26 is displayed by the monitor 114 and an audio inputting operation is executed. To make the inputting process easy, a display 212 to clarify a volume level and a display 213 to clarify a recording starting timing are presented on the picture plane P8. By those displays, the timing is matched with the recording time and an audio sound is inputted by using the microphone 112 of the terminal while confirming the recording level. The inputted audio message is stored as personal data constructing elements into the RAM 128 together with the frame image and still image data.

Figure 27:
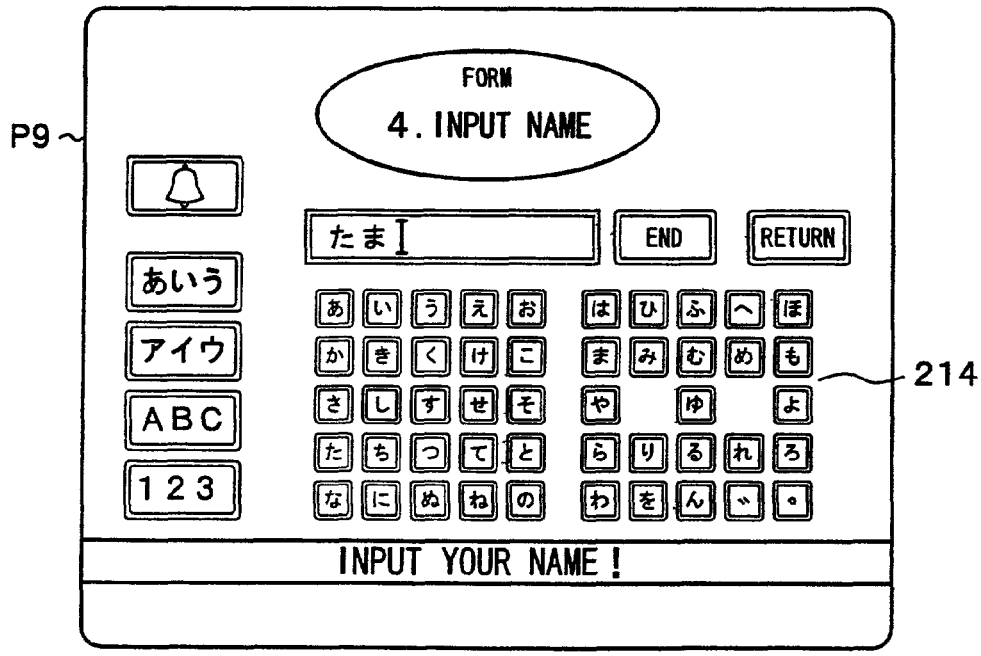
FIG. 27 is a schematic diagram showing a specific example of a screen display of a monitor provided at a terminal in the embodiment of the invention.

A name as one of the auxiliary information of the personal data is inputted (step S48). A name data input picture plane P9 shown in FIG. 27 is displayed and the name is inputted. By selecting the inputting method, for example, in case of the input by a software keyboard, the picture plane P9 of FIG. 27 is used. When the name is inputted, a software keyboard 214 is displayed on the picture plane and up to about 8 to 10 characters are inputted. As characters which can be used, there are Hiragana, Katakana, numerals, alphabets, several symbols, and the like.

As another inputting method, a method of inputting characters by numerals like a message input of a pocket bell can be also used. According to another method, input picture plane P10 shown in FIG. 28 is displayed and a table 215 showing a correspondence between numerals and characters is displayed on the picture plane. Keys "0" to "9" and several alphabet keys are used in this case. A numeral and a character of two digits among them are used and are allocated to the above character. A text character train inputted as mentioned above is stored as personal data constructing elements into the RAM 128 in a manner similar to the audio message.

When the input of the name is confirmed, the processing routine advances to step S49. Step S49 relates to a process for inputting a profile of a person who made the personal data as auxiliary information. In step S49, an input picture plane P11 shown in FIG. 29 is displayed. As will be understood from the picture plane P11, with respect to each list of constellation, blood group, and occupation (school year), by selectively inputting them by using a list box displayed on the picture plane, the profile is inputted.

Figure 30:
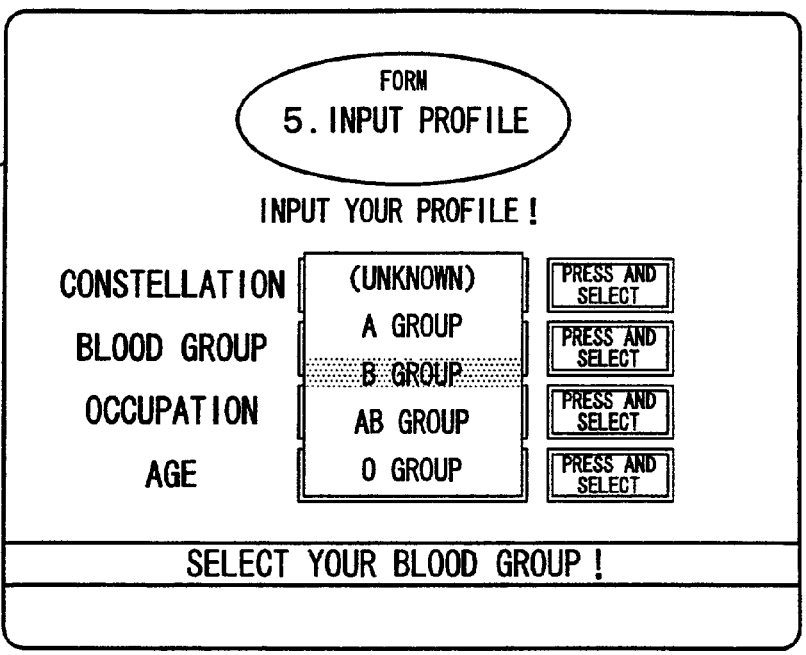
FIG. 30 is a schematic diagram showing a specific example of a screen display of a monitor provided at a terminal in the embodiment of the invention.

That is, as shown in the picture plane P11, with respect to each item, a list box is opened like a picture plane P12 shown in FIG. 30 and a desired item is selected from prepared selection items. The inputted profile data is stored as personal data constructing elements into the RAM 128. After the input of the profile was confirmed, the processing routine advances to step S50.

Figure 31:
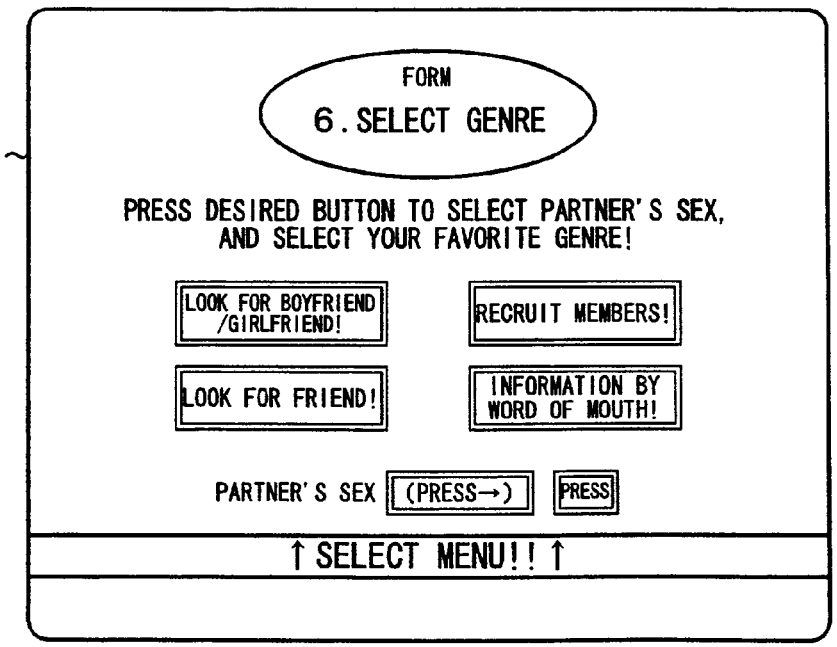
FIG. 31 is a schematic diagram showing a specific example of a screen display of a monitor provided at a terminal in the embodiment of the invention.

In steps S50 and S51, a regular message as one of the auxiliary information is inputted. The input of the regular message is used for an input of conditions of a partner whom the user wants to exchange the seal data or the like. In case of inputting desired conditions, a regular message selection picture plane P13 shown in FIG. 31 is first displayed, thereby promoting the selection of a genre and allowing it to be selected by the operation of the input device 113 (step S50).

Figure 34:
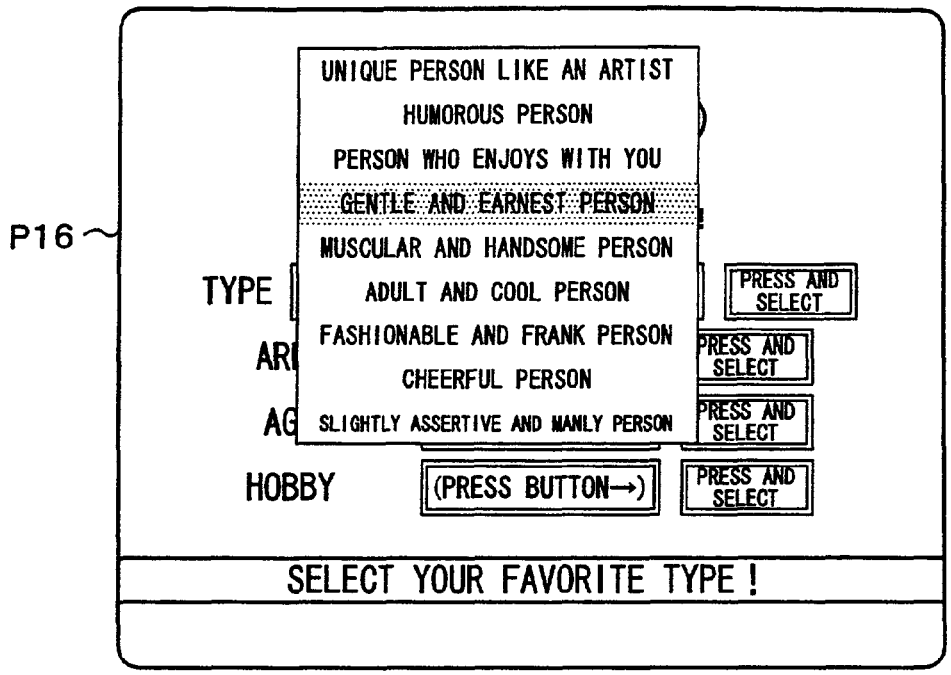
FIG. 34 is a schematic diagram showing a specific example of a screen display of a monitor provided at a terminal in the embodiment of the invention.

In step S51, a picture plane P14 shown in FIG. 32, a picture plane P15 shown in FIG. 33, and a picture plane P16 shown in FIG. 34 are displayed and information of the partner whom the user wants to exchange the seal is selected and set by using those picture planes. In the example shown in the diagram, a type, area, occupation (school year), hobby, and the like are selected by using the list box. As mentioned above, a regular message of the personal data is decided. The regular message which was selected and set is stored as personal data constructing elements into the RAM 108.

Figure 35:
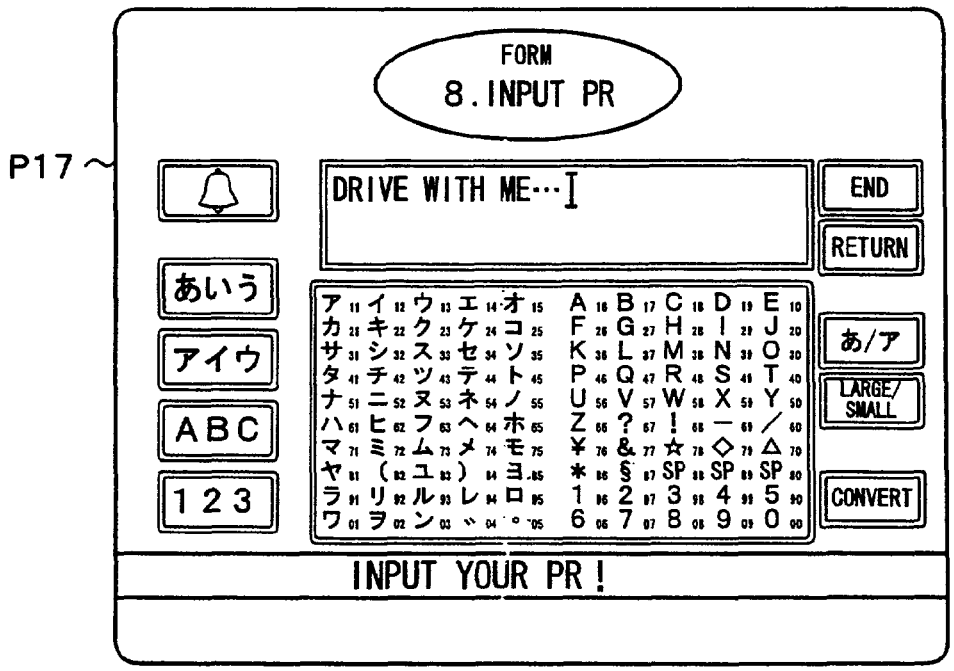
FIG. 35 is a schematic diagram showing a specific example of a screen display of a monitor provided at a terminal in the embodiment of the invention.

In step S52, additional data is inputted. The additional data is used to input PR information of the person who made the seal data. The PR information is inputted by using the software keyboard. The number of characters is set to, for example, about 40 characters and Hiragana, Katakana, numerals, alphabets, icon, several symbols, and the like can be used as characters in a manner similar to the case of the name. It is also possible to use a system for converting input numerals into a character like a table displayed on a picture plane P17 shown in FIG. 35 instead of the software keyboard.

Figure 36:
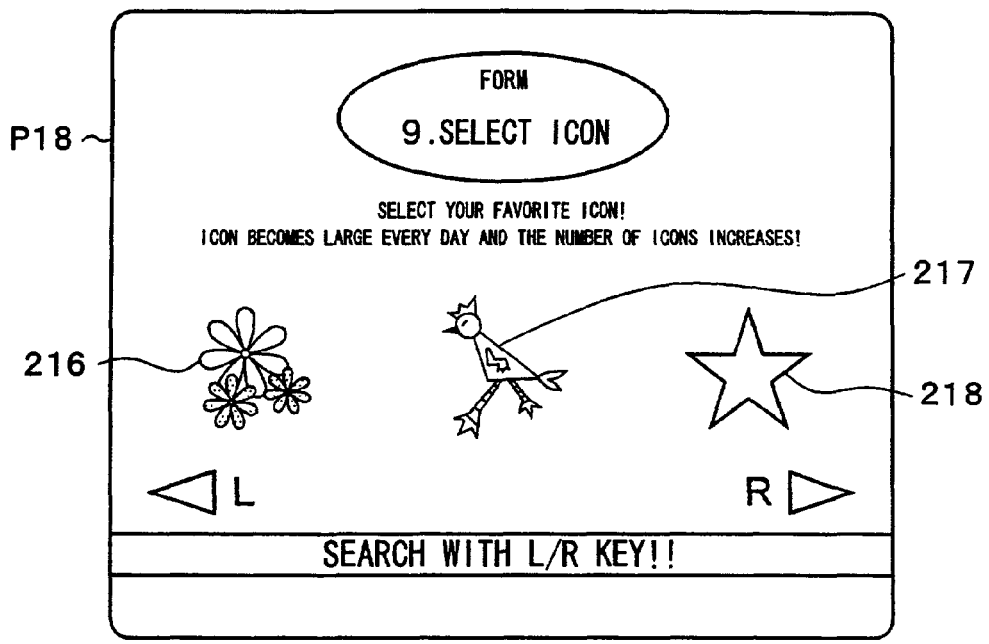
FIG. 36 is a schematic diagram showing a specific example of a screen display of a monitor provided at a terminal in the embodiment of the invention.

In step S53, an inputting process of an animation icon is performed. A picture plane P18 shown in FIG. 36 shows a selecting picture plane of the animation icon. In this example, one of three animation icons 216, 217, and 218 is selected. The animation icon shows the number of elapsed days from the date when the personal data has been formed. An image of the animation icon increases everyday or the number of images increases in association with the elapse of day from the making date. By seeing the animation icons, the number of valid days of the personal data and the number of days until a validity term of the personal data can be known. If the personal data is updated, by increasing the number of icons, how many times the data was updated can be clearly shown.

Figure 37:
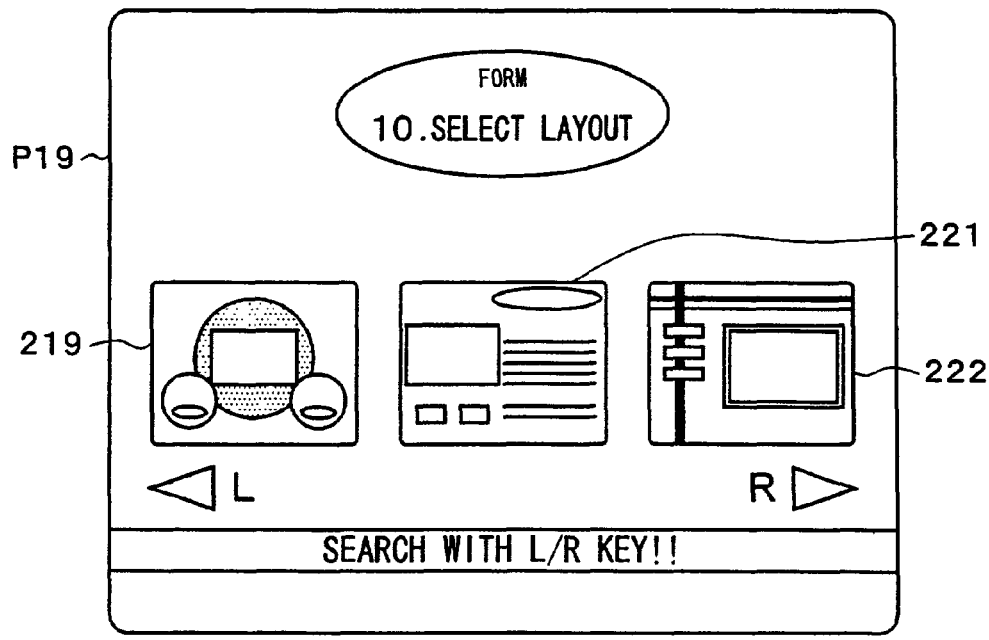
FIG. 37 is a schematic diagram showing a specific example of a screen display of a monitor provided at a terminal in the embodiment of the invention.
Figure 38:
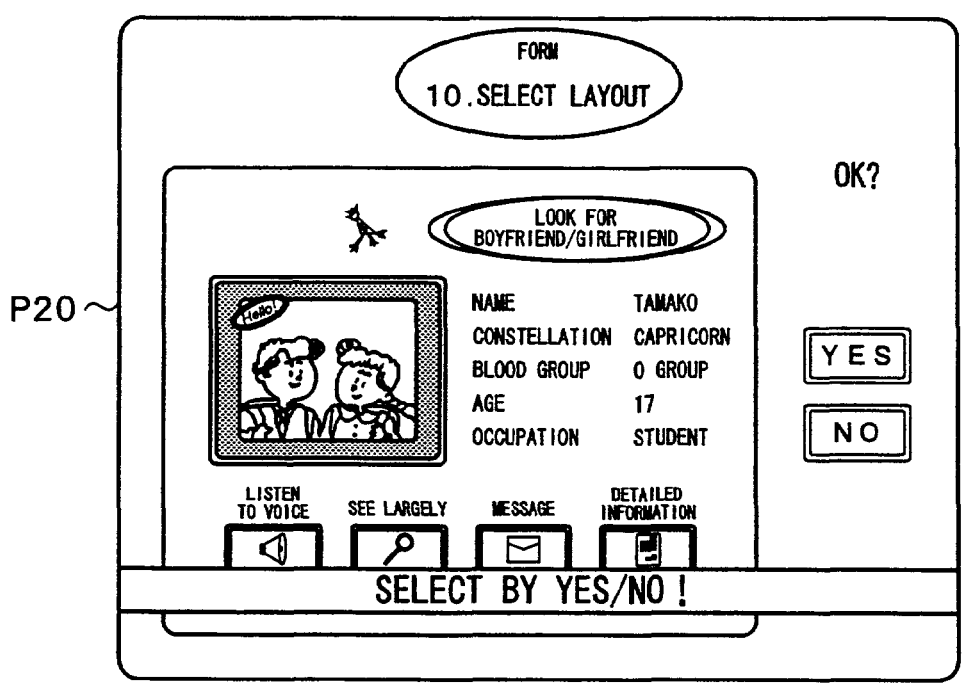
FIG. 38 is a schematic diagram showing a specific example of a screen display of a monitor provided at a terminal in the embodiment of the invention.

In step S54, a layout is selected by using a layout selecting picture plane P19 in FIG. 37 and the personal data formed is confirmed by using a confirming picture plane P20 shown in FIG. 38. The "layout" is a layout to display the seal data and auxiliary information. In FIG. 37, three kinds of layouts 219, 221, and 222 are prepared and one of them can be selected with an L/R key. After the layout was selected, it is confirmed by the picture plane P20 and is decided.

The seal data and auxiliary information (audio message, name, profile, regular message, partner information, PR information, animation icon, layout, etc.) which was set and stored in the RAM 128 by foregoing steps S31 to S54 is transmitted to the server through the public line network 108 by using the serial controller 129 and modem 132 by the control of the programmable DSP 127 (step S55).

In step S56, the server receives the data of the constructing elements of the personal data mentioned above. When the data is decided to be valid, the server issues a unique data ID for the received personal data constructing elements and also generates a password. Further, the data of the personal data constructing elements is registered into a database together with the data ID and password. The data ID and password are transmitted to the terminal. In step S57, the terminal receives the ID and password through the modem 132 and serial controller 129 and stores into the RAM 128.

Figure 39:
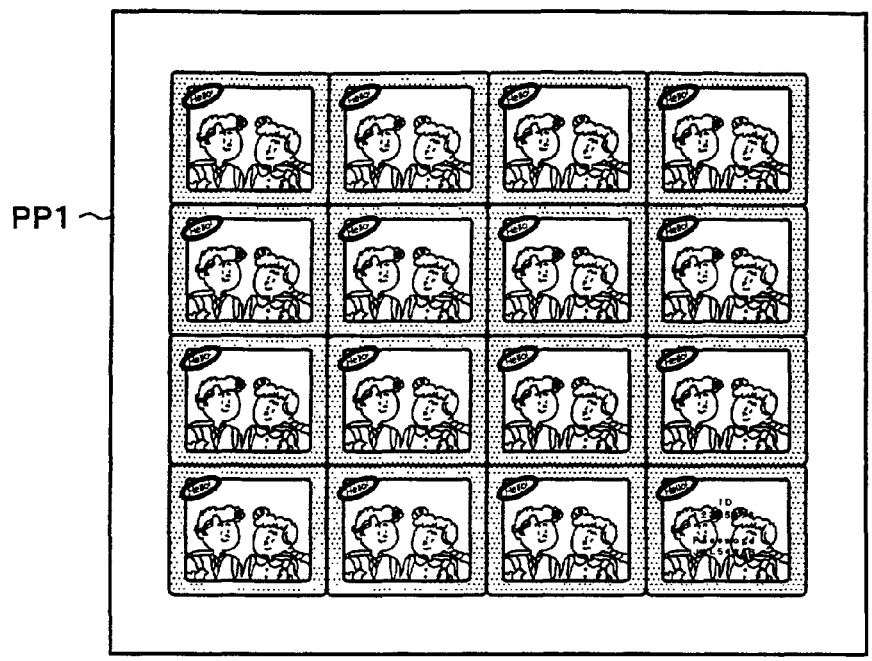
FIG. 39 is a schematic diagram showing a specific example of a print output at a terminal in the embodiment of the invention.
Figure 40:
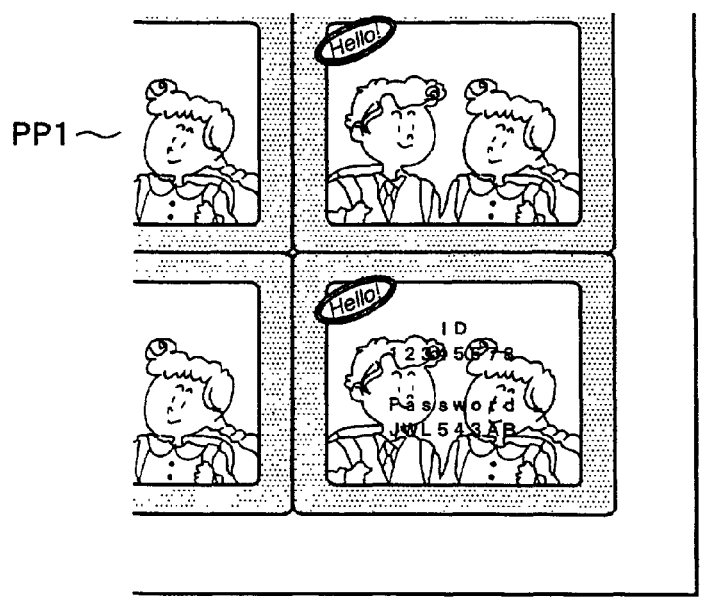
FIG. 40 is a schematic diagram partially largely showing a specific example of a print output at a terminal in the embodiment of the invention.

The personal data is processed to an image with 16 divided frames in the RAM 128 by the control of the programmable DSP 127. Among the divided images, the text image of the data ID and password received in step S56 is overlaid to only the seal existing at the right lower corner position. The image transmitted to the printer by using the serial controller 129 is printed as shown by a print output PP1 shown in FIG. 39 and a print output PP1 of FIG. 40 as an enlarged diagram thereof. As shown in FIG. 40, the data ID and password are overlaid to the seal existing at the right lower corner position.

The data ID which is issued for each personal data can be known by all of the users of the present system and is used for retrieval, display, or the like of the personal data. The password can be known by only the person who makes the personal data and is used for registration of the detailed information, transmission of the message, display of the message, and the like.

In addition to the auxiliary information, the detailed information can be added to the personal data. The detailed information is a free message, an illustration, or the like. As a method of adding the detailed information to the personal data, the user writes it onto a designated paper with a pen or the like and it is read by a facsimile, a scanner, or the like. In case of using the facsimile, the server concentrated receives it and adds it to the seal data by the operator or automatically. In case of using the scanner, the operator of a shop in which the terminal is installed operates and adds it to the seal data. When the detailed information is added to the personal data, the data ID is used to designate the personal data to be added and the password is used to show that the user is the person who made the personal data and whom the detailed information can be added.

An exchanging process of the seal data will now be described. The exchanging process comprises: a retrieving process for selecting a target person (person who made the personal data) whom a person who desires to exchange the personal data exchanges the personal data; a process for transmitting a message to the selected personal data making person; a process for issuing a print permission by watching a plurality of messages received by the personal data making person; and other processes. The permission or inhibition of the printing of the seal data is managed every data ID. To use services of the messages, it is necessary to input the password. Further, even in case of displaying the messages transmitted to the user himself, it is necessary to input the data ID and password.

Figure 15:
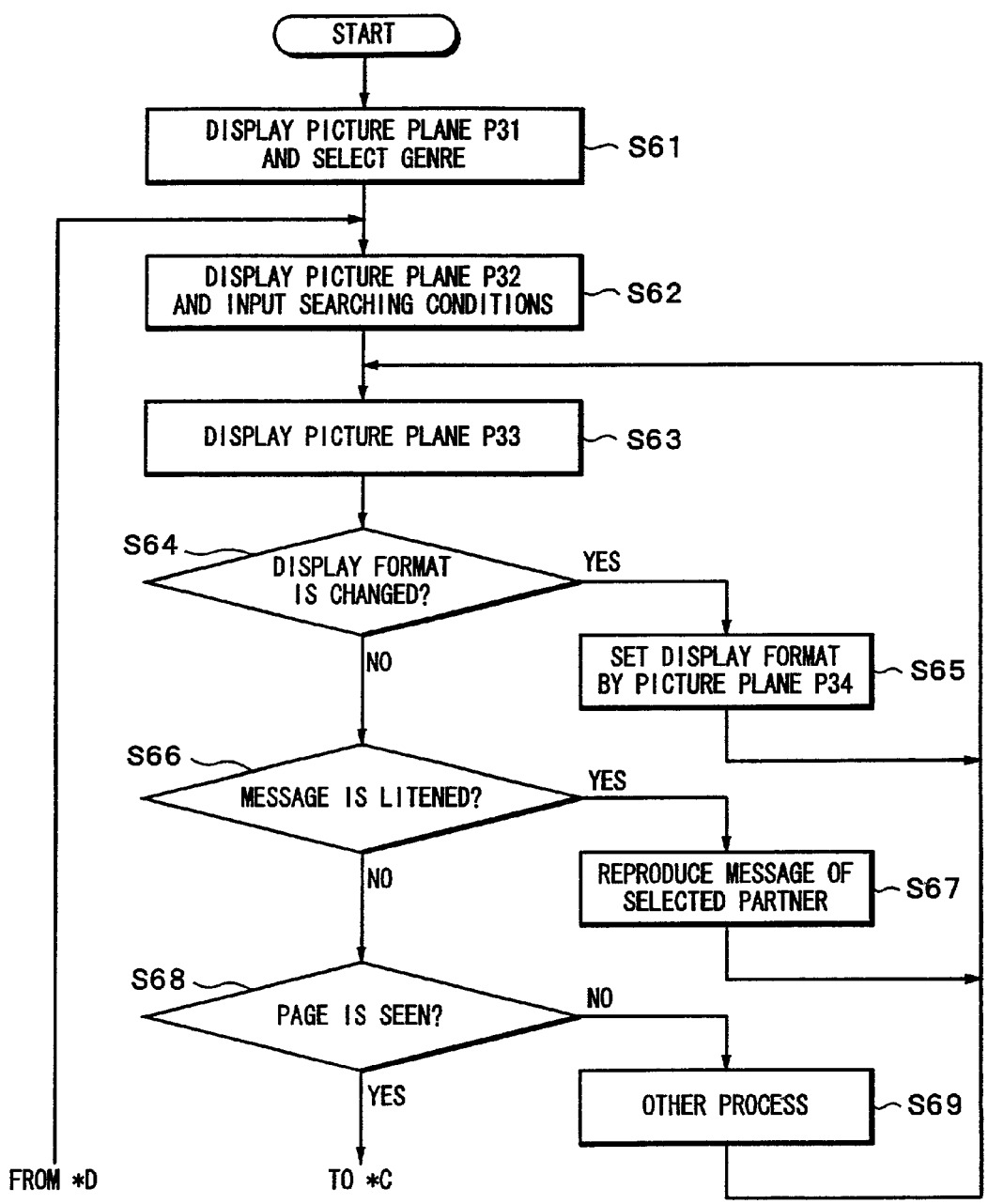
FIG. 15 is a flowchart for explaining processes in the embodiment of the invention.
Figure 41:
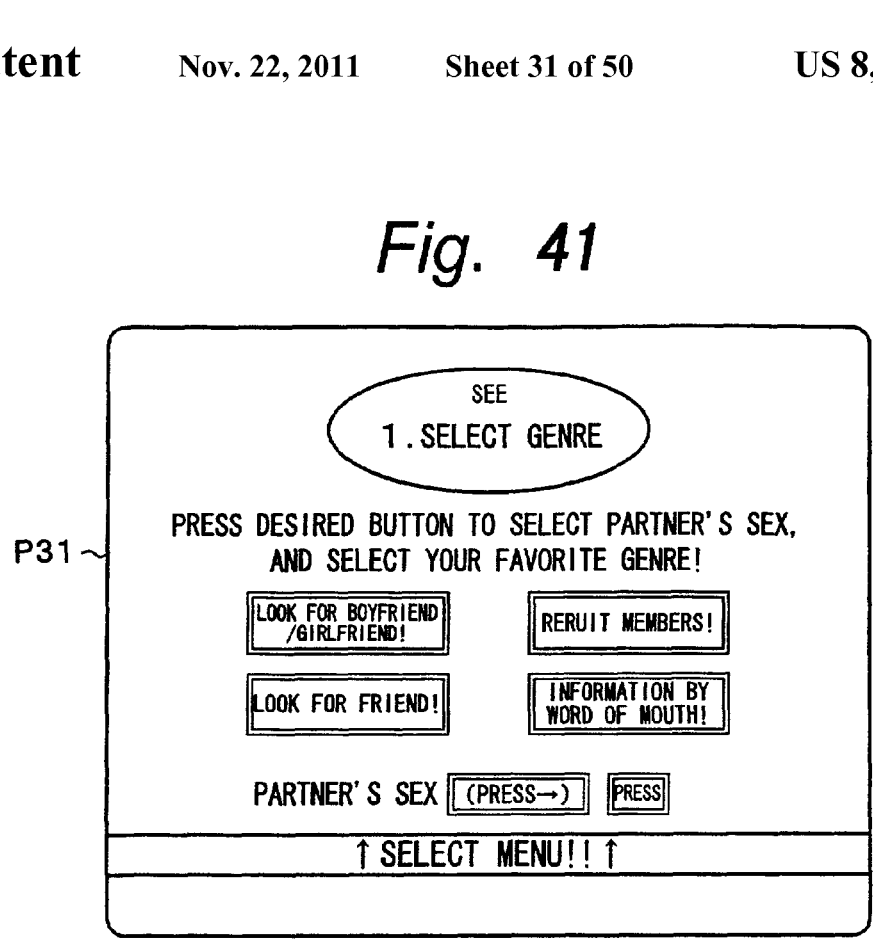
FIG. 41 is a schematic diagram showing specific example of a screen display of a monitor provided at a terminal in the embodiment of the invention.

First, the retrieving, monitoring, and printing processes of the personal data of the other persons which are executed by the person who wants to exchange the personal data will be described with reference to the flowcharts of FIGS. 15 and 16 and the drawing of the display picture plane. In first step S31 in FIG. 15, an image of a picture plane P31 in FIG. 41 is formed in the RAM 128 and the picture plane P31 is displayed on the monitor 114 through the video encoder 135, thereby promoting the person who desires to exchange the personal data to select by which target genre he refers to the information. Although not shown in the flowcharts, if "return" is instructed by the input device 113, the screen is again returned to the previous picture plane.

Figure 42:
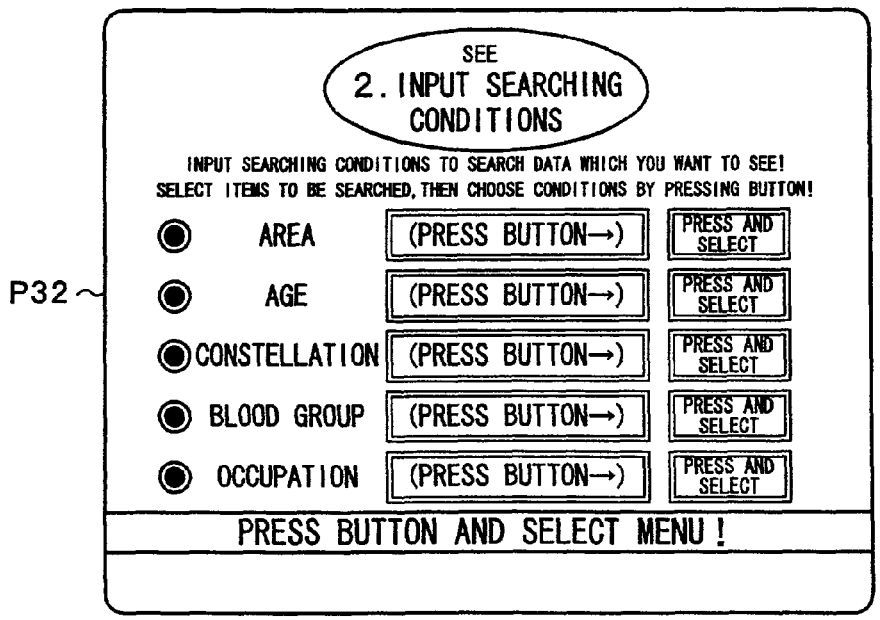
FIG. 42 is a schematic diagram showing a specific example of a screen display of a monitor provided at a terminal in the embodiment of the invention.

When the target genre is selected in step S61, in next step S62, an image of a picture plane P32 in FIG. 42 is formed and displayed, thereby promoting the person who wants to exchange the personal data to input the retrieving conditions by using the display using the list box. In this stage as well, if "return" is instructed by the input device 113, the processing routine is returned to the genre selection in step S61.

Figure 43:
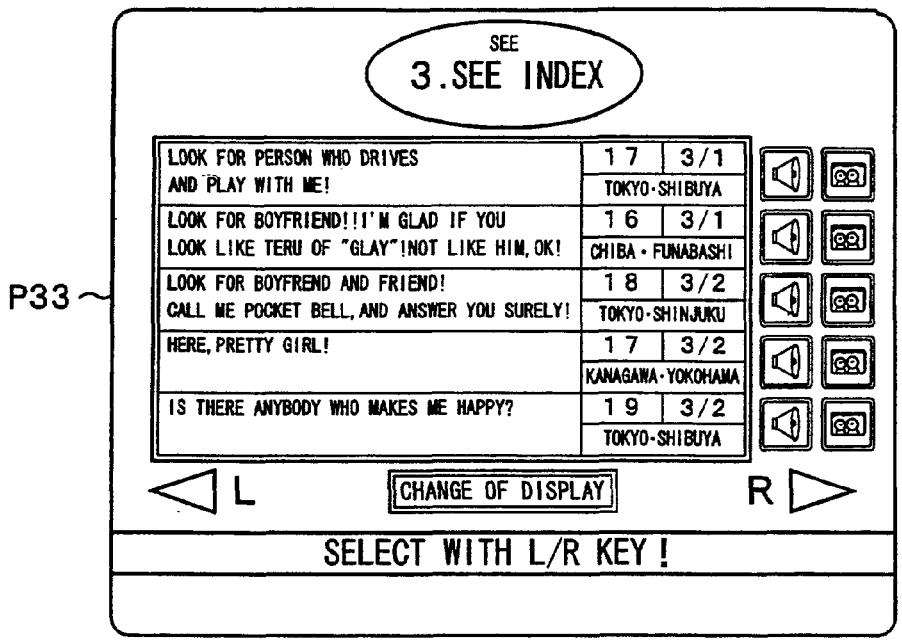
FIG. 43 is a schematic diagram showing a specific example of a screen display of a monitor provided at a terminal in the embodiment of the invention.

When the target genre and the retrieving conditions are selected, the retrieving conditions are transmitted to the server through the serial port, modem 132, and public line network 108. As a retrieval result, a group of personal data constructing elements with the relevant data ID are received from the server through the public line network 108, modem 132, and serial port. On the basis of the received data group, an image of a list picture plane P33 shown in FIG. 43 is formed by the designated list display format or by a default value if the display format is not designated and the image is displayed on the monitor 114 through the video encoder 135, thereby promoting the user to perform the selecting operation. If "return" is also selected by the input device 113, the processing routine is returned to the input of the retrieving conditions (S62).

In step S64, the presence or absence of the operating request to change the set display format is decided. When the request to change the display format is generated by the input device 113, the processing routine advances to step S65. If NO, step S66 follows.

Figure 44:
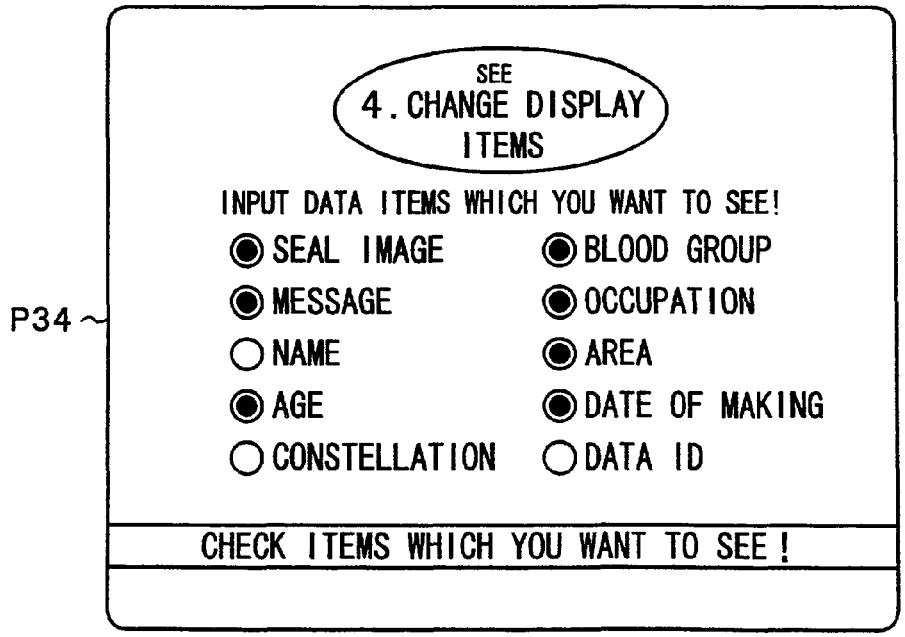
FIG. 44 is a schematic diagram showing a specific example of a screen display of a monitor provided at a terminal in the embodiment of the invention.

In step S65, an image of a picture plane P34 shown in FIG. 44 is formed and the picture plane P34 is displayed on the monitor 114. The user is allowed to select displays items by the operation from the input device 113 and a display format comprising a list of selected items is set. When the selection and setting of the display format are finished, the processing routine is returned to step S63.

A button 227 which is selected when the audio message is listened and a button 228 which is selected when the page is seen are included in the list picture plane P33 in FIG. 43. In step S66, the presence or absence of the selection of the button 227 to listen to the message is decided. When the button 227 is selected, audio message data of the relevant data ID is generated as sound from the speaker 111 in step S67.

When the button 227 is not selected, the presence or absence of the selection of the button 228 to see the page is determined in step S68. When the button 228 is not selected, the processing routine advances to other processes in step S69. In the other processes, a scrolling process, an invalid key process, and the like are executed.

Figure 16:
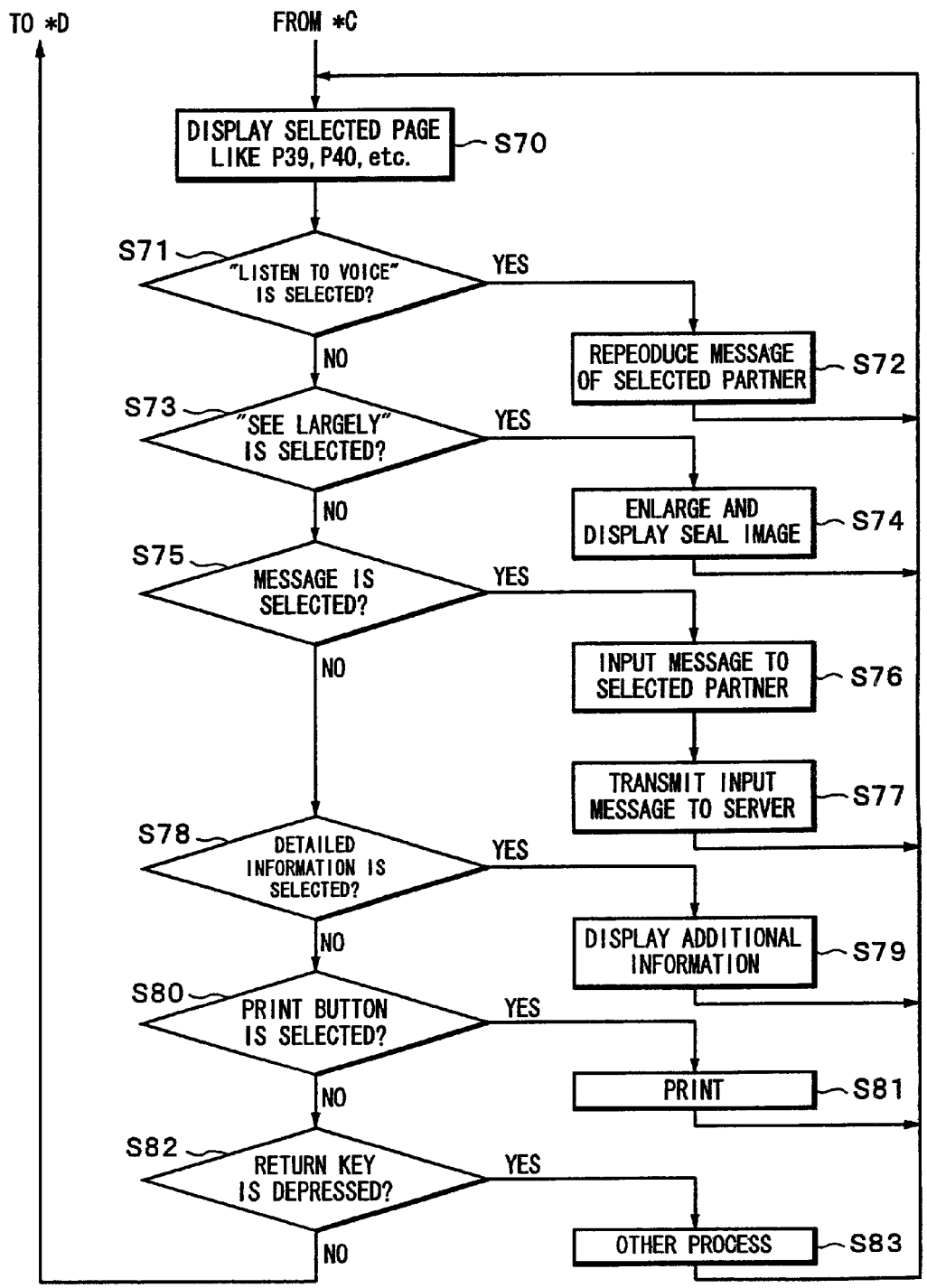
FIG. 16 is a flowchart for explaining processes in the embodiment of the invention.
Figure 49:
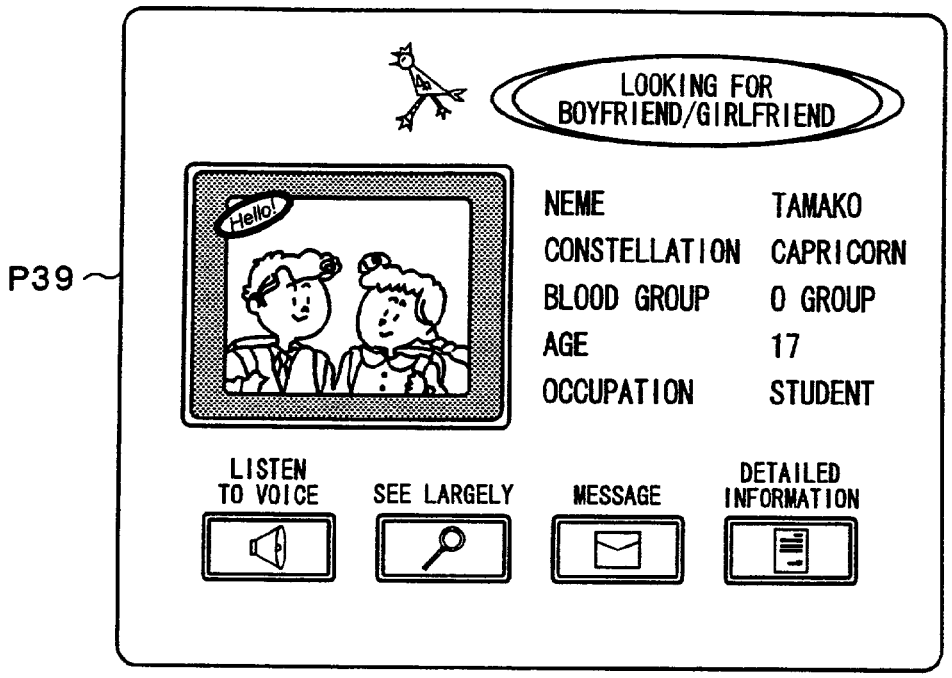
FIG. 49 is a schematic diagram showing a specific example of a screen display of a monitor provided at a terminal in the embodiment of the invention.
Figure 50:
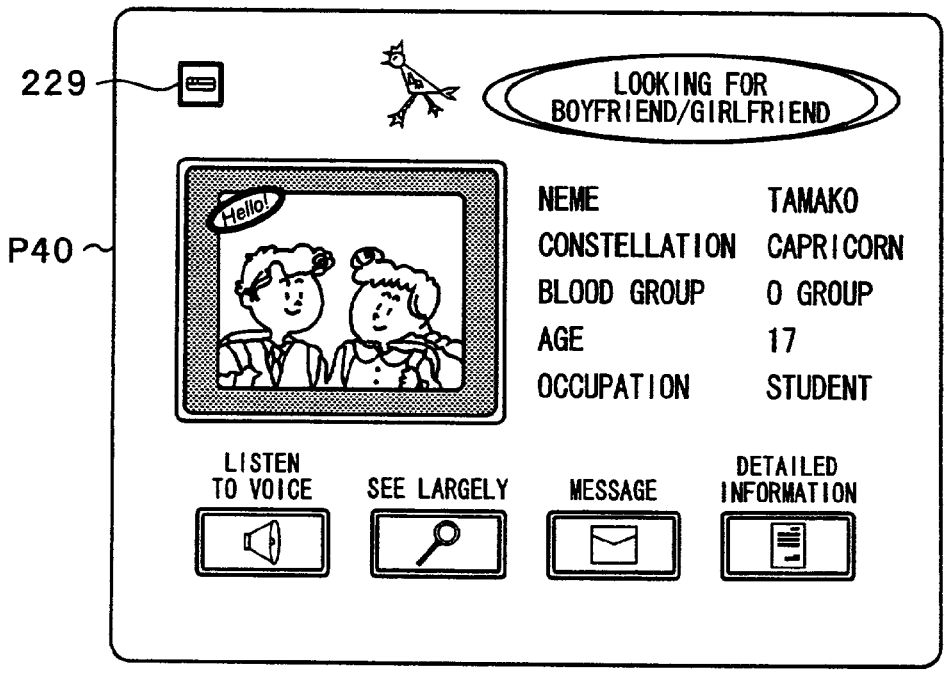
FIG. 50 is a schematic diagram showing a specific example of a screen display of a monitor provided at a terminal in the embodiment of the invention.

In step S68, when the button 228 to see the page is selected, the processing routine advances to step S70 in a flowchart of FIG. 16. In step S70, images of picture planes P39 and P40 as shown in FIGS. 49 and 50 are formed in the RAM 128 in accordance with the layout data by using the personal data selected by the button 228 to see the page and are displayed by the monitor 114.

The picture planes P39 and P40 are display examples of the personal data selected by the person who wants to exchange the personal data. As will be understood by comparing the picture planes P39 and P40, a print button 229 is displayed on the picture plane P40 at the position (left upper corner position) designated by the layout on the picture plane image. The display of the print button 229 denotes that the personal data selected by the person who desires to exchange the personal data can be printed.

That, is, if the data ID inputted by the personal data exchange desiring person who is operating at present at the time of the log-in exists in the ID as a print permission target added into the selected personal data, an image of the print button 229 is formed. If NO, the image of the print button 229 is not formed. When the print button 229 doesn't exist, although the personal data can be monitored, the selected personal data cannot be printed. An auxiliary button for monitoring is included in each of the picture planes P39 and P40. That is, a button to listen to a voice, a button to see largely, a button to send messages, and a button of the detailed information are prepared.

Whether the button to listen to the voice has been selected by the input device 113 or not is determined in step S71. When this button is selected, in step S72, if the listening button is depressed by the input device, he audio message in the selected personal data is generated as sound from the speaker 111. The processing routine is returned to step S70.

When the button to listen to the voice is not selected in step S71, a check is made in step S73 to see if the button to see largely has been selected by the input device 113. When this button is selected by the input device, in step S74, a still image in the personal data is enlarged and displayed on the screen.

If the button to see largely is not selected in step S73, a check is made in step S75 to see if the button to send the messages has been selected by the input device 113. When this button is selected by the input device, the messages are inputted in step S76. The inputted messages are transmitted to the server in step S77. The processing routine is returned to step S70.

Figures 45, 46:
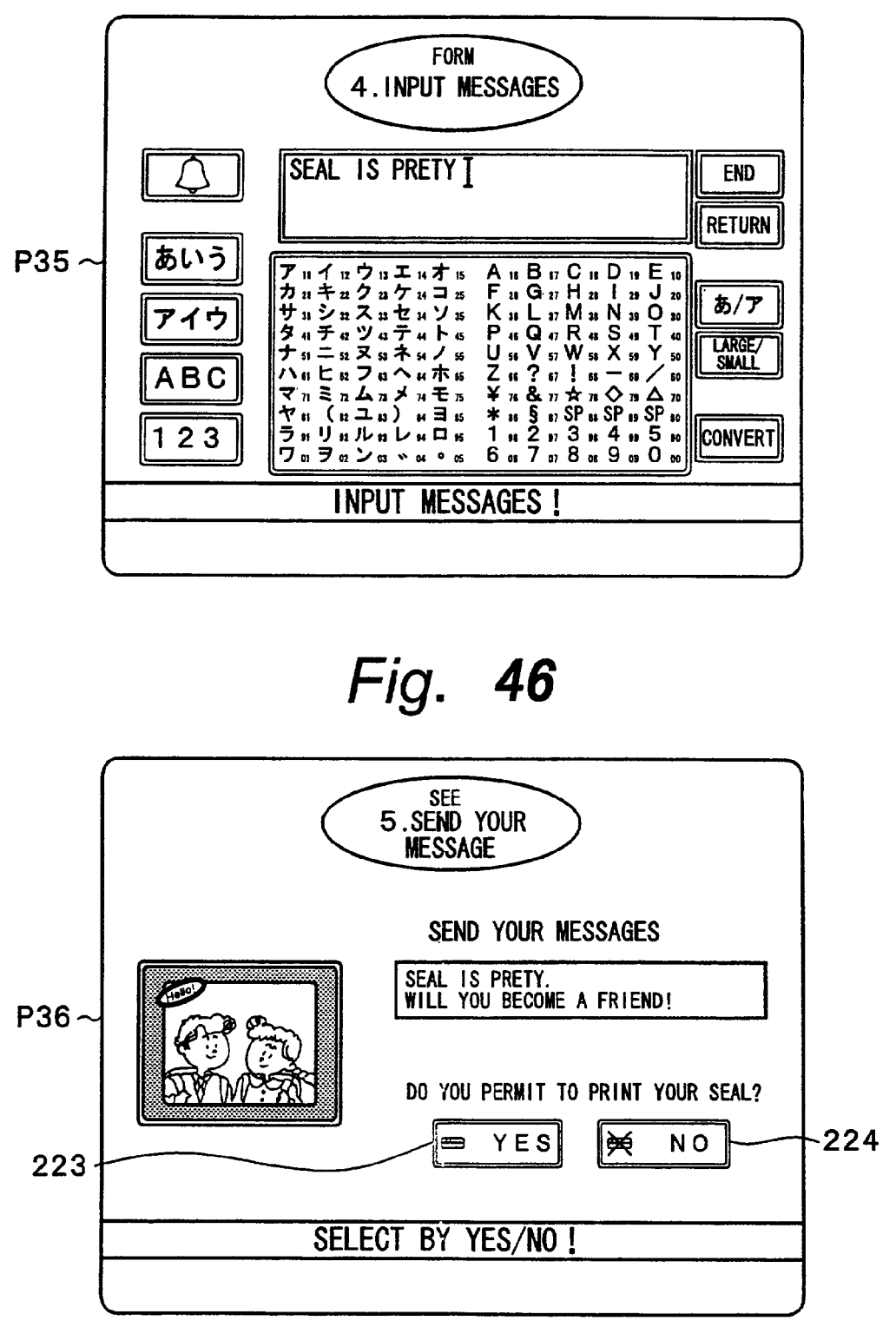

In step S76, character messages for the selected personal data making person are inputted. In case of inputting the character messages, an input table of a picture plane P35 shown in FIG. 45 is displayed. The character messages can be also inputted by using the software keyboard. Audio messages except for the character messages can be also inputted.

After completion of the inputting process of the message, a message input confirmation picture plane P36 shown in FIG. 46 is displayed by the monitor 114. Buttons 223 and 224 to select whether a print permission of the own (person who wants to exchange the personal data) personal data is issued or not for a transmission partner (person who made the personal data) of the messages are included in the picture plane P36. In case of permitting the printing, the button 223 is selected. If NO, the button 224 is selected. By issuing the print permission as mentioned above, the print permission of the personal data can be given to only the personal data making person having a specific data ID.

Upon transmission of the message in step S77, the inputted message data is transmitted to the server through the serial port, modem 132, and public line network 108 together with the data ID of the selected personal data making person and the own data ID and password. The server transmits the message data with the ID of a message inputting person (person who wants to exchange the personal data) and, at the same time, transmits a print permission selection result for the partner. Further, when the print permission is issued, a data ID of the partner is added as print permission target ID to the personal data of the person who wants to exchange the personal data. After completion of the processes, the processing routine is returned to step S70.

In step S78, whether the button of the detailed information has been selected or not is determined. When this button is selected, the detailed information associated to the personal data is displayed in step S79. That is, a part of the local display layout data in the RAM 128 is changed and the setting of the layout is changed so as to display the additional information (profile, PR data, etc.). The processing routine is returned to step S70.

When the button of the detailed information is not selected, a check is made in step S80 to see if the print button 229 has been selected. When the print button 229 is selected, in step S81, 16 divided seal images are developed in the RAM 128 and the seals are printed by the printer through the serial port by using the serial controller 129. The processing routine is returned to step S70.

When the print button is not selected, a check is made in step S82 to see if the key to return has been depressed. When the return key is depressed, in step S83, other processes, a process of an invalid key, and the like are executed. The processing routine is returned to step S70.

Figure 17:
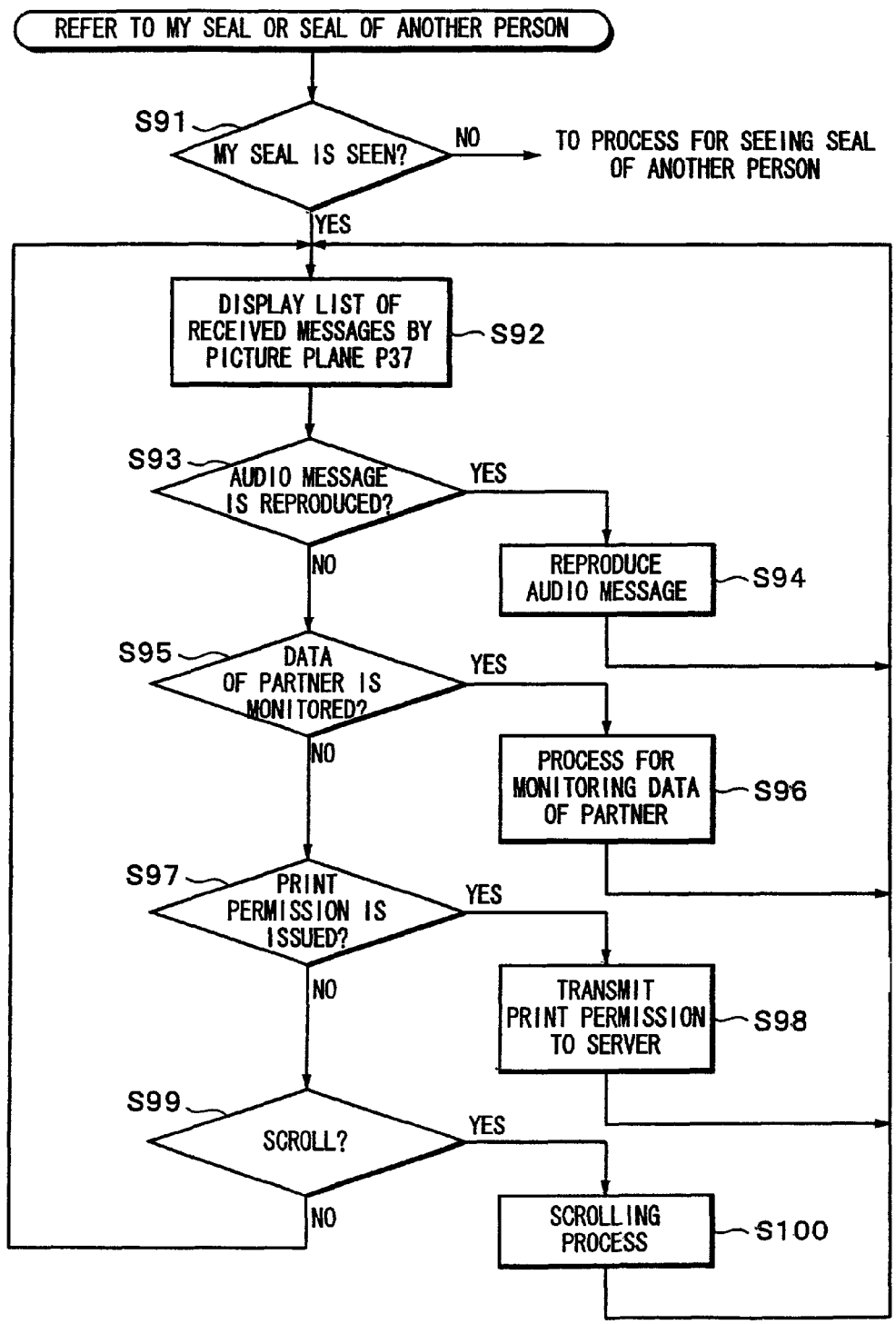
FIG. 17 is a flowchart for explaining processes in the embodiment of the invention.

A case of executing a process to refer to the own seal or the seals of the other persons instead of forming/updating the own seal in step S35 in FIG. 12 will now be described with reference to a flowchart of FIG. 17. In first step S91 in FIG. 17, a check is made to see if the user sees the own seal. In case of seeing the seals of the other persons, the processes as already described with reference to FIGS. 15 and 16 are executed.

Figure 47:
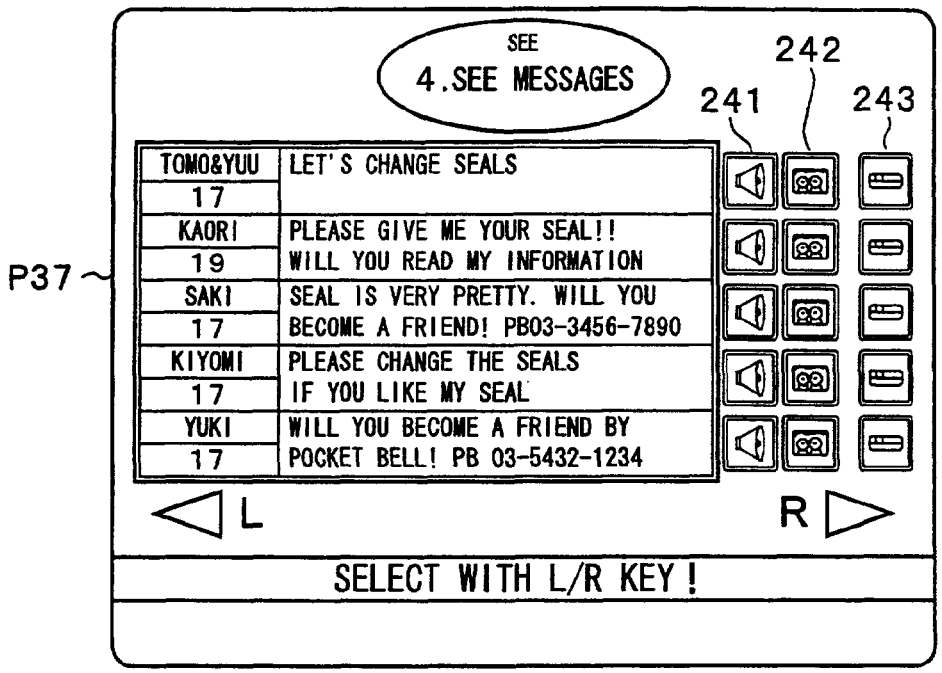
FIG. 47 is a schematic diagram showing a specific example of a screen display of a monitor provided at a terminal in the embodiment of the invention.

In step S91, when it is decided that the viewer sees the own seal, in step S92, an image of a list picture plane of reception messages is formed in the RAM 128 by a format of a picture plane P37 shown in FIG. 47 and is displayed on the monitor 114. The own data ID is designated for the server through the modem 132 and public line network 108 and a request to transmit the reception messages to which the password was added is sent. The messages transmitted to the data ID to which the transmission was requested and the data ID of the partner (person who wants to exchange the personal data) who transmitted the messages are transmitted from the server. The picture plane P37 is displayed by the data from the server. When the list picture plane P37 of the messages is displayed, a play button 241 of audio messages, a monitor button 242 of the personal data of the partner, and a button 243 of the personal data print permission of the partner for myself are also displayed.

In step S93, a check is made to see if the play button 241 of audio messages has been depressed. When the play button is selected, the audio messages are reproduced in step S94. The processing routine is returned to step S92. If NO in step S93, a check is made in step S95 to see if the monitor button 242 of the partner's personal data has been selected. When the monitor button 242 is selected, the monitoring process of the partner's personal data is executed in step S96.

That is, the personal data of the selected partner in which the monitor is demanded is requested to the server through the serial port, modem 132, and public line network 108. When the partner's personal data is transmitted from the server, a screen image is formed in the RAM 128 in accordance with the designated layout. The screen image is displayed on the monitor 114 through the video encoder 135. FIGS. 49 and 50 also show examples of the display picture planes of the partner data. When the print button 229 is displayed, this means that when the partner transmits the messages, the print permission has already been issued. Therefore, this partner's personal data can be printed. When the partner's data is monitored in step S96, the processing routine is returned to step S92.

In step S97, a check is made to see if the print permission button 243 has been selected. As mentioned above, when the print permission button 243 is selected, a print permission is transmitted to the server in step S98. The server adds the data ID of the partner to the print permission target ID of the own data ID so as to permit the printing for the data ID of the partner who transmitted the messages. The processing routine is returned to step S92.

In step S97, when the print button 243 is not depressed, step S99 follows and whether the scrolling button has been selected or not is discriminated. When the scrolling button is selected, a scrolling process is executed in step S100. Thus, the list picture plane of the reception messages is scrolled. The processing routine is returned to step S92. When the scroll button is not selected as well, the processing routine is returned to step S92.

Figure 48:
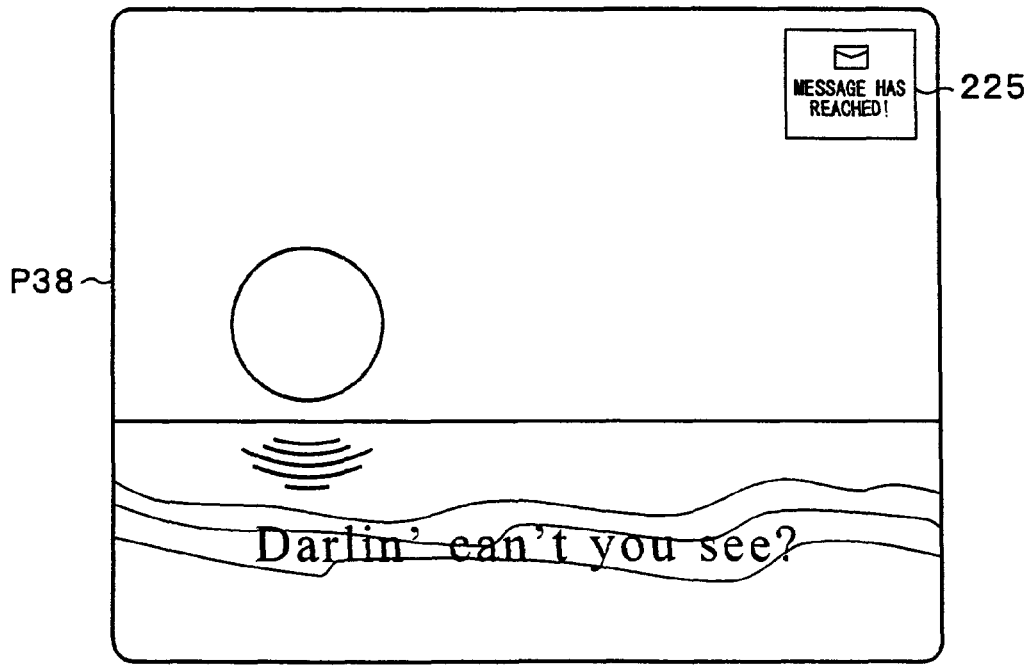
FIG. 48 is a schematic diagram showing a specific example of a screen display of a monitor provided at a terminal in the embodiment of the invention.

According to the embodiment of the invention, while the terminal is used, for example, even when it is used as a Karaoke terminal, the arrival of the messages is notified to the user in a real-time manner. As shown in FIG. 48, a notification icon and messages are displayed on the monitor screen for Karaoke (225).

As mentioned above, the personal data can be inputted and the personal data can be exchanged. Some of the processes of such a system or terminal will now be described in detail.

Figure 51:
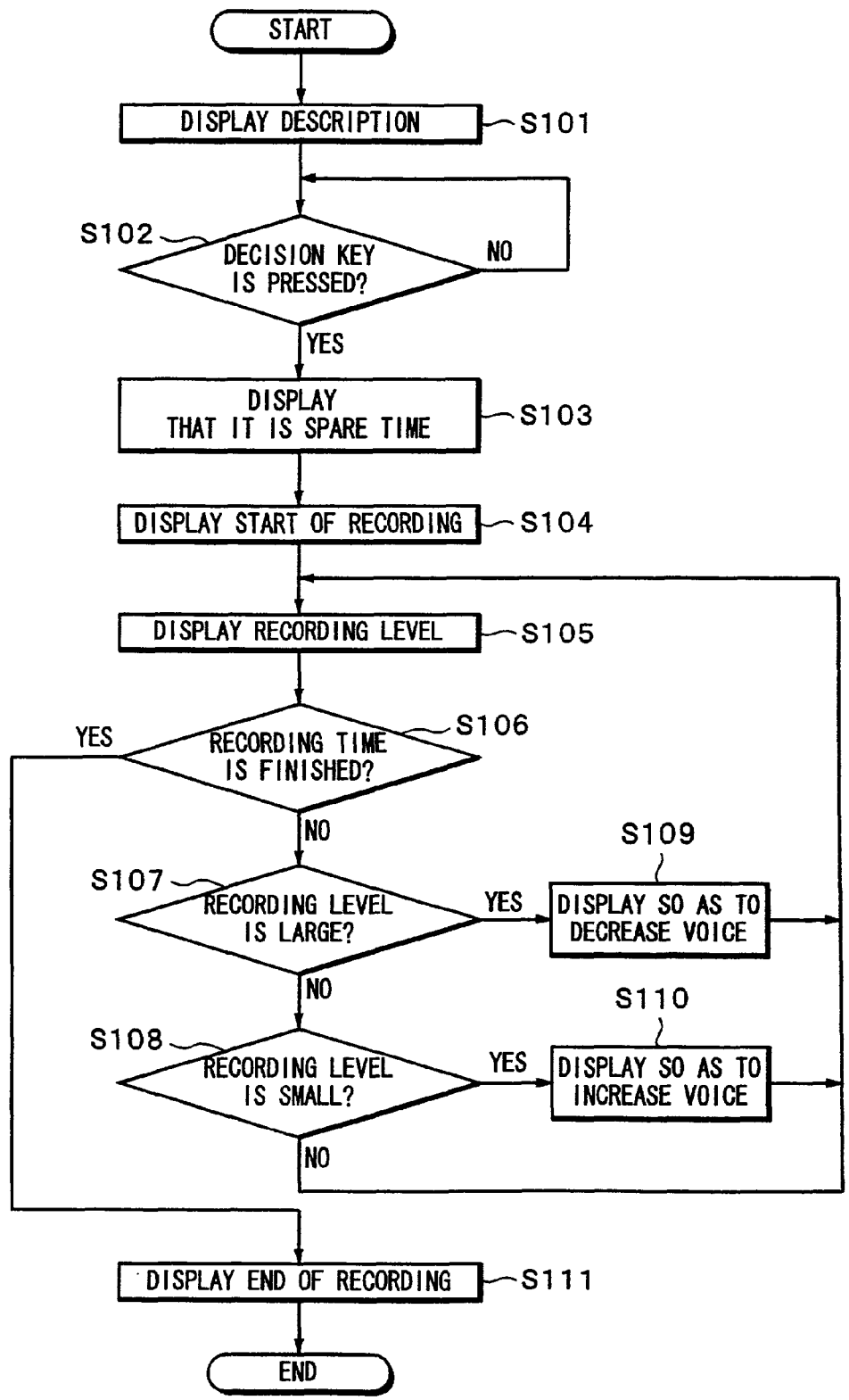
FIG. 51 is a flowchart for explaining processes in the embodiment of the invention.

First, processes when the audio messages as auxiliary information of the personal data are inputted at each terminal or when audio messages which the person who wants to exchange the personal data intends to transmit the messages to the personal data making person are inputter will now be described with reference to a flowchart of FIG. 51. Although the above processes have already been described with reference to the display picture plane P8 on the monitor 114 in FIG. 26, a more detailed control will now be described. That is, a method of registering audio data as auxiliary information by the user, a method of displaying the timing at the start of the recording, and a method of displaying the present recording level at the time of the audio recording of the user and paying attention to the user in the case where the recording level is out of a specified level will now be described.

The programmable DSP 127 of the terminal with the construction shown in FIG. 10 allows the description and display of the audio message input to be developed in the RAM 128 by using the data in the hard disk 126. The picture plane data is sent to the video encoder 135. The programmable DSP 127 allows the input from the video encoder 135 to be outputted to the external monitor 114 by using the switcher 136 (step S101). In step S102, the depression of the decision key is monitored.

When the user detects the code corresponding to the decision key on the commander connected to the serial controller 129 from the serial controller 129, the programmable DSP 127 progresses the processes to step S103. If no code is detected or the input code is other than the code of the decision button, the processing routine is returned to step S102. In step S103, a message indicating that the system is in a spare time is displayed.

The programmable DSP 127 forms an internal variable into the RAM 128 by using a timer of a predetermined interval and increases the variable by "1" every count of the timer. By using the internal variable and the icon image data of the microphone in the hard disk 126, the animation picture plane 213 indicating that the recording process is at present preparing and is shown in FIG. 26 is developed in the RAM 128. In this instance, the animation data is developed at the display position corresponding to the internal variable. The picture plane data is sent to the video encoder 135 and is outputted to the external monitor 114.

In step S104, the programmable DSP 127 designates the start of the A/D conversion for the AD/DA converter 138. In the display of the recording start in step S104, the programmable DSP 127 allows the recording start picture plane P8 shown in FIG. 26 to be developed in the RAM 128 by using the data in the hard disk 126. The picture plane data is sent to the video encoder 135. The programmable DSP 127 receives the signals obtained by converting the audio signals which are successively sent from the switcher 136 through the microphone 112 into the digital signals by the AD/DA converter 138 and sequentially stores onto the hard disk 126.

In step S105, the programmable DSP 127 reads the value of the present recording level from the AD/DA converter 138 and allows the display picture plane of the present recording level shown in FIG. 26 to be developed into the RAM 128 by using such a value and the data for screen display in the hard disk 126. In this instance, the level indicator 212 corresponding to the value of the recording level is developed and the picture plane data is sent to the video encoder 135.

In step S106, a check is made to see if the recording time has finished. The programmable DSP 127 counts by using the internal timer while using the sum of the recording time as a variable. By using such an internal variable and the icon image data of the microphone in the hard disk 126, the programmable DSP 127 allows the animation picture plane 213 of the microphone which is at present recording and shown in FIG. 26 to be developed in the RAM 128. In this instance, the animation data is developed at the display position corresponding to the internal variable and the picture plane data is sent to the video encoder 135 and is outputted to the external monitor 114. If the variable or the recording time exceeds a specific counter value, the processing routine advances to step S111.

When it is decided in step S106 that the variable of the recording time lies within the recording time, a check is made in step S107 to see if the recording level is larger than a specific level. If it is not larger, a check is made in step S108 to see if the recording level is smaller than the specific level. That is, the programmable DSP 127 reads out the present recording level from the AD/DA converter 138. When it is larger than the specific level, a message to pay attention such as "reduce your voice" or the like is formed by using the data in the hard disk 126, the picture plane data is developed in the RAM 128, and the picture plane data is sent to the video encoder 135 (step S109). The processing routine is returned to step S105.

In step S108, the programmable DSP 127 reads out the present recording level from the AD/DA converter 138. When it is smaller than the specific level, a message to pay attention such as "increase your voice" or the like is formed by using the data in the hard disk 126, the picture plane data is developed in the RAM 128, and the picture plane data is sent to the video encoder 135 (step S110). The processing routine is returned to step S105.

In step S106, when it is determined that the recording time has been finished, the end of recording is displayed in step S111. The programmable DSP 127 sends the set data of the end of A/D converting process to the AD/DA converter 138. Picture plane data to notify of the end of recording such as "the recording is finished" or the like is formed by using the data in the hard disk 126. The picture plane data is developed in the RAM 128 and the picture plane data is sent to the video encoder 135.

Figure 52:
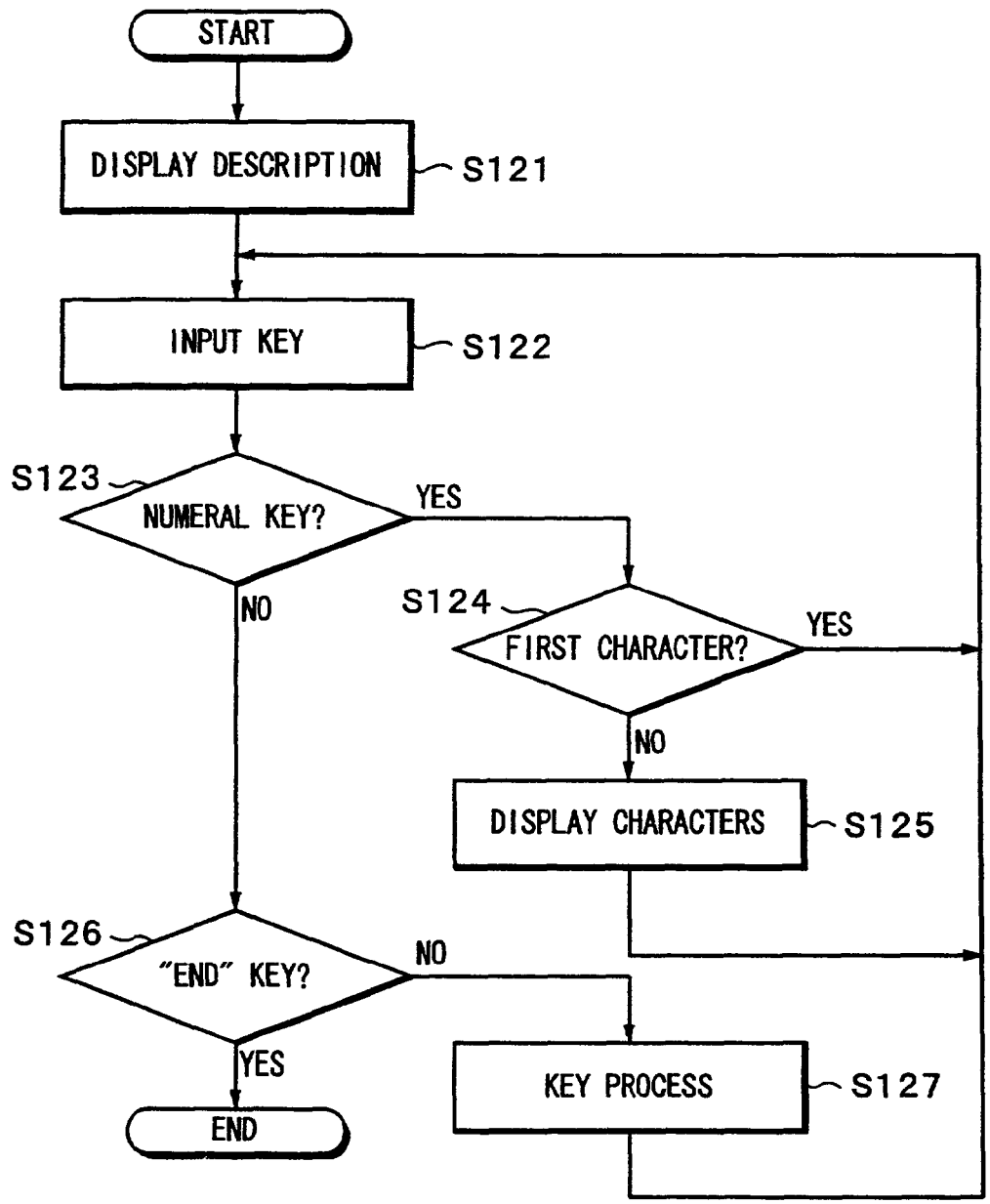
FIG. 52 is a flowchart for explaining processes in the embodiment of the invention.

According to the embodiment of the invention, as described with reference to the display picture plane P10 shown in FIG. 28 mentioned above, the character data can be inputted by numerals of two digits. Such an inputting method is similar to the character inputting method in case of the pocket bell. Processes at the time of the character input will now be described with reference to a flowchart of FIG. 52.

In step S121, the display picture plane P10 in FIG. 28 is displayed. This display is a table (key input picture plane) showing the corresponding relation between the numerals of two digits and the characters. The programmable DSP 127 forms a screen image into the RAM 128 and its data is outputted to the video encoder 135. The programmable DSP 127 switches the switcher 136, thereby allowing the input from the video encoder 135 to be outputted to the external monitor 114.

In step S122, the system waits for a key input. The programmable DSP 127 waits for a key input from the user via the serial controller 129. When there is a key input, the DSP 127 receives the key code. The serial controller 129 is connected to the external input device 113. In step S123, a check is made to see if the input key is a "numeral key". When it is determined that the input key is the numeral key, the programmable DSP 127 discriminates from the received key code whether the input key indicates the "first character" (step S124).

In step S125 (character is displayed), if the received key code indicates the second character of the numerals, the programmable DSP 127 forms a screen image into the RAM 128 by making the key code and the character correspond to each other. Its data is outputted to the video encoder 135. The programmable DSP 127 switches the switcher 136, thereby allowing the input from the video encoder 135 to be outputted to the external monitor 114.

In step S123, when the received key code does not indicate the "numeral key", the programmable DSP 127 discriminates whether the received key code indicates an "end key" or not. In case of the "end key", the processes are finished. When the received key code is other than the "numeral key" and "end key", the programmable DSP 127 executes a process according to the received key code (step S127).

Figure 53:
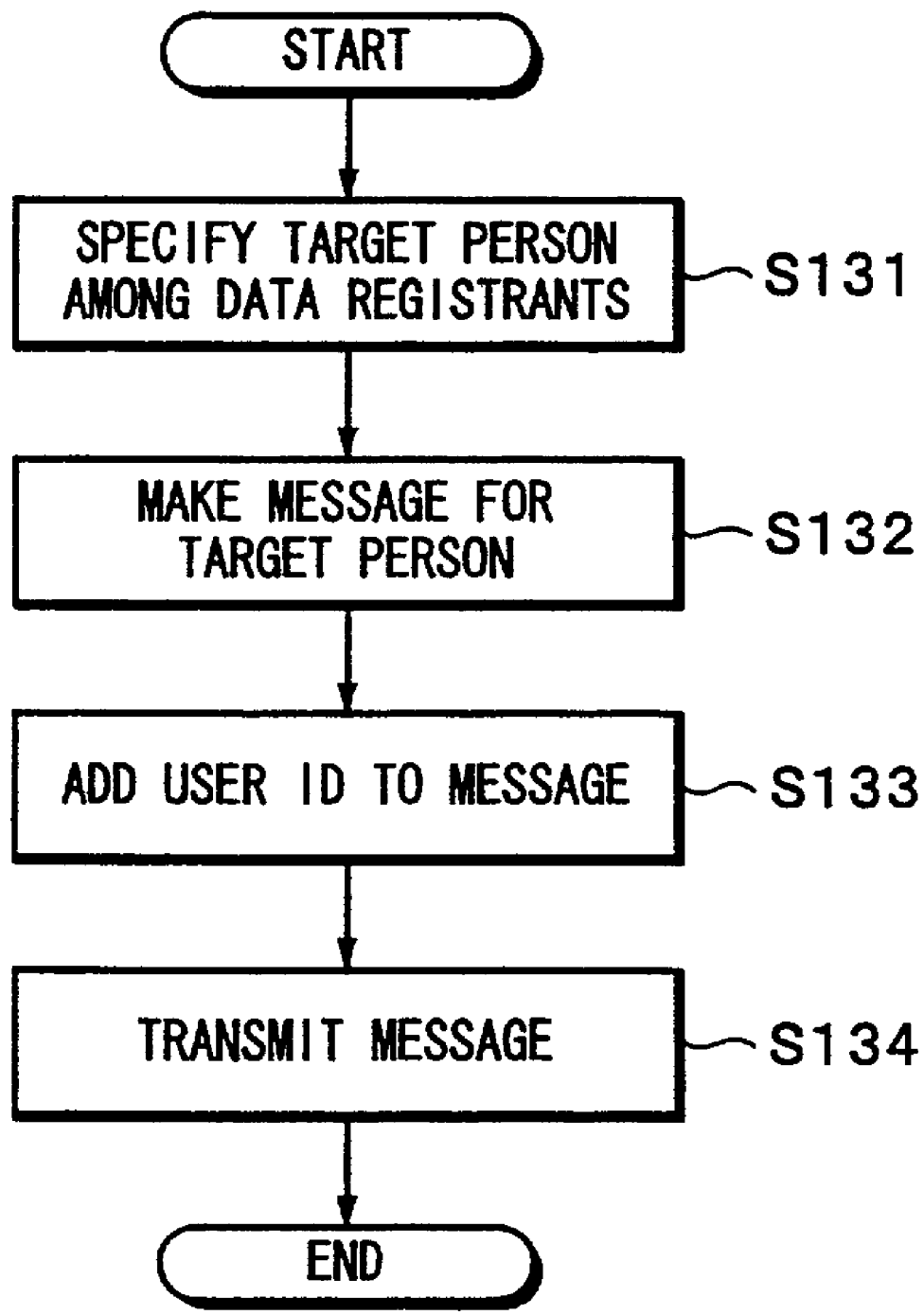
FIG. 53 is a flowchart for explaining processes in the embodiment of the invention.

The personal data exchanging process in the embodiment of the invention will now be described in detail. As mentioned above, according to the embodiment of the invention, when the messages are informed to the person who makes the personal data, the person who wants to exchange the personal data adds the data ID of the personal data of the person himself who wants to exchange the personal data in addition to the messages and transmits the resultant data. This process will now be described with reference to a flowchart of FIG. 53. FIG. 53 is an operation flow of the terminal on the user (person who desires to exchange the personal data) side who intends to exchange the personal data.

In step S131, a target person who intends to exchange the personal data is specified by the monitor 114 for displaying the personal data from the personal data making persons of the personal data which have previously been registered while looking at the message display picture plane P33 in FIG. 43.

In step S132, in order to exchange the personal data, the user performs a key input from the input device 113 to a target person specified by using the message input picture plane P35 shown in FIG. 45 and forms messages in the RAM 128 by the programmable DSP 127.

In step S133, the user ID is automatically added to the messages formed in the RAM 128 by the programmable DSP 127 by the key input of the end of input from the input device 113 by using the message confirmation picture plane P36 as shown in FIG. 46.

In step S134, the programmable DSP 127 controls the serial controller 129 and the formed messages to which the user ID was added are sent to the server through the public line network 108 by the modem 132. The messages are transmitted from the server through the data transmission center 101.

Figure 54:
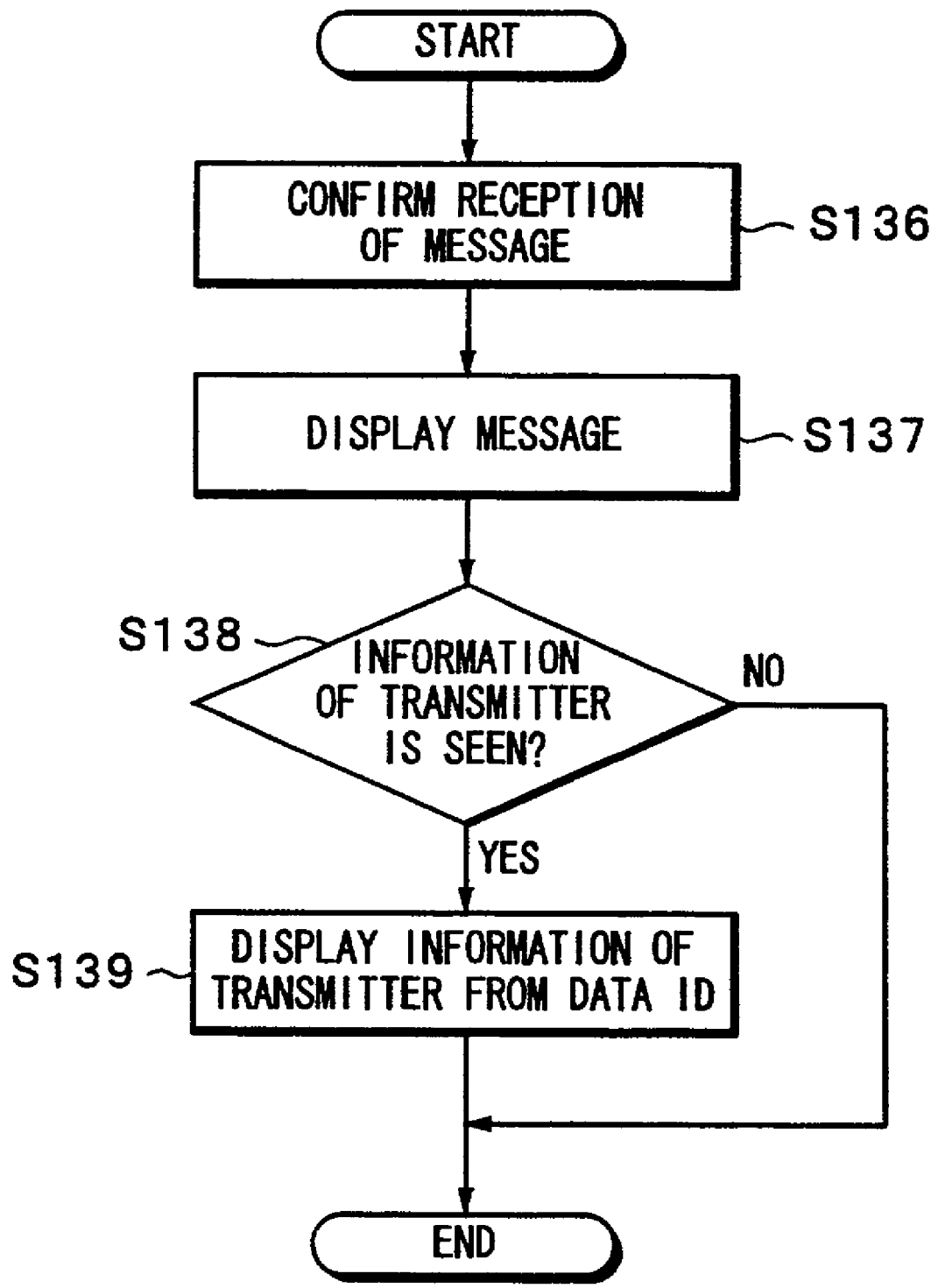
FIG. 54 is a flowchart for explaining processes in the embodiment of the invention.
Figure 55:
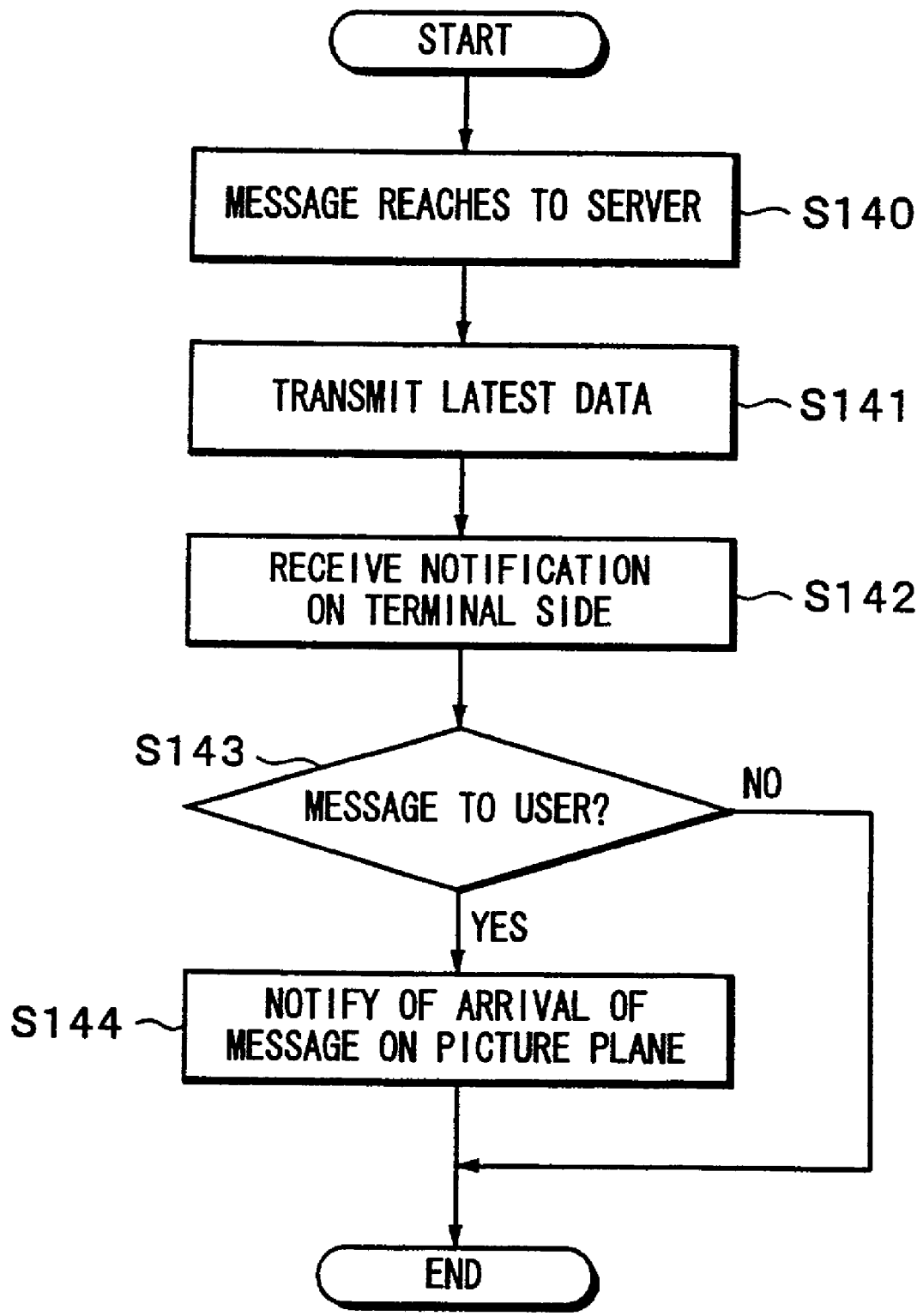
FIG. 55 is a flowchart for explaining processes in the embodiment of the invention.

At the terminal of the personal data making person who receives the messages formed as mentioned above, processes according to a flowchart shown in FIG. 54 are executed. The data received by the receiving antenna 104 and IRD 105 of the terminal is decoded by the data converter 122 and is stored into the hard disk 126. At the same time, the programmable DSP 127 confirms that the messages are messages from the user who wants to exchange the personal data (step S136).

The programmable DSP 127 forms a display image of the contents of the messages into the RAM 128 from the data stored in the hard disk 126. Further, it is displayed on the personal data display monitor 114 on the outside through the video encoder 135 and switcher 136 (step S137).

In step S138, the user discriminates by the key input from the input device 113 whether the information of a transmitter who desires to exchange the personal data is seen or not. If NO, the processing routine is finished. If YES in step S138, the programmable DSP 127 confirms that the key input indicates a display request, retrieves the data of the transmitter from the hard disk 126 on the basis of the user ID, forms a screen image for display into the RAM 128, and outputs to the video encoder 135. Further, it is displayed on the external personal data display monitor 114 by the switcher 136.

According to the embodiment of the invention, as described with reference to FIG. 48, when the personal data making person is operating the terminal, for example, when the terminal is used as a Karaoke terminal, if the messages to the personal data making person are preserved in the server, a fact that the messages were preserved is informed to the personal data making person in a real-time manner. Processes in this case will now be described with reference to FIG. 54.

In step S140 in FIG. 54, the messages inputted by the person who wants to exchange the seals reach the database server provided in the data transmission center 101 through the public line network 108. In step S141, the updated information is transmitted from the data transmission center 101 by using the up-link center 102 and satellite 103.

In step S142, the updated data transmitted by the receiving antenna 104 and IRD 105 is received and stored into the hard disk 126 through the data converter 122. In step S143, the programmable DSP 127 retrieves whether the messages to the user who uses the terminal exist in the data stored in the hard disk 126 or not.

When there are the messages to the user, the programmable DSP 127 forms a display image 225 of a message arrival picture plane in FIG. 48 into the RAM 128. Further, the display image is displayed on the personal data display monitor 114 through the video encoder 135 and switcher 136 (step S144).

Figure 56:
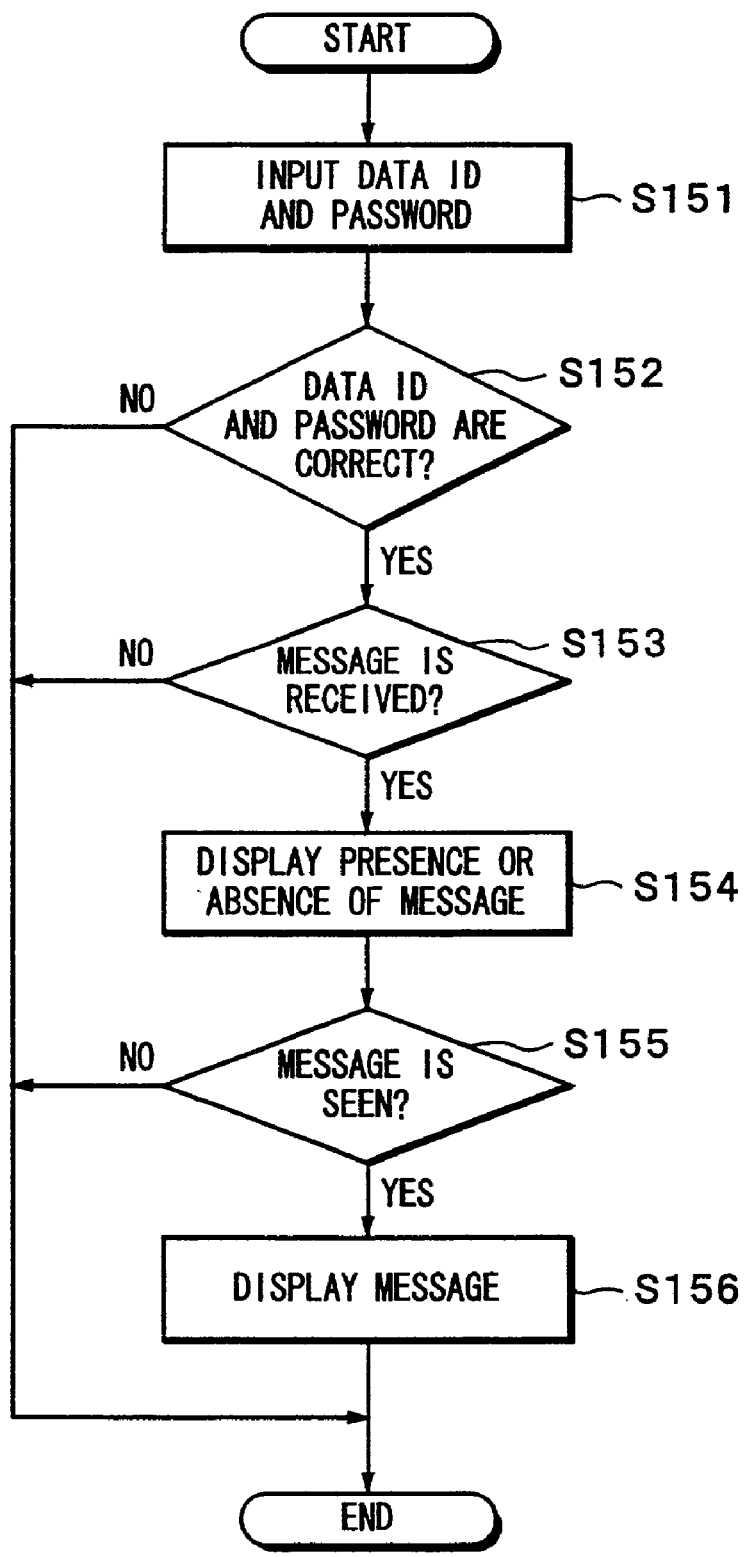
FIG. 56 is a flowchart for explaining processes in the embodiment of the invention.

According to the foregoing embodiment of the invention, when the person who wants to exchange the personal data allows the messages transmitted to the personal data making person to be displayed to the terminal of the personal data making person, it is necessary to input the data ID and password. Processes in this case will now be described with reference to a flowchart of FIG. 56.

In first step S151, a display as shown at 231 in FIG. 57 occurs on the monitor 114 and when the viewer wants to see the messages, the data ID and password are inputted. In step S152, whether the data ID and password are correct or not is asked to the server and is determined.

The programmable DSP 127 discriminates in step S153 to see the messages have been received. When there is no message received, the processing routine is finished. That is, the data is received by the receiving antenna 104 and IRD 105 and is stored into the hard disk 126 through the data converter 122. Further, whether the messages to the user who uses the terminal exist in the data stored in the hard disk 126 or not is retrieved by the programmable DSP 127. If YES, this fact is displayed. In step S155, a display shown at 232 in FIG. 57 is performed. A fact that there are the received messages is displayed and the user is promoted to select whether he wants to see the messages or not.

When it is determined that the user wants to see the messages, in step S156, the messages are displayed. A display 233 in FIG. 57 is an example of a display of messages.

Figure 58:
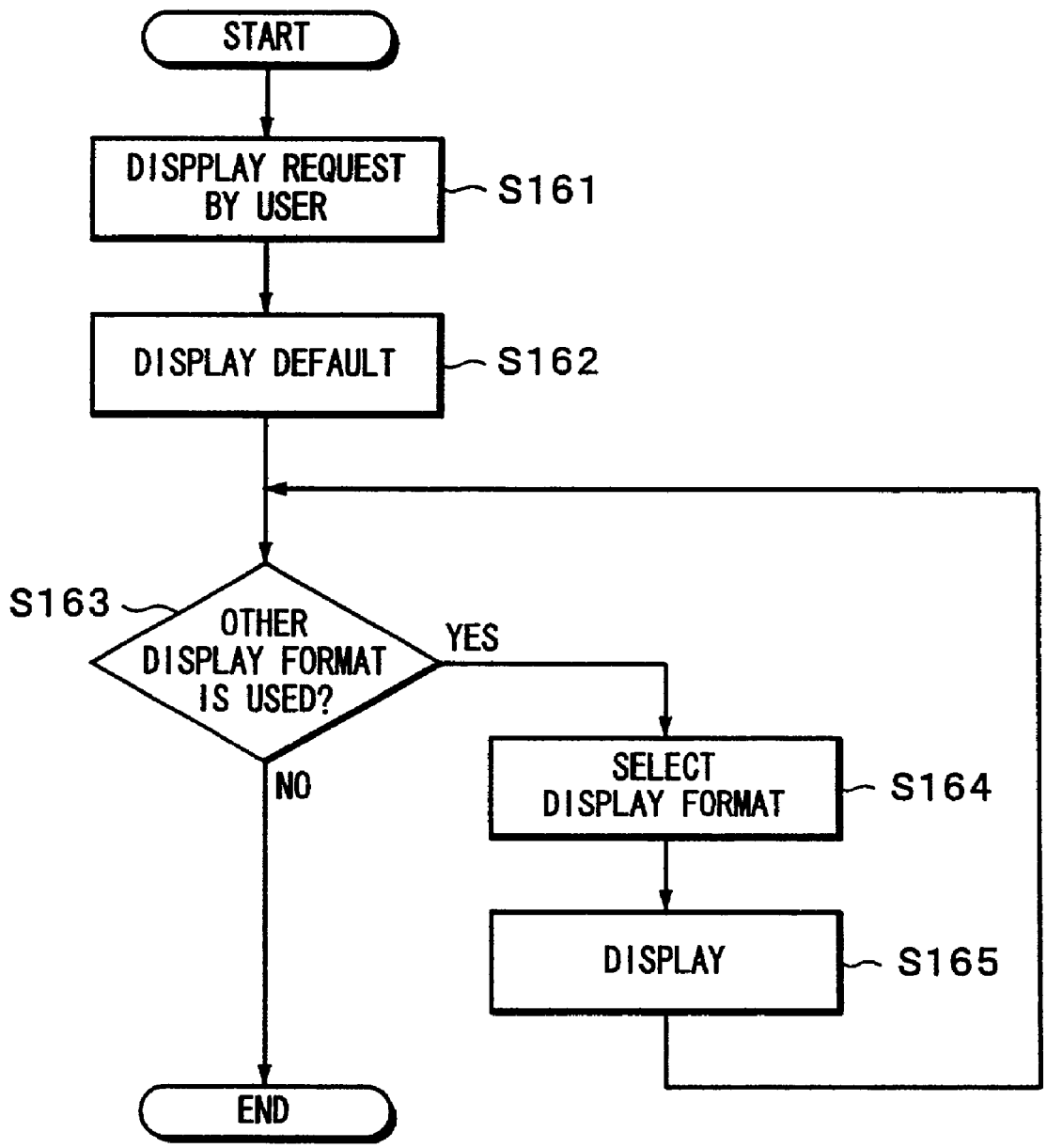
FIG. 58 is a flowchart for explaining processes in the embodiment of the invention.

According to the embodiment of the invention, when the user who intends to exchange the personal data (personal data exchange desiring person) searches the target person from the personal data making persons, a display format of the information can be selected. For example, as a display format, any one of a format of only the regular messages in the auxiliary information, a format of the regular messages and additional information in the auxiliary information, a format of only the seal data, a format of the seal data and auxiliary information, and the like can be used. The selection of the display format will now be described with reference to a flowchart of FIG. 58. The flowchart relates to an operation flow on the terminal side which receives messages.

In step S161, the presence or absence of a display request of the user is determined. To see or retrieve information of the other users which has previously been registered, the user operates a button for a display request or performs a key input by the input device. The input of the display request is transferred to the programmable DSP 127 via the serial controller. The programmable DSP 127 confirms that it is the display request, and forms a screen image for displaying a default into the RAM 128. It is outputted to the video encoder 135. Further, an information display picture plane of the users which has already been registered as shown by P33 in FIG. 43 is displayed on the personal data display monitor 114 by the video switcher 136 (step S162).

When the user wants to see the information by a format other than the default display, he selects a change in display by operating a button or performing a key input by the input device. In the other cases, since the user sees the information by the original format, the processing routine is finished. When the change in display format is selected, the programmable DSP 127 confirms that the selection input indicates a changing request of the display picture plane, forms a screen image for default display into the RAM 128, and outputs to the video encoder 135. Further, the item selection picture plane P32 as shown in FIG. 42 is displayed on the personal data display monitor 114 by the video switcher 136. The user sees the picture plane P32 and selects by which format he wants to see the information by a button operation or a key input by the input device (step S164).

In step S165, the selection input is transferred to the programmable DSP 127 via the serial controller 129. The programmable DSP 127 forms a screen image for display by the designated items into the RAM 128 on the basis of the selected item of the displaying request and the information of the selected format is displayed on the monitor 114 (step S165).

Figure 59:
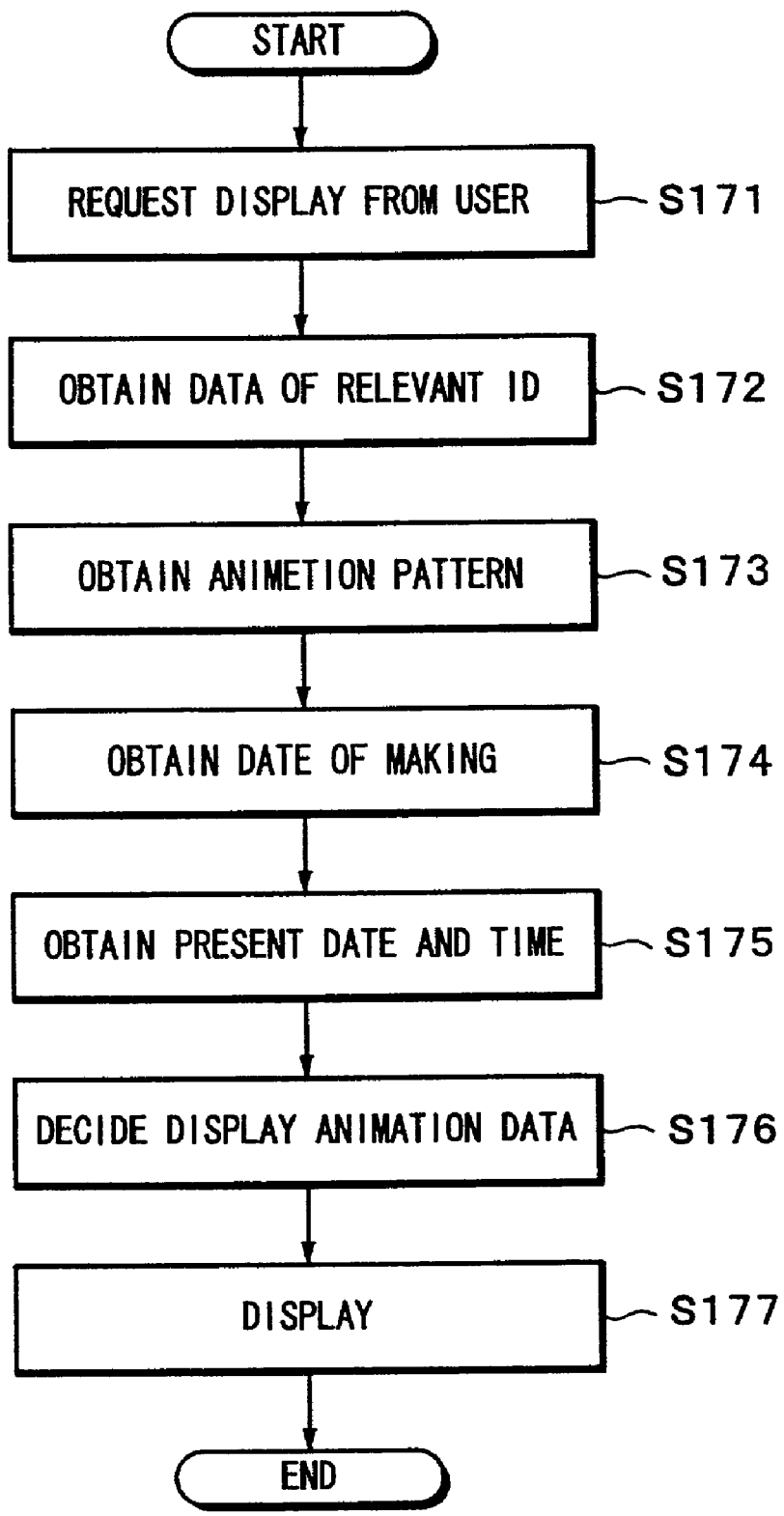
FIG. 59 is a flowchart for explaining processes in the embodiment of the invention.

According to the embodiment of the invention, as described with reference to the display picture plane P18 shown in FIG. 36, the animation icon which changes depending on the number of elapsed days from the date of making the personal data is used. That is, when the user reads the personal data including the face image by the animation icon, the time when the original data of the personal data is formed and the animation icon which changes depending on the time of the reading are displayed together with the face image. Processes in this case will now be described with reference to FIG. 59.

When there is a displaying request from the user in step S171, the programmable DSP 127 develops a face image data read selection picture plane into the RAM 128 by using the data in the hard disk 126 and the picture plane data is sent to the video encoder 135. When the user detects the code corresponding to a read selection button on the commander 116 connected to the serial controller 129 from the serial controller 129, the programmable DSP 127 progresses the process to step S172. If there is no code or the code is other than the code of the decision button, the processing routine is returned to step S171.

In step S172, the data of the relevant data ID is obtained. On the basis of the data ID corresponding to the face image data selected by the user in step S171, the programmable DSP 127 retrieves a logic position, for example, a file name where the face image data exists in the hard disk 126. After the retrieval, the found face image data is read out from the hard disk 126 and developed and held in the RAM 128.

In step S173, an animation pattern is obtained. The programmable DSP 127 obtains a pattern ID indicative of a plurality of animation patterns which are used together with the face image data from the data structure in the face image data obtained in step S172 and stores the pattern ID as a variable into the RAM 128.

In step S174, the date of making the personal data is obtained. The programmable DSP 127 obtains the information of the date of making the original data which is used together with the face image data from the face image data obtained in step S172, and holds the making date as a variable into the RAM 128.

In step S175, the present date and time are obtained. The programmable DSP 127 designates so as to transmit MPEG2/TS (transport stream) in which the present time information is included to the data converter, obtains the present time from the information in the TS, and stores in the RAM 128.

In step S176, display animation data is determined. The programmable DSP 127 obtains differential information of date and time from the date making date and the present time obtained in steps S174 and S175 and determines display animation data from the animations obtained in step S173. The animation data is developed in the RAM 128.

In step S177, the animation is displayed. The programmable DSP 127 transmits the face image data developed in the RAM 128 in step S172 to the video encoder 135 and allows the face image data to be displayed on the external monitor 114. Further, the animation data obtained in step S173 is periodically transmitted to the video encoder 135 and the animation is displayed onto the monitor 114.

Figure 60:
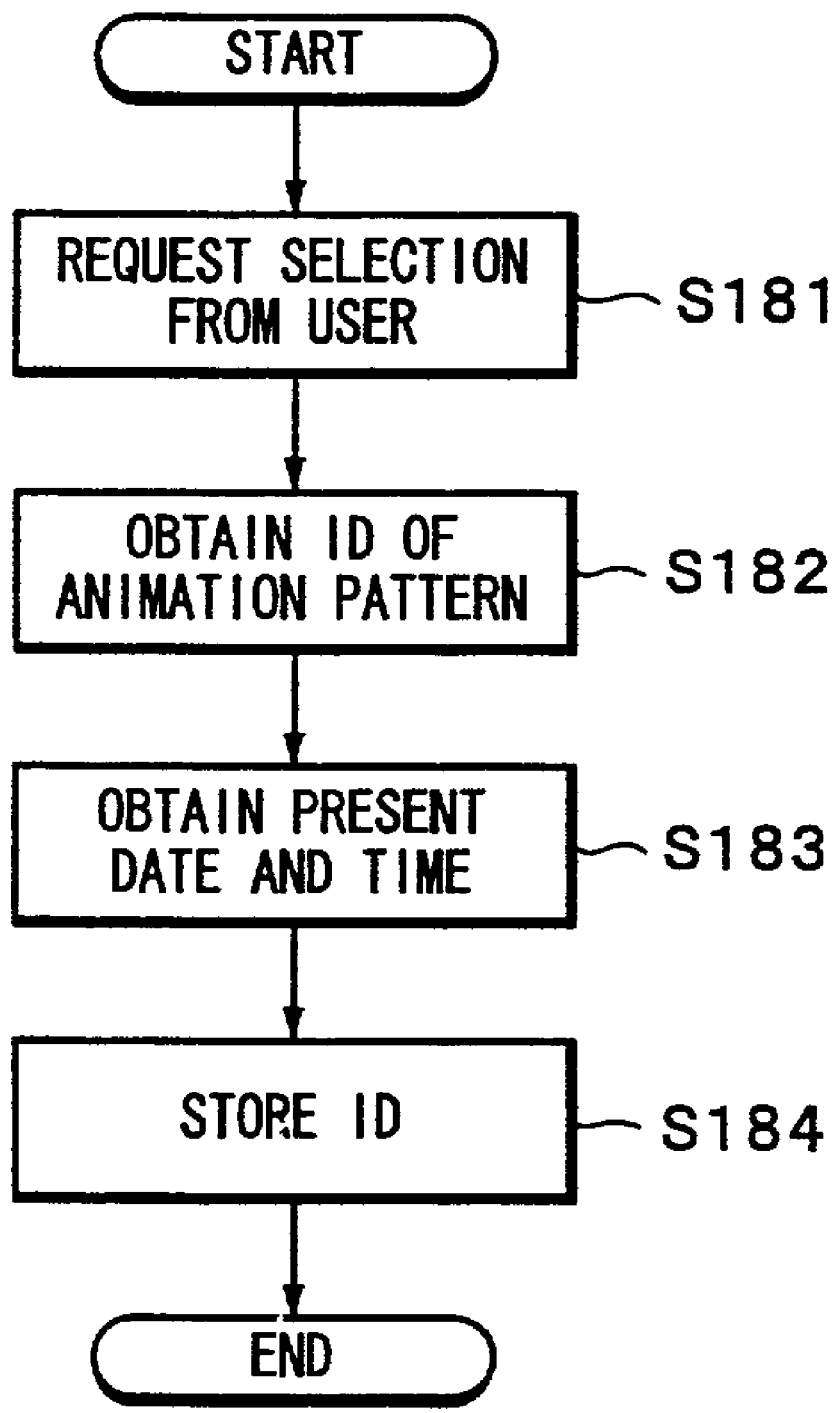
FIG. 60 is a flowchart for explaining processes in the embodiment of the invention.

A method whereby the time when the original data of the seal data is made and the animation icon which changes depending on the time of reading are inputted together with the face image (seal data) when the user forms the seal data including the face image from the example of the animation selecting process like a display picture plane P18 as shown in FIG. 36 will now be described with reference to a flowchart of FIG. 60.

In step S181, a selecting request is issued from the user. The programmable DSP 127 develops the animation icon selection picture plane P18 shown in FIG. 36 into the RAM 128 by using the data in the hard disk 126 and the picture plane data is sent to the video encoder 135. When the user detects the code corresponding to the animation icon selection button on the commander connected to the serial controller 129 from the serial controller 129, the programmable DSP 127 progresses the process to step S182. If there is no code or the code is other than the code of the decision button, the processing routine is returned to step S181.

In step S182, the ID of the animation pattern is obtained. The ID of the corresponding pattern is obtained from the animation pattern selected in step S181 and is stored in the RAM 128.

The present date and time are obtained in step S183. The programmable DSP 127 designates so as to transmit MPEG2/TS in which the present time information is included to the data converter 122 while using the ID obtained in step S182 as information to decide the method of displaying the animation when the face image data is read later, obtains the present time from the information in the TS, and stores it as a variable into the RAM 128.

In step S184, the ID is reserved. The programmable DSP 127 transfers each ID obtained in steps S182 and S183 to the hard disk 126 and records.

Figure 61:
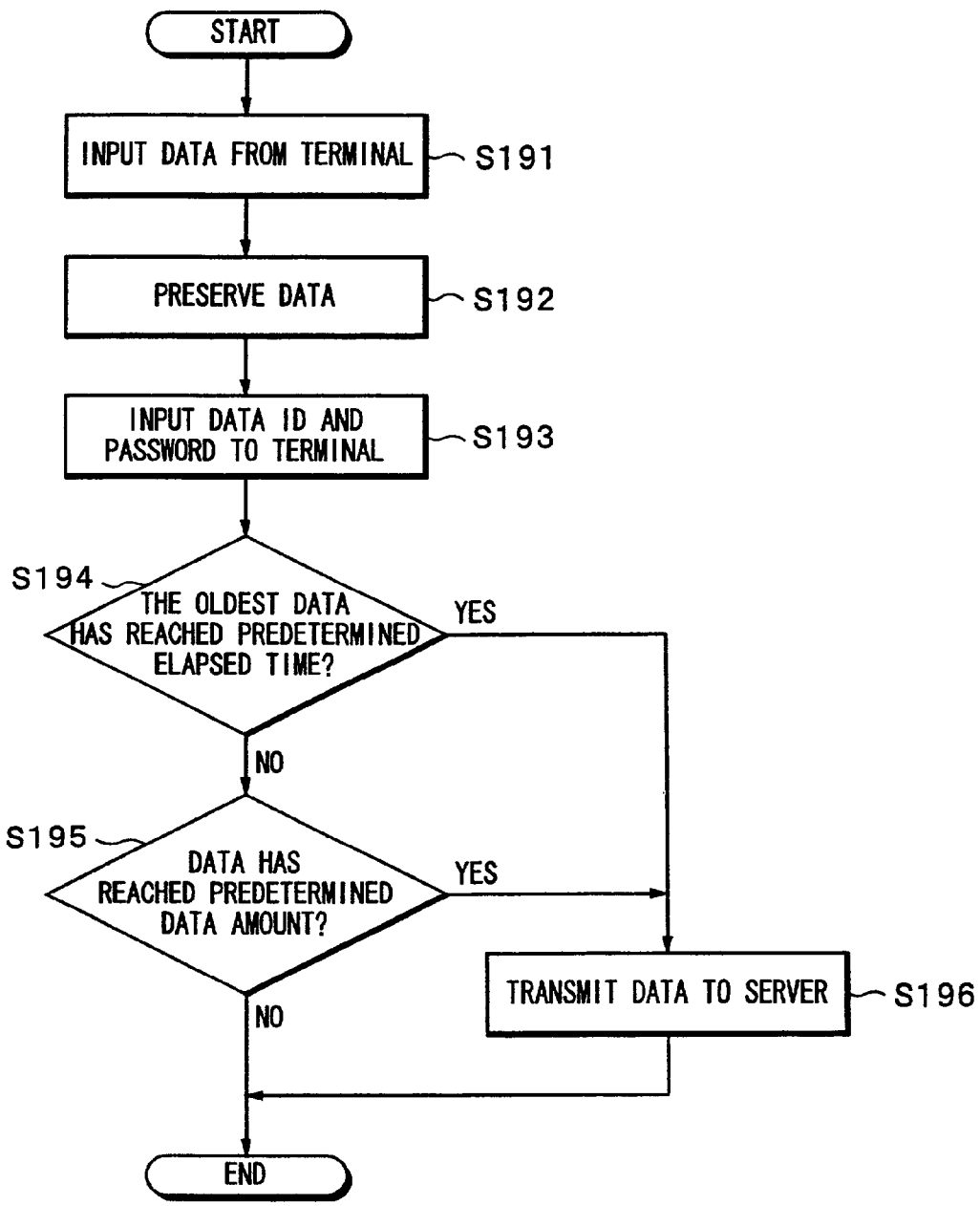
FIG. 61 is a flowchart for explaining processes in the embodiment of the invention.

According to the embodiment of the invention, a plurality of terminals are collected by the gateway 150 as described with reference to FIGS. 9 and 11. The personal data, auxiliary information, messages, and the like from the terminal are collectively transmitted to the server by the gateway every period. The above operation will now be described. First, the operation and function on the gateway side will be described with reference to FIG. 61.

In first step S191, the data input from the terminal is received. The CPU 155 receives the data from the terminal via the network I/F 157 and stores into the RAM 156.

The data is preserved in step S192. The CPU 155 writes the data in the RAM 156 into the hard disk 154 and updates an index of the data stored in the hard disk 154.

The data ID and password are outputted in step S193. The CPU 155 confirms that the data has correctly been written into the hard disk, allocates the data ID and password which are not used among the data IDs and passwords managed, and outputs them to the terminal via the network I/F 157.

In step S194, the elapsed time of the data is discriminated. The CPU 155 retrieves the index and examines the oldest elapsed time in the data which has already been preserved in the hard disk 154 and is not transmitted to the server yet, thereby discriminating whether a predetermined time or more has elapsed or not.

A data amount is discriminated in step S195. The CPU 155 retrieves the index and examines an amount of data which has already been preserved in the hard disk 154 and is not transmitted to the server yet, thereby discriminating whether the data amount has reached a predetermined amount or more or not.

In step S195, when it is decided that the data amount has reached the predetermined amount, the data is transmitted to the server (step S196). The CPU 155 connects to the server through the public line network 108 by using the modem 159 and transmits data which is not transmitted to the server yet in the data stored in the hard disk 154 to the server.

Figure 62:
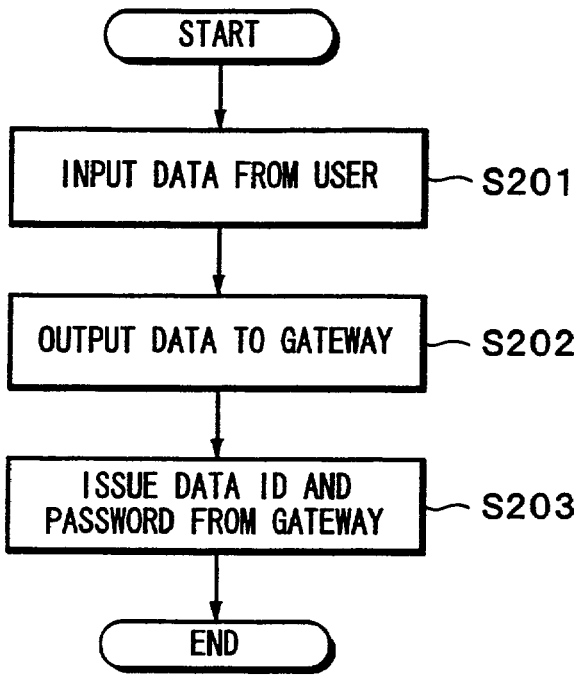
FIG. 62 is a flowchart for explaining processes in the embodiment of the invention.

FIG. 62 is a flowchart showing the operation on the terminal side corresponding to the operation on the foregoing gateway side. In first step S201, the data input from the user is received. The programmable DSP 127 waits for the key input from the user via the serial controller 129. When there is the key input, a key code is received. The received data is preserved in the RAM 128.

In step S202, the data is outputted to the gateway 150. The programmable DSP 127 outputs the data in the RAM 128 to the gateway 150 via the network I/F.

In step S203, the data ID and password are received from the gateway. The programmable DSP 127 receives the data ID and password via the network I/F and, when the seal is outputted to the printer 118 through the printer controller 134, it is printed while including the data ID and password.

Figure 63:
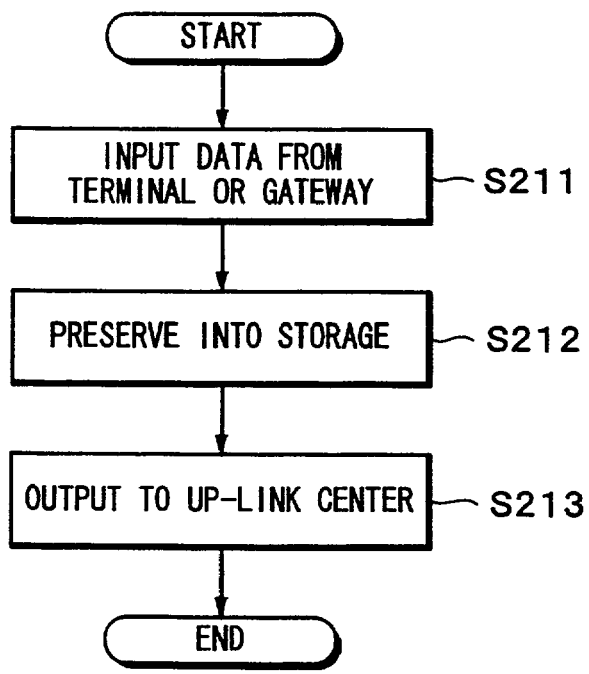
FIG. 63 is a flowchart for explaining processes in the embodiment of the invention.

In the forgoing embodiment of the invention, the latest data preserved in the server can be preliminarily transmitted to the gateway. The operation on the server side in case of performing such processes will now be described with reference to a flowchart of FIG. 63. The operation on the terminal side corresponding to it is shown in a flowchart of FIG. 64. This process does not always need the gateway and the same shall also similarly apply to the processes between the terminal and the server.

In step S211, the data input from the terminal or gateway is executed. As shown in FIG. 7, the data outputted from the seal exchange terminal 106 is received by the personal data server in the internet provider 109 via the public line network 108.

In step S212, the personal data server in the internet provider 109 checks the received data and preserves into the storage. In step S213, it is outputted to the up-link center 102. The personal data server in the internet provider 109 transmits the data to the data transmission center 101 through a dedicated line. The data transmission center 101 transmits the data to the broadcasting (up-link) center 102 through a dedicated line. The broadcasting (up-link) center 102 transmits the data to the terminal side through the satellite 103.

Figure 64:
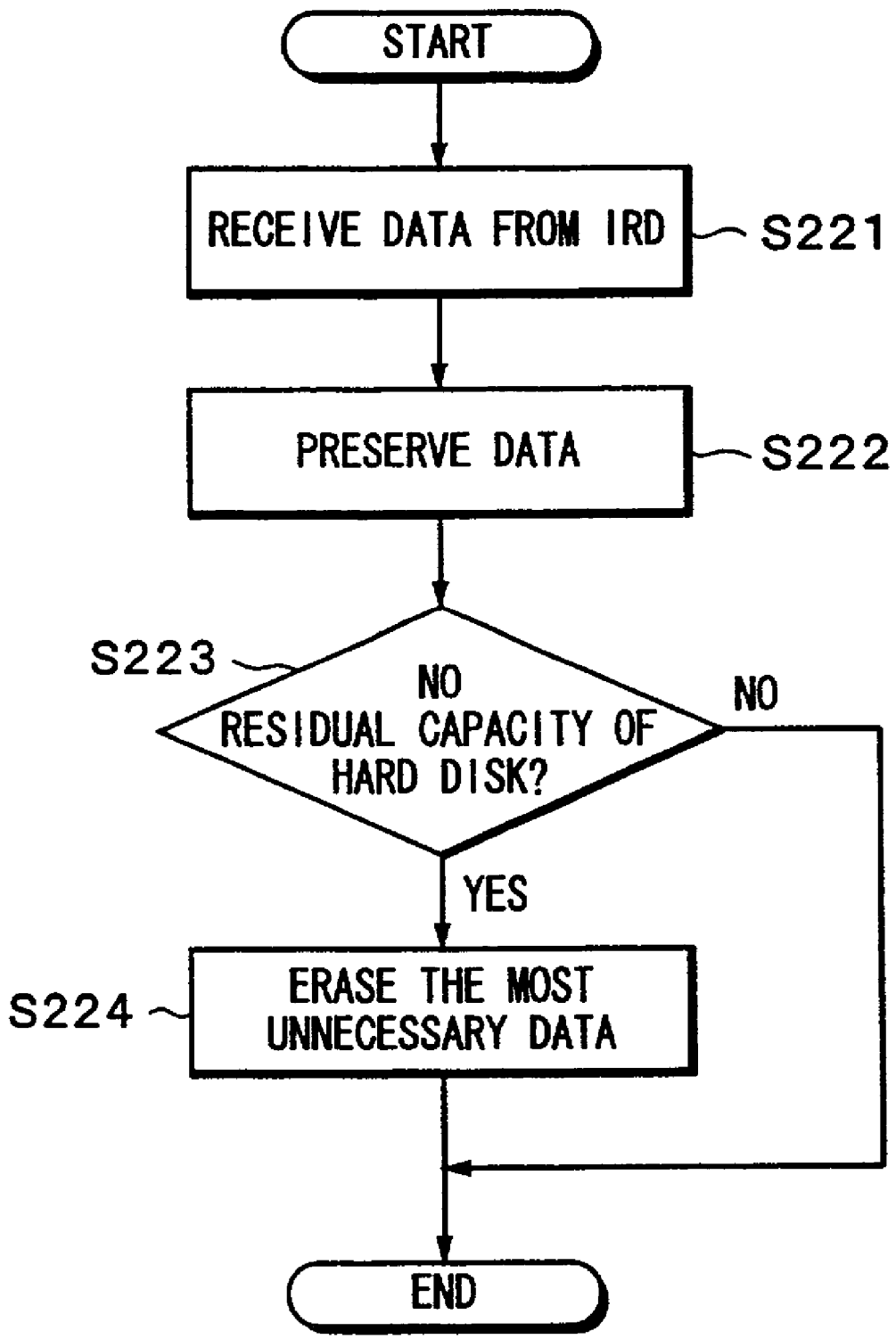
FIG. 64 is a flowchart for explaining processes in the embodiment of the invention.

On the terminal side, as shown in a flowchart of FIG. 64, the data is received from the IRD 105 in step S221. The programmable DSP 127 of the terminal receives the TS of MPEG2 via the data converter.

In step S222, the received data is preserved. The programmable DSP 127 discriminates whether the personal data to be Preserved is included in the received data. When the personal data is included, it is stored into the hard disk 126.

A residual amount of the hard disk 126 is discriminated in step S223. The programmable DSP 127 checks a residual amount of the hard disk 126 and discriminates whether a capacity of an unused area is a predetermined amount or more or not.

In step S223, when it is determined that the residual storage capacity of the hard disk is small, the most unnecessary data is deleted in step S224. The programmable DSP 127 determines the most unnecessary data from the data making date and time, the number of accessing times, and the like in the data in the hard disk 126 and deletes the data so that a capacity of the unused area of the hard disk is equal to or larger than a predetermined amount.

Figure 65:
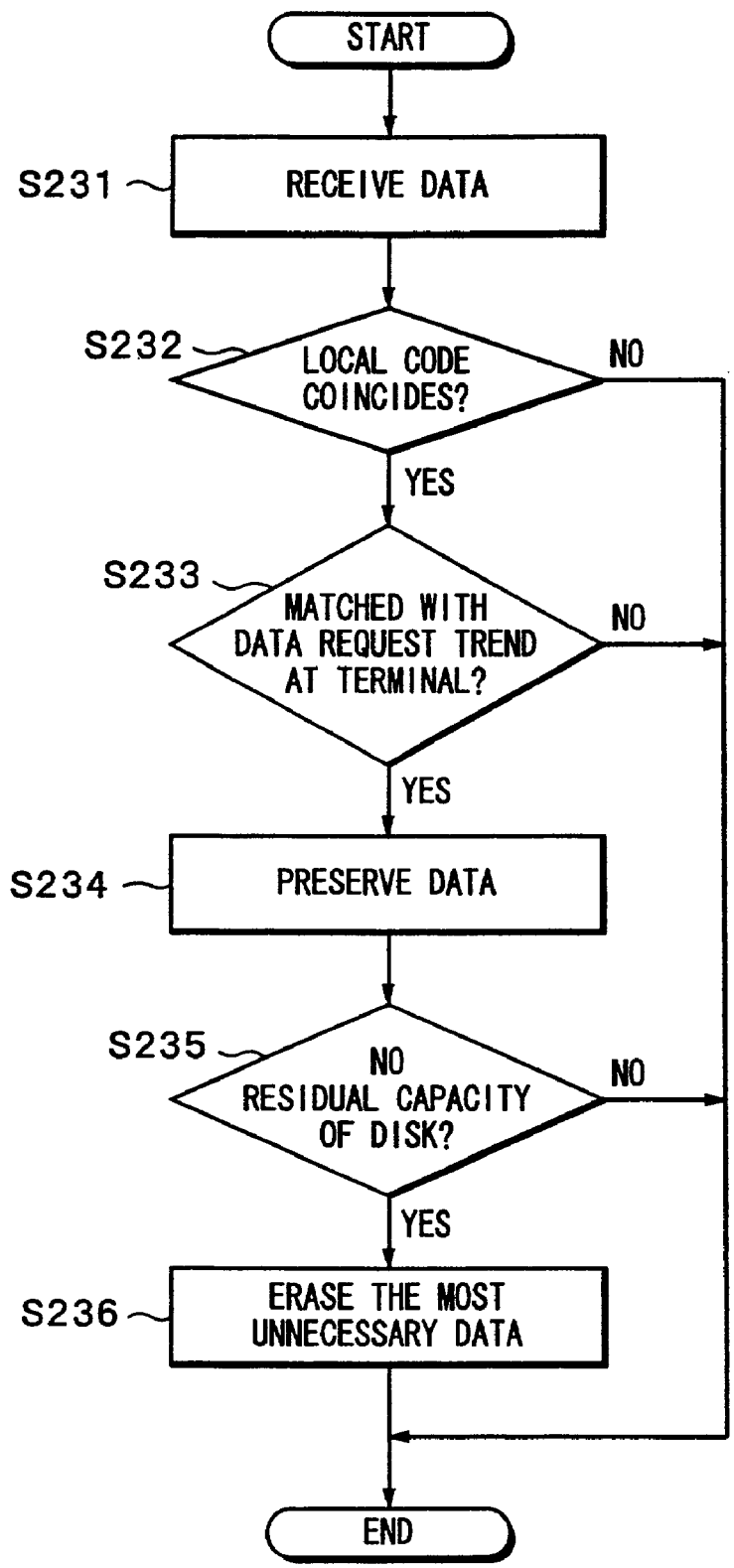
FIG. 65 is a flowchart for explaining processes in the embodiment of the invention.
Figure 66:
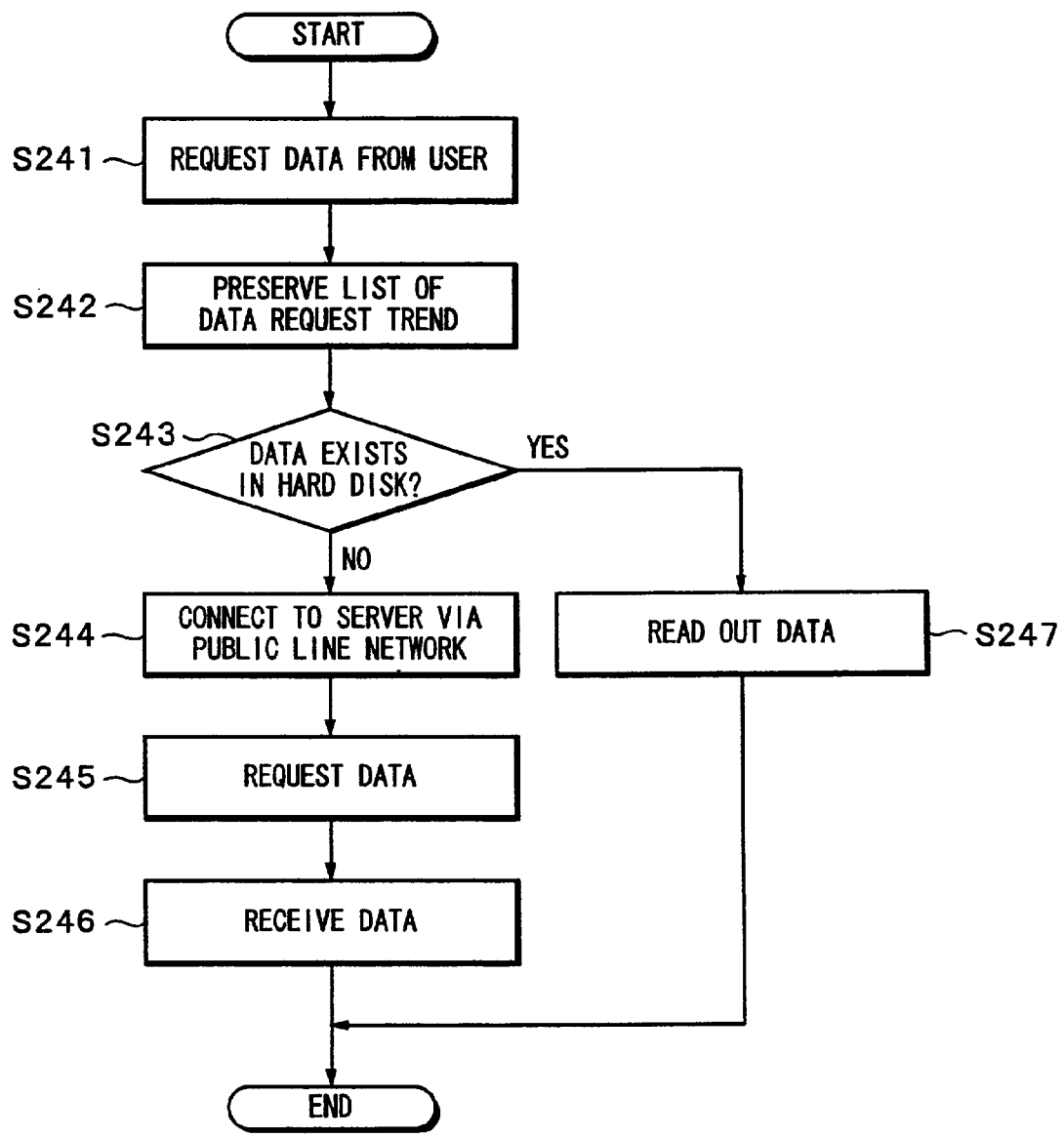
FIG. 66 is a flowchart for explaining processes in the embodiment of the invention.

As mentioned above, as a method of preserving the latest information into the hard disk of the terminal or gateway, it is preferable to weight the information every terminal or gateway and to add the priority order. A flowchart for the operation on the terminal side upon data reception is shown in FIG. 65. A flowchart for the operation on the terminal side at the time of a data request is shown in FIG. 66.

In first step S231 in FIG. 65, the data is received. The programmable DSP 127 receives MPEG2/TS via the data converter. In step S232, a check is made to see if a district code coincides. The programmable DSP 127 discriminates whether the codes of districts to be preserved such as same district as the terminal, neighboring district, and the like are included in the received data or not.

When the district code coincides, a check is made in step S233 to see if it is matched with a data requesting trend of the terminal. The programmable DSP 127 discriminates whether the received data corresponds to the data requesting trend of the terminal to be preserved such as an age class of the users or the like or not.

In step S234, the data which is matched with the district code and the requesting trend is preserved. The programmable DSP 127 stores the personal data into the hard disk 126.

In step S235, a residual amount of the hard disk 126 is discriminated. The programmable DSP 127 examines the residual amount of the hard disk 126 and discriminates whether a capacity of an unused area is equal to or larger than a predetermined amount or not. If the disk residual amount is small, the most unnecessary data is deleted in step S236. That is, the programmable DSP 127 determines the most unnecessary data from the data making date and time, the number of accessing times, and the like from the data in the hard disk 126 and deletes the data so that a capacity of the unused area of the hard disk 126 is equal to or larger than a predetermined amount.

Processes upon data requesting will now be described with reference to FIG. 66. In step S241, a data request from the user is received. The programmable DSP 127 waits for a key input from the user via the serial controller 129. When there is a key input, a key code is received. The data of each field is received and preserved in the RAM 128.

In step S242, data requesting conditions are preserved in a requesting trend list of the data. The programmable DSP 127 preserves data requesting conditions from the user into the data requesting trend list. In step S243, the presence or absence of the relevant data in the hard disk 126 is discriminated.

When there is no relevant data, the programmable DSP 127 is connected to the server in step S244. The programmable DSP 127 is connected to the server through the public line network by using the modem. The programmable DSP 127 requests the data to the server through the modem and the public line network (step S245). In step S246, the programmable DSP 127 receives the data from the server via the modem and the public line network.

In step S243, when there is the relevant data in the data preserved in the hard disk 126, the programmable DSP 127 reads out the requested data stored in the hard desk 126 (step S247).

The invention is not limited to a satellite digital broadcasting but the data can be also transmitted by using the digital broadcasting of the ground wave. It is not always necessary to compound the seal exchange terminal and the Karaoke terminal.

According to the invention, the advertising information to which the target ID was added is multiplexed and transmitted in addition to the video/audio data of the program, the target ID is collated with the viewer attributes which have previously been registered, and only when they coincide, the advertising information is extracted. According to the invention, the advertising information regarding the goods or services having a possibility such that the viewer himself has an interest when they are seen from the viewer can be selectively monitored. On the contrary, it is possible to prevent that an advertising in which a possibility that the viewer has an interest is small or an advertising in which the parent doesn't want to allow it to be seen by children is monitored. It is possible to reduce the time in which the monitor of the program is interrupted by advertising information. Further, by superimposing an advertising display by the OSD, it is possible to construct in a manner such that no advertising display appears in the signal of the program which is recorded by a recording apparatus such as a VTR or the like. On the other hand, the enterprise which provides an advertising can efficiently provide advertising information to the class (target users) who has an interest in the goods and services. Such an advantage of the invention is further effected by accompanying the advertising detailed information.

In addition, since the monitor history of the advertising information can be collected, the number of viewers who monitored the advertising, the viewer class, and the like can be known on an advertising unit basis and the advertising can be efficiently performed. Further, since the monitor history of the advertising detailed information can be collected, the number of viewers who monitored the details of the advertising, the viewer class, and the like can be known on an advertising unit basis and the advertising can be efficiently performed. In the case where a homepage is used to provide the detailed information, there is an advantage such that the monitor history of the detailed information can be easily and promptly collected.

According to the invention, the personal data such as face image data can be electronically mutually exchanged. As compared with the existing method of handing the printed seals, the personal data such as seal images or the like can be rapidly exchanged in a fairly wide range. By using the digital broadcasting for the transmission of the personal data, a large amount of personal data can be transmitted to a wide range at a high speed.

According to the invention, by using the data ID and password, only the subscribers of the services can monitor the personal data and the printing of the personal data (seal data) can be permitted to only a specific partner.

Further, there is an advantage such that by providing the gateway and collecting a plurality of terminals, a scale of hardware of each terminal can be reduced.

The present invention is not limited to the foregoing embodiments but many modifications and variations are possible within the spirit and scope of the appended claims of the invention.

What is claimed is:

1. An information broadcasting system, comprising:
a receiving apparatus, including:
image input means for inputting a face image of an individual to serve as seal data that is to be included in personal data of the individual,
output means for outputting the personal data, the outputted personal data of the individual including the face image that serves as seal data,
input means for inputting an animation icon whose size or quantity increases as a number of elapsed days since the personal data of the individual has been formed increases,
communicating means,
storage means for storing attribute information of the individual,
digital broadcast receiving means for receiving a multiplexed digital broadcast signal within which are (i) advertising information that includes link information showing a linking method between the advertising information and detailed information regarding the advertising information and (ii) a target identification code that identifies a viewer class as a target of one or more of goods and services advertised by the advertising information, and
processing means for correlating the target identification code with the attribute information and for extracting the advertising information when the attribute information coincides with the target identification code;
a server for receiving the personal data from the receiving apparatus, the received personal data of the individual including the face image that serves as seal data, for transmitting the personal data to the receiving apparatus, the transmitted personal data of the individual including the face image that serves as seal data, and for managing the personal data, the managed personal data of the individual including the face image that serves as seal data; and
two-way communicating means for coupling a plurality of such receiving apparatuses with the server,
wherein the personal data is electronically exchanged among the receiving apparatuses using the server and the two-way communicating means, the exchanged personal data of the individual including the face image that serves as seal data.

2. A receiving apparatus, comprising:
image input means for inputting a face image of an individual to serve as seal data that is to be included in personal data of the individual;
output means for outputting the personal data, the outputted personal data of the individual including the face image that serves as seal data;
input means for inputting an animation icon whose size or quantity increases as a number of elapsed days since the personal data of the individual has been formed increases;
communication means;
storage means for storing attribute information of the individual;
receiving means for receiving a digital broadcast signal within which are (i) advertising information that includes link information showing a linking method between the advertising information and detailed information regarding the advertising information and (ii) a target identification code that identifies a viewer class as a target of one or more of goods and services advertised by the advertising information; and
processing means for correlating the target identification code with the attribute information and for extracting the advertising information when the attribute information coincides with the target identification code;
wherein the personal data is electronically exchanged using the communicating means, a server, and two-way communicating means, the exchanged personal data of the individual including the face image that serves as seal data.

3. An information broadcasting system, comprising:
a receiving apparatus, including:
image input means for inputting a face image of an individual to serve as seal data that is to be included in personal data of the individual,
output means for outputting the personal data, the outputted personal data of the individual including the face image that serves as seal data,
input means for inputting an animation icon whose size or quantity increases as a number of elapsed days since the personal data of the individual has been formed increases,
storage means for storing attribute information of the individual,
receiving means for receiving a digital broadcasting signal within which are (i) advertising information that includes link information showing a linking method between the advertising information and detailed information regarding the advertising information and (ii) a target identification code that identifies a viewer class as a target of one or more of goods and services advertised by the advertising information, and processing means for correlating the target identification code with the attribute information and for extracting the advertising information when the attribute information coincides with the target identification code;

a gateway, including:
  a storing device, and
  communicating means, and
  the gateway being connected to a plurality of such receiving apparatuses, receiving the personal data from the plurality of receiving apparatuses, the received personal data of the individual including the face image that serves as seal data, and sending the personal data to the plurality of receiving apparatuses, the sent personal data of the individual including the face image that serves as seal data;

a server for receiving the personal data from the gateway, the received personal data of the individual including the face image that serves as seal data, for transmitting the personal data to the gateway, the transmitted personal data of the individual including the face image that serves as seal data, and for managing the personal data, the managed personal data of the individual including the face image that serves as seal data; and two-way communicating means for coupling the plurality of receiving apparatuses with the server, wherein the personal data is electronically exchanged among the receiving apparatuses through the gateways using the server and the two-way communicating means, the exchanged personal data of the individual including the face image that serves as seal data.

4. A receiving system, comprising:
a receiving apparatus including:
  image input means for inputting a face image of an individual to serve as seal data that is to be included in personal data of the individual,
  output means for outputting the personal data, the outputted personal data of the individual including the face image that serves as seal data,
  input means for inputting an animation icon whose size or quantity increases as a number of elapsed days since the personal data of the individual has been formed increases,
  storage means for storing attribute information of the individual,
  receiving means for receiving a digital broadcasting signal within which are (i) advertising information that includes link information showing a linking method between the advertising information and detailed information regarding the advertising information and (ii) a target identification code that identifies a viewer class as a target of one or more of goods and services advertised by the advertising information, and
  processing means for correlating the target identification code with the attribute information and for extracting the advertising information when the attribute information coincides with the target identification code; and a gateway, including:
  a storing device, and
  communicating means,
  the gateway being connected to a plurality of such receiving apparatuses, receiving the personal data from the plurality of receiving apparatuses, the received personal data of the individual including the face image that serves as seal data, and sending the personal data to the plurality of receiving apparatuses, the sent personal data of the individual including the face image that serves as seal data;

wherein the personal data is electronically exchanged using the communicating means of the gateway, a server, and two-way communicating means, the exchanged personal data of the individual including the face image that serves as seal data.

5. The information broadcasting system according to claim 1 or 3, wherein the system has a personal data exchanging function and a communication Karaoke function.

6. The information broadcasting system according to claim 1 or 3, wherein the personal data and messages are transmitted to the receiving apparatus using the digital broadcasting signal.

7. The information broadcasting system according to claim 1 or 3, wherein when input of the personal data is completed, a data identification code, which is usable by all users of services at a time of a retrieval of the personal data and added to the personal data, and a password, which is known by only the individual creating the personal data and used for a specific service, are issued.

8. The information broadcasting system according to claim 1 or 3, wherein the personal data includes auxiliary information accompanying the image of the individual creating the personal data and inputted by the individual.

9. The information broadcasting system according to claim 1 or 3, wherein the personal data includes auxiliary information accompanying the image of the individual creating the personal data and inputted by the individual, and detailed information formed by the individual creating the personal data and inputted by an input device other than a terminal.

10. The information broadcasting system, according to claim 9, wherein retrieval information for retrieving personal data desired for exchange is provided by the auxiliary information.

11. The receiving apparatus according to claim 2, wherein the personal data includes a plurality of types of auxiliary information accompanying the image of the individual creating the personal data and inputted by the individual, retrieving information for retrieving the personal data whose exchange is desired is provided by displaying the auxiliary information, and auxiliary information to be displayed is selected.

12. The receiving apparatus according to claim 11, wherein the auxiliary information is an audio message.

13. The receiving apparatus according to claim 11, wherein the auxiliary information is an animation message.

14. The receiving apparatus according to claim 11, wherein the auxiliary information is selected from a plurality of regular messages.

15. The receiving apparatus according to claim 2, wherein the personal data has one of an audio message and an animation message as auxiliary information accompanying the image of the individual creating the personal data, and a timing to start an input is displayed when one of the audio message and the animation message is inputted.

16. The receiving apparatus according to claim 15, wherein the auxiliary information is a character message.

17. The receiving apparatus according to claim 2, wherein the personal data has a character message as auxiliary information accompanying the image of the individual creating the personal data, and characters are allocated to numerals of two digits when the character message is inputted, thereby enabling an input operation of the character message using only numeral keys.

18. The information broadcasting system according to claim 1 or 3, wherein data which changes depending on a number of elapsed days from a date of creation of the personal data is displayed by the receiving apparatus.

19. The information broadcasting system according to claim 1 or 3, wherein a message and a data identification code possessed by an individual desiring personal data exchange are transmitted to the individual crating the personal data selected by the individual desiring personal data exchange.

20. The information broadcasting system according to claim 1 or 3, wherein when a message to the individual creating the personal data from an individual desiring personal data exchange is preserved in the server, if the individual creating the personal data is using the receiving apparatus, notification that the message has been registered is transmitted to the individual creating the personal data in a real-time manner.

21. The information broadcasting system according to claim 1 or 3, wherein a message is transmitted to the individual creating the personal data selected by an individual desiring personal data exchange, and the individual creating the personal data who received the message must input a data identification code and a password to display the message.

22. The information broadcasting system, according to claim 21, wherein after the message is displayed, the individual creating the personal data issues a print permission to the data identification code of the individual desiring personal data exchange.

23. The information broadcasting system, according to claim 22, wherein permission information is recorded into the server as additional information of the personal data, and the individual desiring personal data exchange prints the personal data only when the data identification code of the individual desiring personal data exchange is included in the permission information added to the personal.

24. The information broadcasting system according to claim 3, wherein the gateway collectively transmits at every predetermined period of time the personal data inputted by the receiving apparatuses to the server.

25. The information broadcasting system according to claim 3, wherein most recent personal data preserved in the server is first transmitted to one of the terminal and the gateway.

26. The information broadcasting system according to claim 25, wherein a weight is added to each element of information on one of the retrieving apparatus side and the gateway side and the information is sequentially and preferentially preserved according to a level of significance of the information.

27. The information broadcasting system, according to claim 9, wherein retrieval information for retrieving personal data desired for exchange is provided by the auxiliary information.

28. The information broadcasting system, according to claim 9, wherein the auxiliary information is an audio message.

29. The information broadcasting system, according to claim 9, wherein the auxiliary information is an animation message.

30. The information broadcasting system, according to claim 9, wherein the auxiliary information is selected from a plurality of regular messages.

31. The information broadcasting system, according to claim 9, wherein the auxiliary information is a character message.

32. The receiving apparatus according to claim 2, wherein the system has a personal data exchanging function and a communication Karaoke function.

33. The receiving apparatus according to claim 2, wherein the personal data and messages are transmitted to the receiving apparatus using the digital broadcasting signal.

34. The receiving apparatus according to claim 2, wherein when input of the personal data is completed, a data identification code, which is usable by all users of services at a time of a retrieval of the personal data and added to the personal data, and a password, which is known by only the individual creating the personal data and used for a specific service, are issued.

35. The receiving apparatus according to claim 2, wherein the personal data includes auxiliary information accompanying the image of the individual creating the personal data and inputted by the individual.

36. The receiving apparatus according to claim 2, wherein the personal data includes auxiliary information accompanying the image of the individual creating the personal data and inputted by the individual, and detailed information formed by the individual creating the personal data and inputted by an input device other than a terminal.

37. The receiving apparatus according to claim 36, wherein retrieval information for retrieving personal data desired for exchange is provided by the auxiliary information.

38. The receiving apparatus according to claim 2, wherein data which changes depending on a number of elapsed days from a date of creation of the personal data is displayed by the receiving apparatus.

39. The receiving apparatus according to claim 2, wherein a message and a data identification code possessed by an individual desiring personal data exchange are transmitted to the individual crating the personal data selected by the individual desiring personal data exchange.

40. The receiving apparatus according to claim 2, wherein when a message to the individual creating the personal data from an individual desiring personal data exchange is preserved in the server, if the individual creating the personal data is using the receiving apparatus, notification that the message has been registered is transmitted to the individual creating the personal data in a real-time manner.

41. The receiving apparatus according to claim 2, wherein a message is transmitted to the individual creating the personal data selected by an individual desiring personal data exchange, and the individual creating the personal data who received the message must input a data identification code and a password to display the message.

42. The receiving apparatus according to claim 41, wherein after the message is displayed, the individual creating the personal data issues a print permission to the data identification code of the individual desiring personal data exchange.

43. The receiving apparatus according to claim 42, wherein permission information is recorded into the server as additional information of the personal data, and the individual desiring personal data exchange prints the personal data only when the data identification code of the individual desiring personal data exchange is included in the permission information added to the personal.

44. The receiving apparatus according to claim 36, wherein retrieval information for retrieving personal data desired for exchange is provided by the auxiliary information.

45. The receiving apparatus according to claim 36, wherein the auxiliary information is an audio message.

46. The receiving apparatus according to claim 36, wherein the auxiliary information is an animation message.

47. The receiving apparatus according to claim 36, wherein the auxiliary information is selected from a plurality of regular messages.

48. The receiving apparatus according to claim 36, wherein the auxiliary information is a character message.

49. The receiving system according to claim 4, wherein the system has a personal data exchanging function and a communication Karaoke function.

50. The receiving system according to claim 4, wherein the personal data and messages are transmitted to the receiving apparatus using the digital broadcasting signal.

51. The receiving system according to claim 4, wherein when input of the personal data is completed, a data identification code, which is usable by all users of services at a time of a retrieval of the personal data and added to the personal data, and a password, which is known by only the individual creating the personal data and used for a specific service, are issued.

52. The receiving system according to claim 4, wherein the personal data includes auxiliary information accompanying the image of the individual creating the personal data and inputted by the individual.

53. The receiving system according to claim 4, wherein the personal data includes auxiliary information accompanying the image of the individual creating the personal data and inputted by the individual, and detailed information formed by the individual creating the personal data and inputted by an input device other than a terminal.

54. The receiving system according to claim 53, wherein retrieval information for retrieving personal data desired for exchange is provided by the auxiliary information.

55. The receiving system according to claim 4, wherein the personal data includes a plurality of types of auxiliary information accompanying the image of the individual creating the personal data and inputted by the individual, retrieving information for retrieving the personal data whose exchange is desired is provided by displaying the auxiliary information, and auxiliary information to be displayed is selected.

56. The receiving system according to claim 55, wherein the auxiliary information is an audio message.

57. The receiving system according to claim 55, wherein the auxiliary information is an animation message.

58. The receiving system according to claim 55, wherein the auxiliary information is selected from a plurality of regular messages.

59. The receiving system according to claim 4, wherein the personal data has one of an audio message and an animation message as auxiliary information accompanying the image of the individual creating the personal data, and a timing to start an input is displayed when one of the audio message and the animation message is inputted.

60. The receiving system according to claim 59, wherein the auxiliary information is a character message.

61. The receiving system according to claim 4, wherein the personal data has a character message as auxiliary information accompanying the image of the individual creating the personal data, and characters are allocated to numerals of two digits when the character message is inputted, thereby enabling an input operation of the character message using only numeral keys.

62. The receiving system according to claim 4, wherein data which changes depending on a number of elapsed days from a date of creation of the personal data is displayed by the receiving apparatus system.

63. The receiving system according to claim 4, wherein a message and a data identification code possessed by an individual desiring personal data exchange are transmitted to the individual crating the personal data selected by the individual desiring personal data exchange.

64. The receiving system according to claim 4, wherein when a message to the individual creating the personal data from an individual desiring personal data exchange is preserved in the server, if the individual creating the personal data is using the receiving apparatus, notification that the message has been registered is transmitted to the individual creating the personal data in a real-time manner.

65. The receiving system according to claim 4, wherein a message is transmitted to the individual creating the personal data selected by an individual desiring personal data exchange, and the individual creating the personal data who received the message must input a data identification code and a password to display the message.

66. The receiving system according to claim 65, wherein after the message is displayed, the individual creating the personal data issues a print permission to the data identification code of the individual desiring personal data exchange.

67. The receiving system according to claim 66, wherein permission information is recorded into the server as additional information of the personal data, and the individual desiring personal data exchange prints the personal data only when the data identification code of the individual desiring personal data exchange is included in the permission information added to the personal.

68. The receiving system according to claim 4, wherein the gateway collectively transmits at every predetermined period of time the personal data inputted by the receiving apparatuses to the server.

69. The receiving system according to claim 4, wherein most recent personal data preserved in the server is first transmitted to one of the terminal and the gateway.

70. The receiving system according to claim 69, wherein a weight is added to each element of information on one of the retrieving apparatus side and the gateway side and the information is sequentially and preferentially preserved according to a level of significance of the information.

71. The receiving system according to claim 53, wherein retrieval information for retrieving personal data desired for exchange is provided by the auxiliary information.

72. The receiving system according to claim 53, wherein the auxiliary information is an audio message.

73. The receiving system according to claim 53, wherein the auxiliary information is an animation message.

74. The receiving system according to claim 53, wherein the auxiliary information is selected from a plurality of regular messages.

75. The receiving system according to claim 53, wherein the auxiliary information is a character message.

* * * * *